United States Patent [19]

Osato et al.

[11] Patent Number: 5,132,945
[45] Date of Patent: Jul. 21, 1992

[54] MAGNETOOPTICAL RECORDING MEDIUM ALLOWING OVERWRITING WITH TWO OR MORE MAGNETIC LAYERS AND RECORDING METHOD UTILIZING THE SAME

[75] Inventors: Yoichi Osato, Yokohama; Hisaaki Kawade, Atsugi; Eiichi Fujii, Yokohama; Nobuhiro Kasama, Yokohama; Tadashi Kobayashi, Yokohama, all of Japan

[73] Assignee: Canon Kabushiki Kaisha, Tokyo, Japan

[21] Appl. No.: 475,941

[22] Filed: Jan. 30, 1990

Related U.S. Application Data

[63] Continuation of Ser. No. 071,190, Jul. 8, 1987, abandoned.

[30] Foreign Application Priority Data

| Date | | Application No. |
|---|---|---|
| Jul. 8, 1986 | [JP] Japan | 61-158787 |
| Aug. 16, 1986 | [JP] Japan | 61-191202 |
| Nov. 5, 1986 | [JP] Japan | 61-262034 |
| Nov. 25, 1986 | [JP] Japan | 61-278566 |
| Nov. 25, 1986 | [JP] Japan | 61-278567 |
| Feb. 2, 1987 | [JP] Japan | 62-20384 |
| Feb. 3, 1987 | [JP] Japan | 62-21675 |
| Feb. 4, 1987 | [JP] Japan | 62-23993 |
| Feb. 6, 1987 | [JP] Japan | 62-24706 |
| Feb. 6, 1987 | [JP] Japan | 62-24707 |
| Feb. 10, 1987 | [JP] Japan | 62-27083 |
| Feb. 10, 1987 | [JP] Japan | 62-27982 |
| Feb. 23, 1987 | [JP] Japan | 62-33736 |
| Mar. 10, 1987 | [JP] Japan | 62-52897 |
| Mar. 16, 1987 | [JP] Japan | 62-70279 |
| Mar. 26, 1987 | [JP] Japan | 62-70273 |
| Mar. 26, 1987 | [JP] Japan | 62-70274 |
| Mar. 26, 1987 | [JP] Japan | 62-70278 |
| Mar. 26, 1987 | [JP] Japan | 61-72559 |
| Jun. 18, 1987 | [JP] Japan | 62-153108 |

[51] Int. Cl.$^5$ .................................. G11B 13/04
[52] U.S. Cl. ........................ 369/13; 360/59; 365/122
[58] Field of Search ............ 369/13, 14; 360/59, 360/224, 131; 365/10, 27, 32, 122

[56] References Cited

U.S. PATENT DOCUMENTS 3,521,294 7/1970 Treves .

(List continued on next page.)

FOREIGN PATENT DOCUMENTS 0217067 4/1987 European Pat. Off. .

(List continued on next page.)

OTHER PUBLICATIONS

IEEE Transactions on Magnetics, vol. 22, No. 5 (Sep., 1986 931:3

(List continued on next page.)

Primary Examiner—Stuart S. Levy
Assistant Examiner—Hoa Nguyen
Attorney, Agent, or Firm—Fitzpatrick, Cella, Harper & Scinto

[57] ABSTRACT

A magnetooptical recording medium provided with a first magnetic layer and a second magnetic layer having a higher Curie point and a lower coercive force than the first magnetic layer and being exchange coupled with the first magnetic layer satisfies the relation:

$$H_H > H_L > \frac{\sigma_w}{2M_s h}$$

wherein $H_H$ is the coercive force of the first magnetic layer; $H_L$ is the coercive force of the second magnetic layer; $M_2$ is the saturation magnetization of the second magnetic layer; h is the thickness thereof; and $\sigma_w$ is the magnetic wall energy between the first and second magnetic layers and a method of recording information on the same.

47 Claims, 18 Drawing Sheets

U.S. PATENT DOCUMENTS

| | | | |
|---|---|---|---|
| 4,059,828 | 11/1977 | Kobayashi et al. | 365/27 |
| 4,126,494 | 11/1978 | Imamura et al. | 365/10 |
| 4,198,692 | 4/1980 | Kobayashi | 365/27 |
| 4,556,291 | 12/1985 | Chen | 360/131 |
| 4,612,587 | 9/1986 | Kaneko et al. | 369/13 |
| 4,628,485 | 12/1986 | Tanaka et al. | 360/131 |
| 4,645,722 | 2/1987 | Katayama et al. | 428/694 |
| 4,701,881 | 10/1987 | Tanaka et al. | 365/122 |
| 4,771,347 | 9/1988 | Horimai et al. | 369/13 |
| 4,871,614 | 10/1989 | Kobayashi | 369/13 |

FOREIGN PATENT DOCUMENTS

| | | |
|---|---|---|
| 0225151 | 6/1987 | European Pat. Off. |
| 3619618 | 12/1986 | Fed. Rep. of Germany |
| 57-70653 | 5/1982 | Japan |
| 58-50639 | 3/1983 | Japan |
| 58-08045 | 6/1983 | Japan |
| 60-05404 | 1/1985 | Japan |
| 61-240453 | 10/1986 | Japan |
| 2110459 | 6/1983 | United Kingdom |

OTHER PUBLICATIONS

Mizutani, Japanese Patent Abstracts, vol. 9, No. 86 (p.349).

Tanaka, Japanese Patent Abstracts, vol. 6, No. 34 (p. 104).

Tsumashima et al., IEEE Trans. on Mag. vol. Mag 17, No. 6, (Nov. 1981) pp. 2840–2842.

Mizutani, Japanese Patent Abstracts, vol. 9, No. 86 (Apr., 1985) p. 349.

Nippon Kogaku K. K., "Overwrite System of Mag. Op. Disk Sys.".

Inter Symposium on Mag Op. Mar. 1987, 7 pages.

Kobayashi, et al., Japanese Journal of Applied Physics, vol. 20, No. 11 (Nov. 1981), pp. 2089–2095.

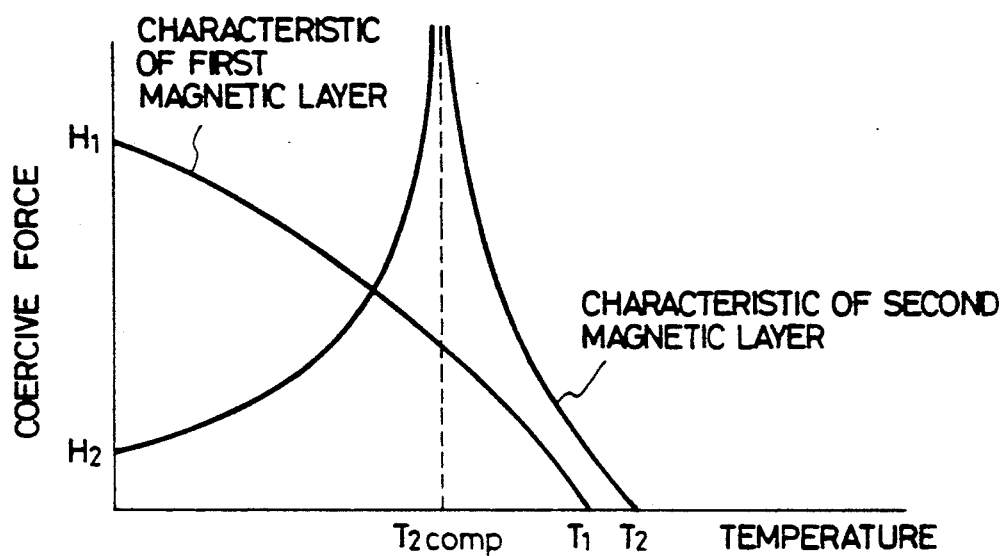
FIG. 23
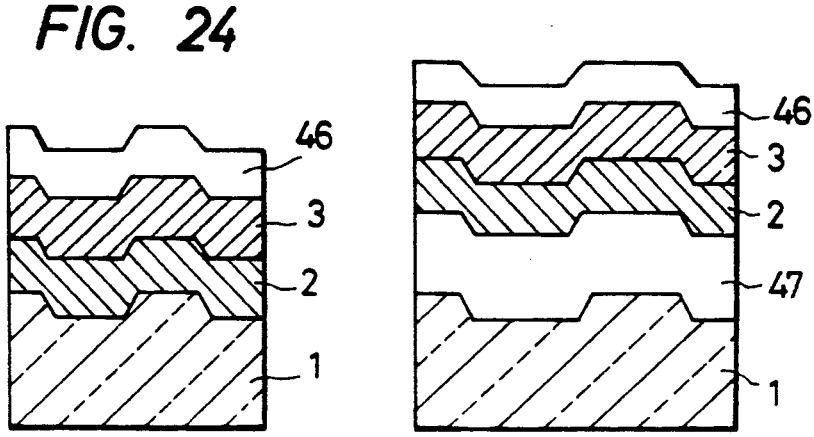
FIG. 24
FIG. 25

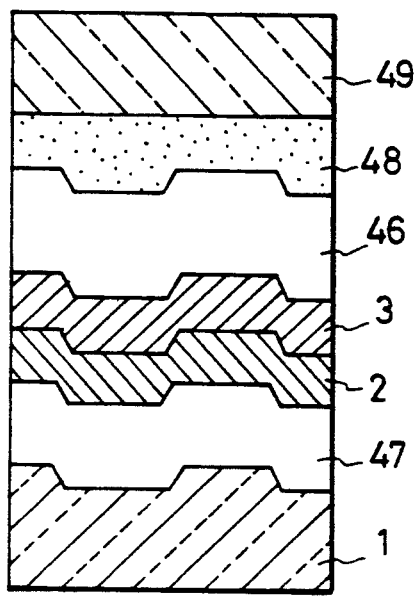
FIG. 26
FIG. 27
FIG. 28
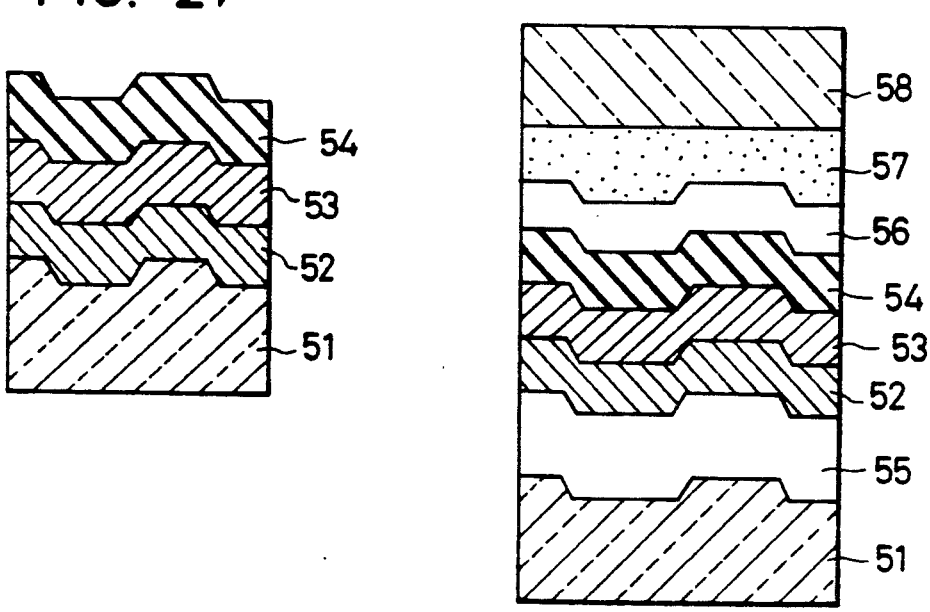

MAGNETOOPTICAL RECORDING MEDIUM ALLOWING OVERWRITING WITH TWO OR MORE MAGNETIC LAYERS AND RECORDING METHOD UTILIZING THE SAME

This application is a continuation of application Ser. No. 071,190, filed Jul. 8, 1987 now abandoned.

BACKGROUND OF THE INVENTION

1. Field of the Invention

The present invention relates to a magnetooptical recording medium provided with a recording layer composed of a magnetic film allowing information recording by irradiation with a light beam, and a recording method utilizing said recording medium.

2. Description of the Related Background Art

Optical memory devices utilizing laser beam are being actively developed in recent years as useful memories of high density and large capacity. In particular, magnetooptical recording is attracting attention as a rewritable recording method, and the magnetooptical recording media employed as a rewritable optical memory device.

FIG. 1 schematically illustrates a conventional apparatus for such magnetooptical recording, wherein a disk-shaped magnetooptical recording medium or magnetooptical disk 31, provided with a magnetic layer having an easy axis of magnetization perpendicular to the surface of said layer, is rotated by a spindle motor 32. An optical head 34, provided with a laser unit, an objective lens 34 etc., performs information recording by projecting a light beam 35 (turned on and off according to the information to be recorded) onto the disk 31 through the objective lens 33. A bias magnetic field is applied by an electromagnet 36 to an area of the disk 31 irradiated by the light beam. The optical head 34 is moved in the radial direction of the disk 31, thereby recording information in spiral or concentric patterns.

In conventional apparatus as shown in FIG. 1, the information recording and erasure are conducted in steps 30a to 30f shown in FIG. 2. At first, as shown in 30a, the magnetic layer 37, constituting the recording layer of the magnetooptical disk, is magnetized in a predetermined direction. Then, as shown in 36b, the magnetic layer 37 is irradiated by the light beam 35. The irradiated area is heated close to the Curie point of said magnetic layer 37 by absorption of the irradiating beam, thus causing a decrease in the coercive force. In this state the magnet 36 shown in FIG. 1 applies a bias magnetic field B' of a direction opposite to the aforementioned predetermined direction, whereby the magnetization in the area irradiated by the light beam is inverted. Thus, after having passed the position of irradiation, as shown by 30c, a record bit 38 having a direction of magnetization different from that in the surrounding area is formed. The information is recorded as a train of such record bits 38 or an information track.

For erasing the information recorded as in 30d, an unmodulated light beam 35 is projected while a bias magnetic field −B' of a direction opposite to that of the magnetic field at the recording is applied by the magnet 36 as shown in 30e, thereby heating the magnetic layer 37 again to a temperature close to the Curie point. Thus the magnetic layer 37 restores the magnetization aligned in the predetermined direction, thus returning to the state prior to the recording as shown in 30f.

The recorded information can also be reproduced by irradiating the magnetic layer 37 having record bits 38, with an unmodulated light beam of a reduced intensity insufficient for heating to the Curie point, and detecting the direction of polarization of the reflected or transmitted light beam by a known method utilizing magnetooptical effect.

However, in case of rewriting already recorded information, the conventional apparatus as explained above is incapable of so-called overwriting but requires a step of erasing followed by a step of new recording. Thus, in case of changing the information recorded in a track on a magnetooptical disk, it becomes necessary to erase the information of said track in a turn of the disk and to record the new information in a succeeding turn, and such operation inevitably results in a loss of recording speed.

In order to resolve such drawback there has already been proposed an apparatus equipped with a record/reproducing head and a separate erasing head, or an apparatus in which the recording is achieved by modulating the applied magnetic field while a continuous laser beam is projected, but such apparatus are associated with other drawbacks such as being bulky and expensive or incapable of high speed modulation.

On the other hand, in order to improve the recording sensitivity and the S/N ratio at reproduction in such magnetooptical recording medium, technology utilizing two mutually exchange-coupled magnetic layers is disclosed in the Japanese Patent laid-open No. 78652/1982, corresponding to the U.S. patent application Ser. No. 315,467 which is continued as Continuation-in-part No. 644,143, which is further continued as Continuation No. 908,934 now U.S. Pat. No. 4,799,114 issued Jan. 17, 1989. In addition to the above-mentioned applications, such magnetic layer of two-layered structure was described in "Magnetization Process of Exchange-coupled Ferrimagnetic Double-Layered Films", Kobayashi et al., Japanese Journal of Applied Physics, Vol. 20. No. 11, November 1981, P. 2089–2095 and "Thermomagnetic Writing on Exchange-coupled Amorphous Rare-Earth Iron Double-layer Films" Tsunashima et al., IEEE Transactions on Magnetics, Vol. MAG-17, No. 6, November 1981, P. 2940–2842.

However such exchange-coupled double-layered films are still incapable of overwriting and thus require an erasing step.

SUMMARY OF THE INVENTION

The object of the present invention is to provide a magnetooptical recording medium and a recording method, which are free from the above-explained drawbacks and enable an overwriting operation as in the magnetic recording media, by merely attaching magnetic field generating means of a simple structure to the conventional apparatus.

The foregoing object can be achieved, according to the present invention, by a magnetooptical recording medium composed of a substrate, a first magnetic layer formed thereon, and a second magnetic layer exchange-coupled with said first magnetic layer and having a higher Curie point and a lower coercive force compared with those of said first magnetic layer, and satisfying a condition:

$$H_H > H_L > \sigma_w/2M_s h$$

wherein $M_s$ is the saturation magnetization of the second magnetic layer, h is the thickness thereof, $\sigma_w$ is the magnetic wall energy between two magnetic layers, and $H_H$ and $H_L$ are coercive forces the first and second magnetic layers.

The information recording on said medium is conducted by a step of applying a first magnetic field of a magnitude enough for magnetizing said second magnetic layer but insufficient for inverting the direction of magnetization of said first magnetic layer, and a step of applying a bias magnetic field of a direction opposite to that of said first magnetic field and simultaneously projecting a light beam of a power enough for heating the medium close to the Curie point of the first magnetic layer thereby obtaining the recording of a first kind in which the magnetization of the first magnetic layer is aligned in a direction stable to the second magnetic layer while the direction of magnetization of the second magnetic layer is not changed, or applying said bias magnetic field and simultaneously projecting a light beam of a power enough for heating the medium close to the Curie point of the second magnetic layer thereby obtaining the recording of a second kind in which the direction of magnetization of the second magnetic layer is inverted and the first magnetic layer is simultaneously magnetized in a direction stable to the second magnetic layer.

BRIEF DESCRIPTION OF THE DRAWINGS

FIGS. 22 and 23 are charts showing the temperature characteristic of the coercive force, when the magnetic layer has the compensation temperature between the room temperature and the Curie temperature;

FIGS. 24, 25 and 26 are schematic cross-sectional views of embodiments of the magnetooptical recording medium of the present invention provided with a protective layer;

FIGS. 27 and 28 are schematic cross-sectional views of embodiments of the magnetooptical recording medium of the present invention utilizing triple-layered magnetic film;

DESCRIPTION OF THE PREFERRED EMBODIMENTS

Now the present invention will be clarified in detail by embodiments thereof shown in the attached drawings.

Figure 3:
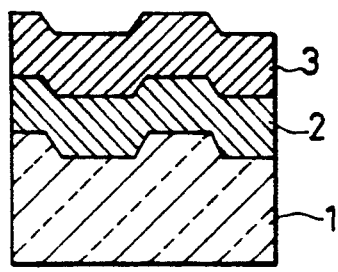
FIG. 3 is a schematic cross-sectional view of a magnetooptical recording medium embodying the present invention.

FIG. 3 is a schematic cross-sectional view of an embodiment of the magnetooptical recording medium of the present invention. Said medium is composed of a translucent substrate 1 provided with guide grooves in advance (called "pregrooved"), and a a first magnetic layer 2 and a second magnetic layer 3 laminated thereon. The first magnetic layer 2 has a lower Curie point ($T_L$) and a higher coercive force ($H_H$), while the second magnetic layer 3 has a higher Curie point ($T_H$) and a lower coercive force ($H_L$). The terms "higher" and "lower" are defined through relative comparison of the two magnetic layers, the comparison of the coercive force being at the room temperature. This comparison is more detailedly illustrated in FIG. 4. It is generally desirable that the first magnetic layer 2 has $T_L$ in a range of 70°–180° C. and $H_H$ in a range of 3–10 KOe, and the second magnetic layer 3 has $T_H$ in a range of 150°–400° C. and $H_L$ in a range of 0.5–2 KOe.

The thickness, coercive force, saturated magnetization and magnetic wall energy of said magnetic layers 2, 3 are so selected that the two states of the finally recorded bit can exist in stable manner. The magnetic layers 2, 3 may be exchange-coupled or magnetostatically coupled although exchange-coupling is preferable in consideration of the magnitude of the effective bias magnetic field at the recording and the stability of the recorded binary bit.

In the magnetooptical recording medium of the present invention, the first magnetic layer 2 is principally related to the reproduction. The magnetooptical effect exhibited by said first magnetic layer 2 is principally utilized in the reproduction, while the second magnetic layer 3 plays an important role in the recording.

On the other hand, in the conventional exchange-coupled double-layered magnetic film mentioned above, the magnetic layer with a lower Curie point and a higher coercive force is principally related to the recording, and the magnetic layer with a higher Curie point and a lower coercive force is principally related to the reproduction. In such conventional exchange-coupled double-layered film, there stands a relationship:

$$H_H > \frac{\sigma_w}{2M_s h} > H_L \quad (1)$$

among the saturation magnetization $M_s$ of the latter magnetic layer, film thickness h and magnetic wall energy $\sigma_w$ between two layers.

On the other hand, in the exchange-coupled double-layered film of the recording medium of the present invention, there is required a relation:

$$H_H > H_L > \frac{\sigma_w}{2M_s h} \quad (2)$$

among the saturation magnetization $M_s$ of the second magnetic layer, film thickness h and magnetic wall energy $\sigma_w$ between two layers.

This condition (detailed later) is required for stabilizing the state of magnetization of the bit finally formed by recording, as shown by 4f in FIG. 5. Consequently the effective bias magnetic field, thickness, coercive force, saturation magnetization, magnetic wall energy etc. of the magnetic layers 2, 3 can be so determined as to satisfy the above-mentioned relation.

Each magnetic layer can be composed of a substance exhibiting a vertical magnetic anisotropy and a magnetooptical effect, preferably an amorphous magnetic alloy of a rare-earth element and a transition metal element such as GdCo, GdFe, TbFe, DyFe, GdTbFe, TbDyFe, GdFeCo, TbFeCo, GdTbCo or GdTbFeCo.

Figure 5:
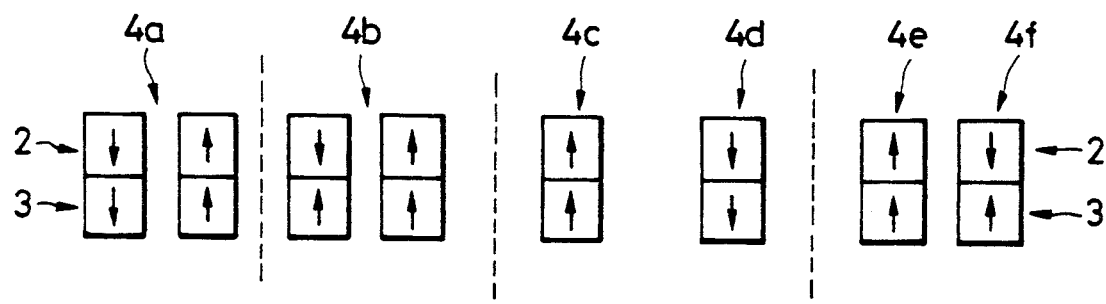
FIG. 5 is a schematic view showing the state of magnetization in a recording process utilizing the medium shown in FIG. 3.
Figure 6:
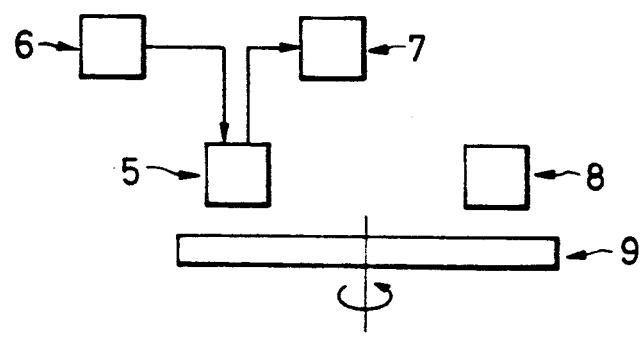
FIG. 6 is a schematic view of an apparatus for recording and reproduction with the medium of the present invention.

The following explanation of a recording process utilizing the above-explained magnetooptical recording medium, makes reference to FIG. 5, shows the states of magnetization of the magnetic layers 2, 3 in the steps of the recording process, while FIG. 6 schematically shows a recording apparatus. Prior to recording, the stable directions of magnetization of the magnetic layers 2, 3 may be mutually same or opposite. FIG. 5 shows a case in which said stable directions of magnetization are mutually same.

In FIG. 6, it is assumed that a part of a magnetooptical disk 9 of the above-explained structure has an initial magnetization as shown by 4a in FIG. 5. The magnetooptical disk 9, being rotated by a spindle motor, passes the position of a magnetic field generating unit 8, generating a magnetic field of which intensity is selected at a suitable value between the coercive forces of the magnetic layers 2, 3 (magnetic field being directed upwards in the present embodiment), whereby, as shown by 4b in FIG. 5, the second magnetic layer 3 is uniformly magnetized while the first magnetic layer 2 retains the initial magnetization state.

Figure 4:
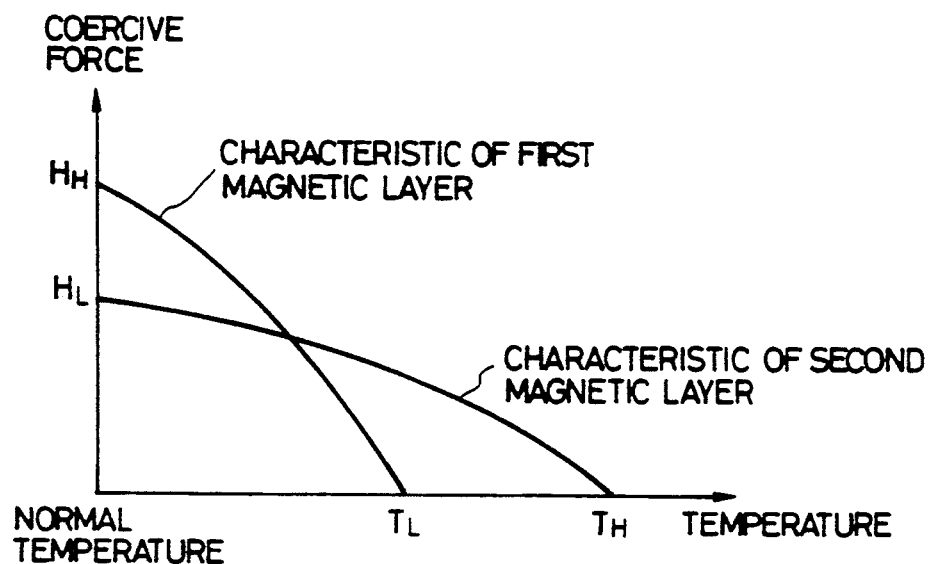
FIG. 4 is a chart showing the temperature characteristic of the coercive force of the magnetic layer in the medium shown in FIG. 3.

The rotated magnetooptical disk 9, in passing the position of a record/reproducing head 5, is irradiated by a laser beam having two power levels according to the signal from a recording signal generator 6. The first laser power level is enough for heating the disk to a temperature close to the Curie point of the first magnetic layer 2, while the second laser power level is enough for heating the disk to a temperature close to the Curie point of the second magnetic layer 3. More specifically, referring to FIG. 4 showing the relation between the temperature and the coercive forces of the magnetic layers 2, 3, the first laser power can heat the disk close to $T_L$ while the second laser power can heat it close to $T_H$.

The first laser power heats the first magnetic layer 2 close to the Curie point thereof, but the second magnetic layer 3 has a coercive force capable of stably maintaining the bit at this temperature. Thus, through a suitable selection of the recording bias magnetic field, a record bit shown in 4c can be obtained, as a first preliminary recording, from either state in 4b in FIG. 5.

The suitable selection of the bias magnetic field means that in the first preliminary recording, such bias magnetic field is essentially unnecessary, since the first magnetic layer receives a force (exchange force) to arrange the magnetization in a direction stable to the direction of magnetization of the second magnetic layer 3, said directions being same in this case. However, said bias magnetic field is provided, in a second preliminary recording to be explained later, in a direction to assist the magnetic inversion of the second magnetic layer 3, namely in a direction prohibiting the first preliminary recording, and it is convenient to maintain said bias magnetic field in a same intensity and a same direction, both in the first and second preliminary recordings.

In consideration of the foregoing, the bias magnetic field is preferably selected at a minimum necessary intensity required for the second preliminary recording to be explained in the following, and such selection corresponds to the suitable selection mentioned above.

In the following there will be explained the second preliminary recording. This is achieved by heating the disk with the second laser power close to the Curie point of the second magnetic layer 3, whereby the direction of magnetization of the second magnetic layer 3 is inverted by the bias magnetic field selected as explained above, and the direction of magnetization of the first magnetic layer 2 is also arranged in a stable direction (same direction in the present case) with respect to the second magnetic layer 3. In this manner a bit as shown by 4d in FIG. 5 can be formed from either state shown in 4b.

Thus each area of the magnetooptical disk can have a preliminary record of the state 4c or 4d in FIG. 5, respectively by the first or second laser power corresponding to the input signal.

Then the magnetooptical disk 9 is further rotated and passes the position of the magnetic field generating unit 8, generating a magnetic field of which intensity is selected between the coercive forces of the magnetic layers 2, 3 as explained before, whereby the record bit 4c remains unchanged and assumes a final record state 4e, while the record bit 4d assumes another final record state 4f as the result of magnetic inversion of the second magnetic layer 3.

In order that the record 4f can stably exist, there is required the aforementioned relationship (1):

$$\frac{\sigma_w}{2M_s h} < H_L < H_H \quad (25)$$

among the saturation magnetization $M_s$ of the second magnetic layer 3, film thickness h and magnetic wall energy $\sigma_w$ between the magnetic layers 2, 3. $\sigma_w/2M_s h$ indicates the magnitude of the exchange force received by the second magnetic layer, or represents the magnitude of a magnetic field acting to rearrange the magnetization of the second magnetic layer 3 in a stable direction (same direction in the present case) with respect to the direction of magnetization of the first magnetic layer 2. Therefore, in order that the second magnetic layer 3 can retain its magnetization unchanged against said magnetic field, said layer should have a coercive force $H_L$ larger than the magnitude of said magnetic field ($H_L > \sigma_w/2M_s h$).

Stated differently, in order that the bit can stably exist, following relations are required among the coercive forces $H_H$, $H_L$ of the first and second magnetic layers and the effective bias magnetic fields $H_{Heff}$, $H_{Leff}$ of said layers:

$$H_H - H_{Heff} > 0, \ H_L - H_{Leff} > 0 \quad (3)$$

$$H_H - H_{Heff} > H_L + H_{Leff} \quad (4)$$

Figure 7A:
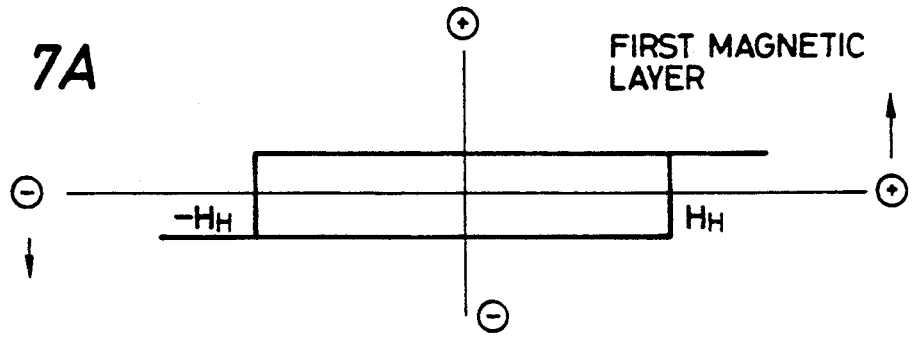
FIGS. 7A to 7D are charts showing B-H loops of the medium shown in FIG. 3.
Figure 7B:
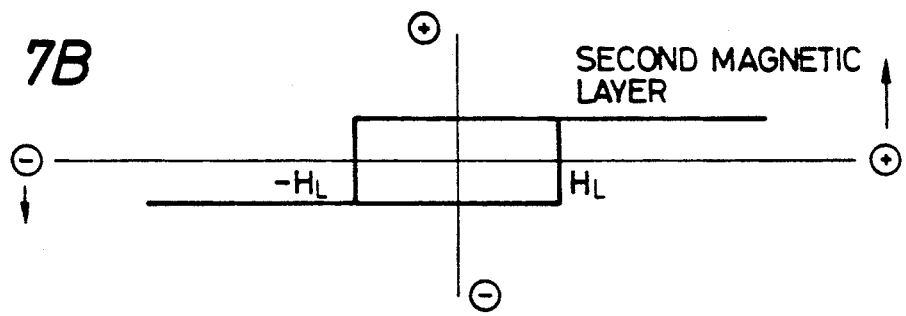

These relations will be explained in more detail in relation to FIGS. 7A to 7D. FIG. 7A is a chart showing the B-H loop, or the relation between the external magnetic field, in abscissa, applied to the first magnetic layer formed as a single layer, and the magnitude of the magnetization in said layer in ordinate. The chart indicates that, when the magnetic field is intensified in a direction of (+), the magnetization is aligned in a direction (+) or a direction ( ↑ ) at an intensity $H_H$, and, when the magnetic field is intensified in a direction (−), the magnetization is aligned in a direction (−) or ( ↓ ) at an intensity $-H_H$. FIG. 7B shows a similar B-H loop for the second magnetic layer formed as a single layer.

Figure 7C:
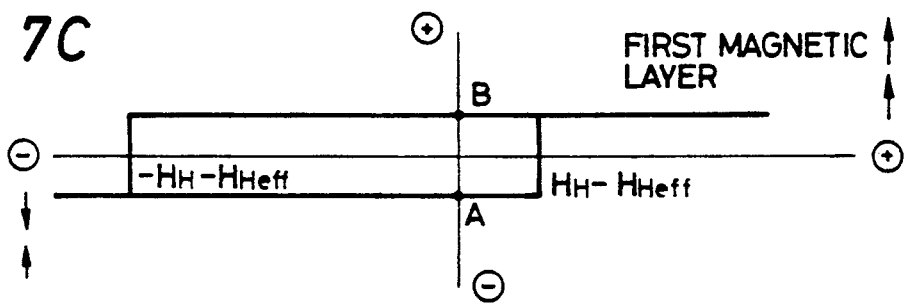

FIG. 7C shows a B-H loop of the first magnetic layer when the first and second magnetic layers are superposed with exchange-coupling and when said second magnetic layer is magnetized upward. In contrast to the case of single layer shown in FIG. 7A, an effective bias magnetic field $H_{Heff}$ is applied, facilitating to align the magnetization of the first magnetic layer with that of the second magnetic layer.

In order that the record bit 4f shown in FIG. 5 can stably exist, the state of a point A, where the direction of magnetization of the first magnetic layer is opposite to that of the second magnetic layer under a zero external field should be stable and should not transform to the state of a point B wherein said directions of magnetization of the magnetic layers are mutually same. For this reason there is required a condition $H_H - H_{Heff} > 0$.

Figure 7D:
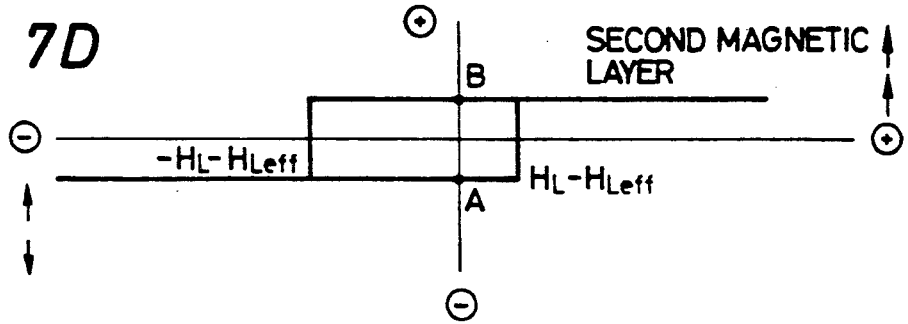

FIG. 7D shows a similar B-H loop of the second magnetic layer when the first and second magnetic layers are superposed with exchange-coupling and when said first magnetic layer is magnetized upwards.

In contrast to the case of single layer shown in FIG. 7B, an effective bias magnetic field $H_{Leff}$ is applied, facilitating to align the magnetization of the second magnetic layer with that of the first magnetic layer. In order that the record bit 4f in FIG. 5 can stably exist, the state of a point A, where the direction of magnetization of the first magnetic field is opposite to that of the second magnetic field under a zero external field should be stable and should not transform to the state of a point B wherein said directions are mutually same. For this reason there is required a condition $H_L - H_{Leff} > 0$.

Either in the first or second magnetic layer, an inversion of magnetization from a stable state to an unstable state requires a magnetic field equal to the coercive force of the magnetic layer plus the exchange force, since such inversion has to be made against the exchange force acting on said layer.

On the other hand, an inversion from an unstable state to a stable state requires a magnetic field equal to the coercive force of the magnetic layer minus the exchange force, since the exchange force facilitates the inversion in this case.

Therefore, in order that the magnetization of the first magnetic layer is not inverted in the magnetic field generating unit 8 and the magnetization of the second magnetic layer is aligned to the direction of the magnetic field of said unit in any combination of the magnetized states, the external field B should be adjusted to an internal level if there stands a relation:

$$H_H - H_{Heff} > H_L + H_{Leff}.$$

This is because the magnetic field required for inverting the magnetization of the second magnetic layer is larger than $H_L + H_{Leff}$ when the first and second magnetic layers are in a stable state, and because the magnetic field not inducing the inversion of magnetization of the first magnetic layer should be smaller than $H_H - H_{Heff}$ when the first and second magnetic layers are in a stable state.

An overwriting operation is therefore rendered possible, since the record bits 4e, 4f do not rely on the state prior to recording but only on the level of laser power at the recording. The record bits 4e, 4f can be reproduced by irradiation with a reproducing laser beam and processing with a signal reproducing unit 7.

Figure 8:
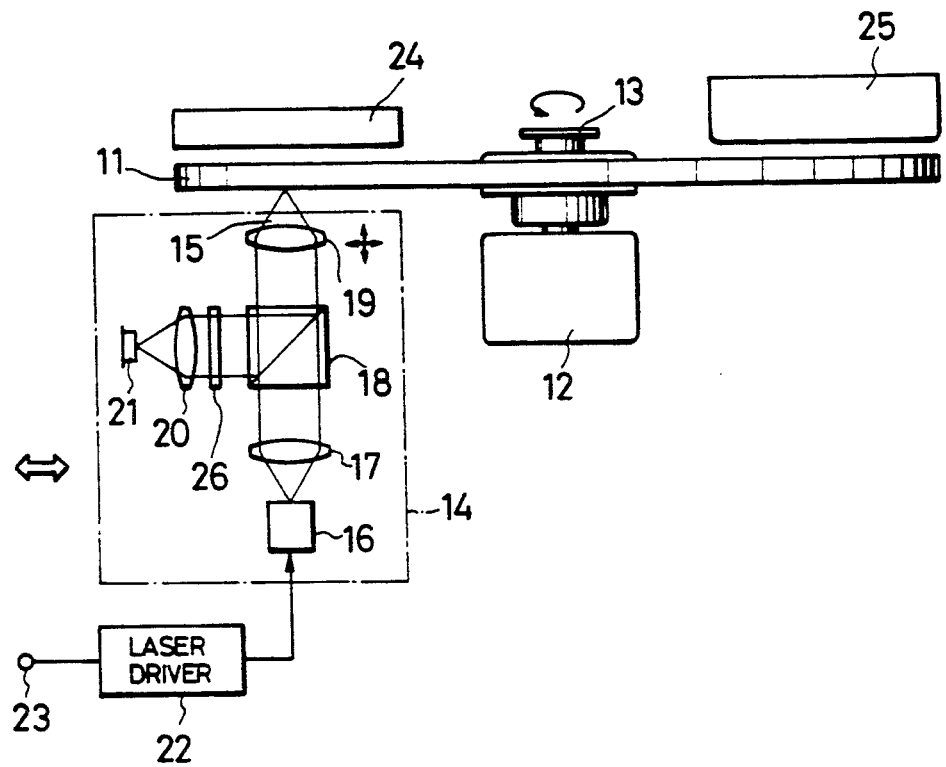
FIG. 8 is a schematic view of an embodiment of the magnetooptical recording apparatus utilizing the medium of the present invention.

FIG. 8 is a schematic view showing a more detailed embodiment of the recording apparatus shown in FIG. 6. In FIG. 8 there are shown a magnetooptical disk or recording medium 11 of a structure as shown in FIG. 3; a spindle motor 12 for rotating said disk 11; a clamper 13 for fixing the disk 11 on the rotating shaft of the motor 12; and an optical head 14 for projecting a light beam 15 onto the disk 11. Said optical head 14 is provided with a laser light source 16 composed for example of a semiconductor laser; a collimating lens 17; a beam splitter 18; an objective lens 19; a sensor lens 20; an analyzer 26 and a photodetector 21, and is radially moved by an unrepresented mechanism. Also the objective lens 19 moves in the axial direction and a direction perpendicular thereto to achieve so-called auto tracking (AT) and auto focusing (AF), according to control signals detected by the photodetector in an already known manner. The laser light source 16 is driven by a laser driver circuit 22 and emits a light beam 15 modulated in intensity between two non-zero values, according to the recording information entered from an input terminal 23, as will be explained later.

In a position opposed to the optical head 14 across the disk 11, there is provided first magnetic field generating means 24 to apply a bias magnetic field of a predetermined direction to an area of the disk 11 irradiated by the light beam 15. Also at a position distance by 180° in the rotating direction of the disk 11, there is provided second magnetic field generating means 25 for applying a bias magnetic field of a direction opposite to said predetermined direction. Said first and second magnetic field generating means may be composed of electromagnets, but the use of permanent magnets is preferable for simplifying the apparatus and reducing the cost thereof, since the direction of magnetic fields need not be switched in the present invention.

Figure 9:
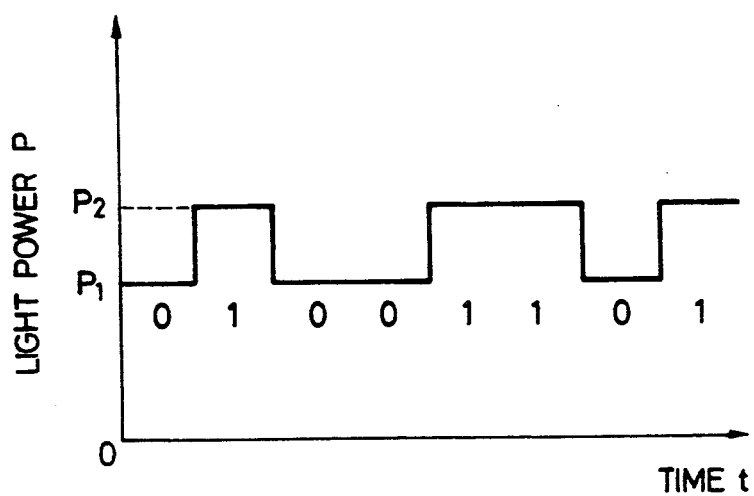
FIG. 9 is a chart showing the mode of modulation of the light beam irradiating the medium in the apparatus shown in FIG. 8.

In the following explained is the process of information recording with the apparatus shown in FIG. 8. The light beam 15 from the laser unit 16 is modulated, as shown in FIG. 9, between two non-zero levels P1 and P2, corresponding to binary recording signals "0" and "1". The light beam of the level P1 has an energy for heating the magnetic layers 2, 3 of the medium shown in FIG. 3 to the Curie temperature $T_L$ of the first magnetic layer, while that of the level P2 has an energy for heating said magnetic layers to the Curie temperature $T_H$ of the second magnetic layer. By the irradiation with such modulated beam, the magnetic layers of the disk 11 undergo changes in magnetization as shown in 10a–10h in FIG. 10A, thereby recording information.

Figure 10A:
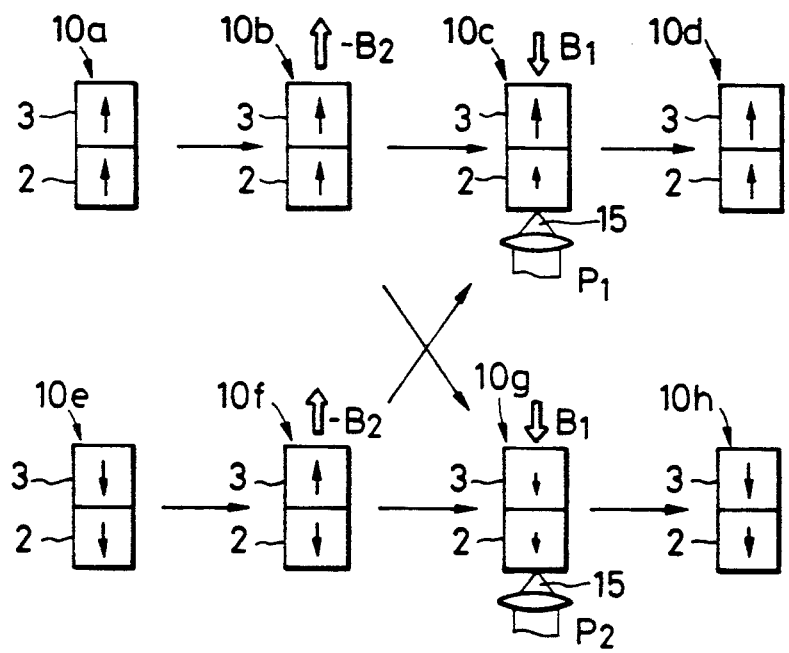
FIG. 10A is a schematic view showing states of magnetization in the recording process utilizing the apparatus shown in FIG. 8.

In FIG. 10A, arrows in the first and second magnetic layers 2, 3 indicate the directions of magnetization, and the length of arrow indicates the magnitude of coercive force. An upward magnetized area, shown in 10a, is subjected to an upward bias magnetic field of $-B2$ by the second magnetic field generating means 25 as shown in 10b, and is then moved to the position of the optical head 14 by the rotation of the disk for irradiation with the modulated light beam 15. In response to the light beam of the power P1, the first magnetic layer 2 alone reduces its coercive force as shown in 10c but retains the upward magnetization as shown in 10d due to the magnetic interaction of the second magnetic layer 3, despite of the application of a bias magnetic field B1 by the first magnetic field generating means 24. On the other hand, in response to the light beam of the power P2, the magnetization is inverted downwards as shown in 10h by the application of the bias field B1.

On the other hand, in a downward magnetized area as shown in 10e, the second magnetic layer 3 alone inverts the magnetization by the application of a bias magnetic field $-B2$. Then, in response to the light beam of the level P1, the first magnetic layer 2 reduces the coercive force of the first magnetic layer 2 as shown in 10c, and inverts the magnetization upwards as shown in 10d by the magnetic interaction of the second magnetic layer 3. Also in response to the light beam of the power P2, both magnetic layer reduce the coercive force as shown in 10g, and retain the downward magnetization as shown in 10h by the application of the bias magnetic field B1.

As explained in the foregoing, the apparatus shown in FIG. 8 can determine the direction of magnetization solely according to the change in the power of the light beam, regardless of the initial magnetization of the magnetic film. Consequently the already recorded information need not be erased but can be rewritten by direct overwriting. The recorded information can be reproduced in conventional manner, by detecting the direction of magnetization of the first magnetic layer utilizing the magnetooptical effect. As an example, in the apparatus shown in FIG. 8, the recorded information can be reproduced as electrical signals, by causing the laser unit 16 to continuously emit a light beam of a power insufficient for heating the disk to the Curie point of the second magnetic layer and receiving the reflected light from the disk 11 by the photodetector 21 through the analyzer 26.

In the apparatus shown in FIG. 8, the magnetic fields B1, B2 applied to the magnetic layers respectively by the first and second magnetic field generating means are so selected as to satisfy the following relations:

$$H_L < B2 < H_H \tag{5}$$

$$B1 < H_L', H_o \tag{6}$$

$$H_H' < H_o = B1 \tag{7}$$

$$H_H'', H_L'' < B1 \tag{8}$$

wherein $H_H'$ and $H_L'$ are coercive forces of the first and second magnetic layers at a temperature $T_L$, $H_H''$ and $H_L''$ are coercive forces at a temperature $T_H$, and $H_o$ is the magnitude of the magnetic interaction between two layers.

Figure 10B:
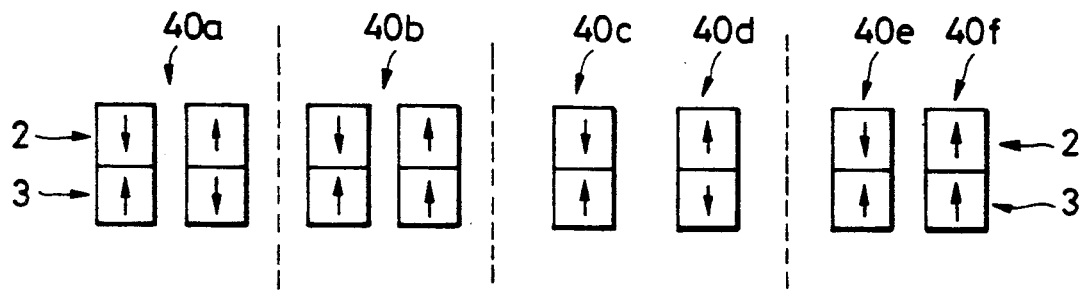
FIG. 10B is a schematic view showing states of magnetization in the recording process utilizing another embodiment of the medium.

In the foregoing description it is assumed the first and second magnetic layers 2, 3 are stable when the magnetizations thereof are in a same direction, but a similar process is applicable also when said magnetizations are stable when they are mutually oppositely directed. FIG. 10B illustrates states of magnetization in the recording process of such case, wherein 40a to 40f respectively correspond to 4a to 4f in FIG. 5.

EXAMPLE 1

A polycarbonate substrate with pregrooves and preformat signals was set in a sputtering apparatus with three targets, and was rotated at a distance of 10 cm from the target.

A ZnS protective layer of 1000 Å in thickness was obtained by sputtering from a first target in argon gas, with a sputtering speed of 100 Å/min., and a sputtering pressure of $5 \times 10^{-3}$ Torr. Then a TbFe alloy was sputtered from a second target, in argon gas, with a sputtering speed of 100Å/min. and a sputtering pressure of $5 \times 10^{-3}$ Torr to obtain a first magnetic layer of $Tb_{18}Fe_{82}$ with a thickness of 500 Å, $T_L$ of about 140° C. and $H_H$ of about 10 KOe.

Then a TbFeCo alloy was sputtered in argon gas at a sputtering pressure of $5 \times 10^{-3}$ Torr to obtain a second magnetic layer of $Tb_{23}Fe_{60}Co_{17}$ with a thickness of 500 Å, $T_H$ of ca. 250° C. and $H_L$ of ca. 1 KOe.

Subsequently a ZnS protective layer of 3000 Å in thickness was obtained by sputtering from the first target in argon gas, with a sputtering speed of 100 Å/min. and a sputtering pressure of $5 \times 10^{-3}$ Torr.

After forming these layers, the above-mentioned substrate was adhered to a polycarbonate substrate with hot-melt adhesive material to obtain a magnetooptical disk. Said disk wa mounted on a record/reproducing apparatus and was made to pass through, with a linear speed of 8 m/sec., the second magnetic field generating means for applying a field of 1500 Oe to the disk. The recording was conducted with a laser beam of a wavelength of 830 nm, concentrated to ca. 1 μm and modulated in two levels of 4 and 8 mW, with a duty ratio of 50% and a frequency of 2 MHz. The bias magnetic field was 100 Oe. Binary signals could be reproduced by irradiation with a laser beam of 1.5 mW.

The above-explained experiment was conducted on a magnetooptical disk already recorded over the entire surface. The previously recorded signal components were not detected in the reproduction, and the possibility of overwriting was thus confirmed.

EXAMPLE 2

A magnetooptical disk was prepared in the same manner as in the Example 1, except that the second magnetic layer was composed of $Tb_{23}Fe_{70}Co_7$ with $T_H = 200°$ C., $H_L = $ ca. 1 KOe and $H_{Leff} = $ ca. 300 Oe, and was subjected to recording and reproduction in the same manner as in the Example 1 except the use of a magnetic field generating field of ca. 2.5 KOe to obtain similar results as those in the Example 1.

The magnitude of $H_{Heff}$ in this case will be explained in the following in relation to FIGS. 7C and 7D.

Since $H_H - H_{Heff}$ was larger than $H_L - H_{Leff}$, when the first and second magnetic layers were magnetized in a same direction and subjected then to an inverting magnetic field, the magnetization of the second magnetic layer was inverted at $H_L - H_{Leff} = 0.7$ KOe so that $H_{Leff}$ could not be measured.

However, based on the condition $H_H - H_{Heff} > H_L - H_{Leff}$, a conclusion $4.3$ KOe $> H_{Heff}$ from the conditions $H_H = 5$ KOe, $H_L = 1$ KOe and $H_{Leff} = 0.3$ KOe.

Also the $H_{Heff}$ was measured as ca. 1 KOe in an experiment in which a first magnetic TbFe layer of same composition and thickness was superposed with a second magnetic TbFeCo layer with a modified composition to increase $H_L - H_{Leff}$.

It was confirmed, for the above-mentioned coercive forces and exchange force, that the first and second magnetic layers satisfied the condition:

$$H_H - H_{Heff} > H_L + H_{Leff}$$

by which the second magnetic layer alone is magnetized in the direction of the magnetic field from the magnetic field generating unit 24.

EXAMPLE 3

A polycarbonate disk-shaped substrate with pregrooves and preformat signals was set in a sputtering apparatus with three targets, and was rotated at a distance of 10 cm from the target.

A protective SiC layer of 700 Å in thickness was obtained by sputtering from a first target in argon gas, with a sputtering speed of 100 Å/min. and a sputtering pressure of $3 \times 10^{-3}$ Torr. Then a GdTbFe alloy was sputtered from a second target, in argon gas, with a sputtering speed of 50 Å/min. and a sputtering pressure of $3 \times 10^{-3}$ Torr to obtain a first magnetic layer of $Tb_8Gd_{12}Fe_{80}$ with a thickness 200 Å, $T_L = $ ca. 160° C. and $H_H = $ ca. 8 KOe.

Then a TbFeCo Cu alloy was sputtered in argon gas at a sputtering pressure of $3 \times 10^{-3}$ Torr to obtain a second magnetic layer of $Tb_{23}Fe_{50}Co_{15}Cu_{12}$ with a thickness of 400 Å, $T_H = $ ca. 180° C. and $H_L = $ ca. 1 KOe.

Subsequently a $Si_3N_4$ protective layer of 1200 Å in thickness was obtained by sputtering from the first target in argon gas, with a sputtering speed of 70 Å/min. and a sputtering pressure of $3 \times 10^{-3}$ Torr.

After forming these layers, the above-mentioned substrate was adhered to a polycarbonate plate with hot-melt adhesive material to obtain a magnetooptical disk. Said disk was mounted on a record/reproducing apparatus and was made to pass through, a with a linear speed of 8 m/sec., the second magnetic field generating means for applying a field of 1500 Oe to the disk. The recording was then conducted with a laser beam of a wavelength of 830 nm, concentrated to ca. 1 μm and modulated in two levels of 4 and 8 mW, with a duty ratio of 50% and a frequency of 2 MHz. The bias field at the irradiated area was 100 Oe. Binary signals could be reproduced by irradiation with a laser beam of 1.5 mW.

The above-explained experiment was conducted on a magnetooptical disk already recorded over the entire surface. The previously recorded signal components were not detected in the reproduction, and the possibility of overwriting was thus confirmed.

In case the apparatus shown in FIG. 6 employs a permanent magnet as the magnetic field generating unit 8, the magnetooptical recording medium of the present invention is constantly exposed, in the recording and reproducing operations, to a magnetic field generated by said magnetic field generating unit. Even in the reproduction, the medium is subjected to a laser beam irradiation of an energy of ca. ⅛ to 1/10 of the energy at the recording, and may therefore reach a temperature of about 70° C. at maximum in passing the magnetic field generating unit. Thus the magnetization of the first magnetic layer 2 may become inverted in repeated reproductions, for example of $10^{10}$ times. In order to avoid such inversion of magnetization, it is preferable, as shown in the following examples, to select the coercive force $H_H$ of the first magnetic layer and the magnetic field B applied by the magnetic field generating unit in such a manner as to satisfy a relation $0.2 \times H_H - 0.3 > B$ (KOe), and, more prefearbly a condition $H_H > 1.5$ KOe. A further preferred condition is $H_H > 5$ KOe as will be explained in the following.

EXAMPLE 4

Samples of magnetooptical disks 4-1 to 4-12 were prepared in the same process as in the Example 1, with the same film thickness and the same structure except that the composition, coercive force $H_H$ and Curie point $T_L$ of the first magnetic layer 2 were changed.

Each disk of Examples 1 and 4-1 to 4-12 was mounted on a record/reproducing apparatus and was made to pass through, with a linear speed of 8 m/sec., the second magnetic field generating means for applying a field of 2 KOe. The recording was conducted with a laser beam of a wavelength of 830 nm, concentrated to ca. 1 μm and modulated in two levels of 4 and 8 mW, with a duty ratio of 50% and a frequency of 2 MHz. The bias magnetic field at the recording head was 100 Oe. Then investigated was the change of the noise component in the reproduced signal, after $10^{10}$ reproductions from a same track by irradiation with a laser beam of 1.0 mW and with varied magnetic field B generated by the magnetic field generating unit 8.

Subsequently the temperature inside the apparatus was set at 30°, 45° and 60° C. and the intensity of magnetic field causing the increase of noise component in the reproduced signal was determined for each temperature, as summarized in Tab. 1.

TABLE 1

| Example | 1st mag. layer | $H_H$ (KOe) | $T_L$ (°C.) | B value (KOe) causing noise increase at 30° C. | B value (KOe) causing noise increase at 45° C. | B value (KOe) causing noise increase at 60° C. |
| --- | --- | --- | --- | --- | --- | --- |
| 1 | $Tb_{18}Fe_{82}$ | 10 | 140 | 8 | 6 | 3.2 |
| 4-1 | $Tb_{17}Fe_{83}$ | 8 | 140 | 6 | 4.7 | 2.6 |
| 4-2 | $Tb_{16}Fe_{84}$ | 6 | 140 | 4 | 3.1 | 1.5 |
| 4-3 | $Tb_{15}Fe_{85}$ | 4 | 140 | 2.2 | 1.5 | 0.5 |
| 4-4 | $Tb_{14.5}Fe_{85.5}$ | 3 | 140 | 1.5 | 1.0 | 0.3 |
| 4-5 | $Tb_{14}Fe_{86}$ | 2 | 140 | 1.2 | 0.5 | 0.1 |
| 4-6 | $Tb_{10}Gd_7Fe_{83}$ | 7 | 150 | 4.8 | 3.7 | 2.2 |
| 4-7 | $Tb_{10}Gd_6Fe_{84}$ | 5 | 150 | 3.3 | 2.3 | 1.0 |
| 4-8 | $Tb_{10}Gd_5Fe_{85}$ | 3.5 | 150 | 2.8 | 1.2 | 0.4 |
| 4-9 | $Tb_{10}Gd_7Fe_{80}Co_3$ | 7.5 | 165 | 5.4 | 4.3 | 2.5 |
| 4-10 | $Tb_{10}Gd_7Fe_{80}Co_4$ | 5.5 | 170 | 3.5 | 2.7 | 1.3 |
| 4-11 | $Tb_{15}Fe_{81}Co_4$ | 4.5 | 160 | 2.5 | 1.8 | 0.6 |
| 4-12 | $Tb_{14.5}Fe_{82}Co_{3.5}$ | 3.5 | 160 | 1.8 | 1.2 | 0.4 |

Tab. 1 indicates that the magnetic field B inducing the increase of noise component in the reproduced signal becomes smaller as the coercive force $H_H$ of the first magnetic layer becomes smaller, or as the temperature inside the apparatus becomes higher, and that this relationship is not affected by the composition of the first magnetic layer.

Figure 11:
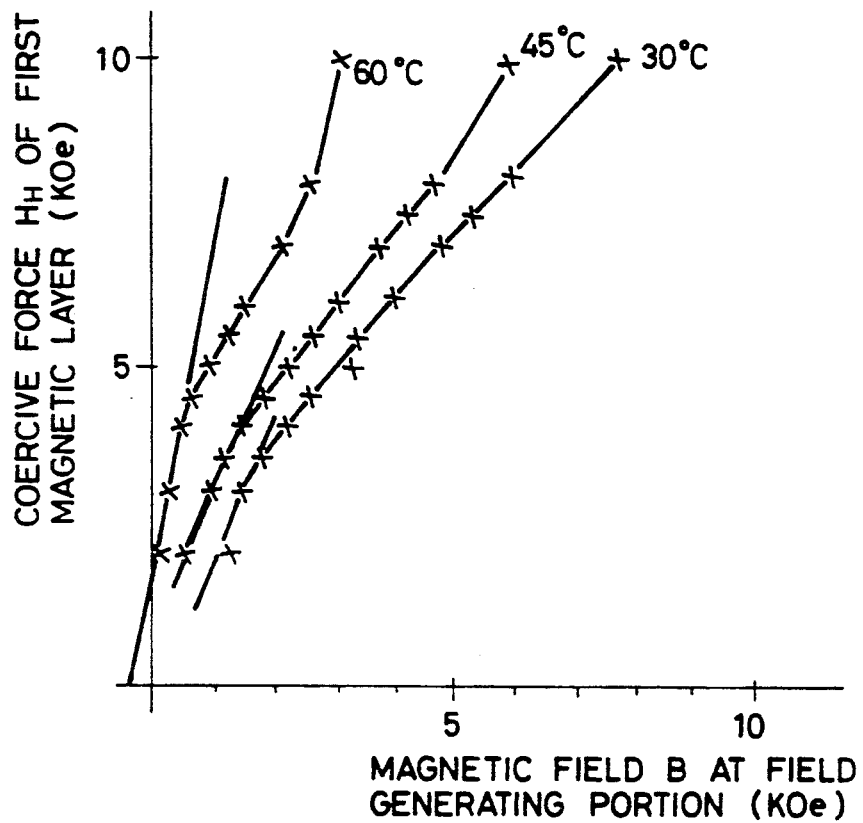
FIG. 11 is a chart showing the relation between the coercive force of the first magnetic layer and the magnetic field inducing noise increase.

FIG. 11 illustrates the relation of $H_H$ value and the B value inducing the noise increase for these samples, based on the above-explained results.

From these relationships it is apparent that, in order to prevent the noise increase up to 60° C., $H_H$ and B should at least satisfy a relation: $0.2 \times H_H - 0.3 > B$.

It is also apparent that the increase in noise takes placed even at a small value of B unless $H_H$ is at least equal to 1.5 KOe.

Since the temperature inside the apparatus does not exceed 60° C. in practice, the increase in noise can be prevented even after prolonged reproduction if the above-mentioned conditions are satisfied.

However, in addition to the foregoing conditions, it is preferable to maintain $H_H$ at least equal to 5 KOe for the following two reasons:

(i) The minimum necessary value of B is equal to the sum of the coercive force $H_L$ of the second magnetic layer and the magnetic field acting on the second magnetic layer as the result of the exchange force, and is considered in the order of 1 to 2 KOe in practice. Thus, it will be apparent from FIG. 11 that the value of $H_H$ should be equal to or higher than 5 KOe in order to maintain the noises at a low level in continuous reproduction at a temperature up to 60° C. and with the magnetic field B at 1-2 KOe.

(ii) FIG. 11 indicates the magnitude of the magnetic field B and the value of $H_H$ required for suppressing the noise at the selected value of B at each temperature inside the apparatus. For example, at a temperature 60° C. and in a range $H_H < 5$ KOe, there is obtained a relation $H_H = 5$ (B+0.3). Thus, for an increase ΔB of the magnetic field B generated by the magnetic field generating unit, there is required a corresponding increase $5 \times \Delta B$ in the value of $H_H$.

However, in a range of $H_H$ exceeding 5 KOe, the increase required for $H_H$ corresponding to a certain increase in the magnetic field B at a temperature of 30°–60° C. is smaller than that required in a range of $H_H$ below 5 KOe.

As explained in the foregoing, the magnetooptical recording medium of the present invention is required to satisfy the aforementioned relation (1):

$$H_H > H_L > \frac{\sigma_w}{2M_s h}$$

For this purpose it is also very effective to adjust the magnetic wall energy between the magnetic layers. The adjustment of the magnetic wall energy can be achieved by following methods:

(I) adjustments of the composition of the magnetic layers;

(II) addition of a predetermined step in the preparation of the medium; and (III) formation of an adjusting layer for the magnetic wall energy, between the magnetic layers;

which will be explained further in the following.

I. Adjustment of the composition of the magnetic layers

In a magnetooptical recording medium of the structure as shown in FIG. 3, the magnetic wall energy can be reproducibly reduced by forming one of the first and second magnetic layer 2, 3 with a composition richer in transition metals compared with the compensation composition, and forming the other layer with a composition richer in rare-earth elements. Such example is shown in the following.

EXAMPLE 5

A disk-shaped polycarbonate substrate with pregrooves and preformat signals was set in a sputtering apparatus with three targets, and was rotated at a distance of 10 cm from the target.

A protective $Si_3N_4$ layer of 600Å in thickness was obtained by sputtering from a first target in argon gas, with a sputtering speed of 40Å/min. and a sputtering pressure of $5 \times 10^{-3}$ Torr. Then a TbFe alloy was sputtered from a second target, in argon gas, with a sputtering speed of 100Å/min. and a sputtering pressure of $5 \times 10^{-3}$ Torr to obtain a first magnetic layer of $Tb_3Gd_{16}Fe_{81}$, richer in Fe with respect to the compensation composition, with a thickness of 400 Å, $T_L$=ca. 155° C. and $H_H$ =ca. 8 KOe.

Then a TbFeCo alloy was sputtered in argon at a sputtering pressure of $5 \times 10^{-3}$ Torr to obtain a second magnetic layer of $Tb_{10}Dy_{13}Fe_{60}Co_{17}$, richer in Tb and Dy with respect to the compensation composition, with a thickness of 300 Å, $T_H$=ca. 200° C. and $H_L$=ca. 1 KOe.

Subsequently a $Si_3N_4$ protective layer of 1500 Å in thickness was obtained by sputtering from the first target in argon gas, with a sputtering speed of 40 Å/min. and a sputtering pressure of $5 \times 10^{-3}$ Torr.

After forming these layers, the above-mentioned substrate was adhered to a polycarbonate plate with hot-melt adhesive material to obtain a magnetooptical disk. Said disk was mounted on a record/reproducing apparatus and was made to pass through, with a linear speed of 8 m/sec., a magnetic field generating unit for applying a field of 2.5 KOe. The recording was conducted with a laser beam of a wavelength of 830 nm, concentrated to ca. 1 μm and modulated in two levels of 4 and 8 mW, with a duty ratio of 50% and a frequency of 2 MHz. The bias magnetic field at the irradiated area was 100 Oe, in a direction to invert the magnetization of the second magnetic layer. Binary signals could be reproduced by irradiation with a laser beam of 1.5 mW.

The above-explained experiment was conducted also on a magnetooptical disk already recorded over the entire surface. The previously recorded signal components were not detected in the reproduction, and the possibility of overwriting was thus confirmed.

EXAMPLE 6

In the Example 5, the first magnetic layer was richer in Fe while the second magnetic layer was richer in Tb and Dy in comparison with the compensation composition.

In the present example, there were prepared and evaluated samples of the magnetooptical disk, in which the first and second magnetic layers had same coercive forces as explained above, are composed of a combination of a composition richer in transition metals such as Fe and a composition richer in rare earth elements such as Tb or Dy.

A coercive force of 8 KOe for the first magnetic layer is achieved, in a transition metal-rich composition, by $Tb_3Gd_{16}Fe_{81}$, or, in a coercive composition, by $Tb_{3.3}Gd_{17.7}Fe_{77}$. Also a coercive force of 1 KOe for the second magnetic layer is achieved, in a transition metal-rich composition by $Tb_{7.4}Dy_{9.6}Fe_{64.7}Co_{18.3}$, or, in a rare earth-rich composition, by $Tb_{10}Dy_{13}Fe_{60}Co_{17}$.

Samples listed in Tab. 2 were prepared by selecting a transition metal-rich composition or a rare earth-rich composition mentioned above for the first and second magnetic layer, and selecting other materials and layer thicknesses same as those in the Example 5. These samples were then subjected to the record/reproducing experiment as in the Example 5. The results are shown in Tab. 2.

"TM" and "RE" respectively show a composition richer in the transition metals and a composition richer in the rare earth elements, compared to the compensation composition.

TABLE 2

| Example | 1st mag. layer (TM or RE rich) | 2nd mag. layer (TM or RE rich) | Evaluation of record bits | |
|---|---|---|---|---|
| | | | bit 4e in FIG. 5 | bit 4f in FIG. 5 |
| 5 | $Tb_3Gd_{16}Fe_{81}$ (TM) | $Tb_{10}Dy_{13}Fe_{60}Co_{17}$ (RE) | + | + |
| 6-1 | $Tb_{3.3}Gd_{17.7}Fe_{79}$ (RE) | $Tb_{7.4}Dy_{9.6}Fe_{64.7}Co_{18.3}$ (TM) | + | + |
| 6-2 | $Tb_3Gd_{16}Fe_{81}$ (TM) | $Tb_{7.4}Dy_{9.6}Fe_{64.7}Co_{18.3}$ (TM) | − | ± |
| 6-3 | $Tb_{3.3}Gd_{17.7}Fe_{79}$ (RE) | $Tb_{10}Dy_{13}Fe_{60}Co_{17}$ (RE) | − | ± |

"+" indicates that the record bits are stable in the absence of external magnetic field and provide satisfactory reproduction signals; "±" indicates that the record bits are partially inverted or the reproduction signals are of insufficient quality; and "−" indicates that the record bits are unstable.

These results indicate that stable record bits are obtained only when one of the first and second magnetic layers is composed of the transition metal-rich composition and the other is composed of the rare earth-rich composition.

II. Addition of a predetermined step in the preparation of the medium

In the preparation of the magnetooptical recording medium as shown in FIG. 3, a medium satisfying the afore-mentioned relation (1) can be easily obtained by adding one of following steps after the formation of the first magnetic layer and before the formation of the second magnetic layer:

(A) a step of standing in an atmosphere of remaining gas or inert gas at $7 \times 10^{-7}$ Torr for 5 minutes of longer;

(B) a step of standing in an atmosphere with a partial pressure, at least equal to $2 \times 10^{-6}$ Torr, of a substance capable of reacting with a constituent element of the first or second magnetic layer or being chemically absorbed by said element; or (C) a step of exposure to a plasma atmosphere of inert gas or a substance capable of reacting with a constituent element of the first or second magnetic layer or being chemically absorbed by said element.

The first and second magnetic layers can be formed by sputtering, or evaporation for example with electron beam heating.

Examples of the above-mentioned remaining gas are $H_2O$, $O_2$, $H_2$, $N_2$ and low-molecular compounds consisting of C, H, N and O, and examples of the inert gas are Ar, He and Ne.

Examples of the gas capable of reacting with the constituent element of the first or second magnetic layer or being chemically absorbed by said element are $H_2O$, $O_2$, $H_2$, $N_2$, $H_2S$, $CS_2$ and $CH_4$.

In the usual manufacturing process for the medium, after the formation of the first magnetic layer, the formation of the second magnetic layer is conducted immediately (for example within 1 minute) in a clean high-vacuum atmosphere. However the addition of one of the steps (A)–(C) modifies the exchange force, coercive force or stability of the magnetic layers, and a reproducible recording characteristic can be obtained through precise control of the process conditions, process time etc.

The effects of the steps (A)-(C) will be verified in the following examples.

EXAMPLE 7

A pregrooved and proformatted polycarbonate disk substrate was set in a sputtering apparatus with three targets, and was rotated at a distance of 10 cm from the target.

The apparatus was evacuated to $1 \times 10^{-7}$ Torr, and a protective SiO layer of 1000 Å in thickness was obtained by sputtering from a first target in argon gas, with a sputtering speed of 100 Å/min. and a sputtering pressure of $5 \times 10^{-3}$ Torr. Then a TbFe alloy was sputtered from a second target, in argon gas, with a sputtering speed of 100 Å/min. and a sputtering pressure of $5 \times 10^{-3}$ Torr to obtain a first magnetic layer composed of $Tb_{18}Fe_{82}$ with a thickness of 300Å, $T_L$=ca. 140° C. and $H_H$=ca. 10 KOe. After the completion of sputtering, argon gas supply was continued for 30 minutes, with a pressure of $5 \times 10^{-3}$ Torr in the sputtering chamber.

Then a TbFeCo alloy was sputtered in argon gas with a sputtering pressure of $5 \times 10^{-3}$ Torr to obtain a second magnetic layer composed of $Tb_{23}Fe_{70}Co_7$ with a thickness of 400Å, $T_H$=ca. 200° C. and $H_L$=ca. 1 KOe.

Subsequently a SiO protective layer of 2000Å in thickness was formed by sputtering from the first target in argon gas, with a sputtering speed of 100 Å/min. and a sputtering pressure of $5 \times 10^{-3}$ Torr.

After forming these layer, the above-mentioned substrate was adhered to a polycarbonate plate with hot-melt adhesive material to obtain a magnetooptical disk. Said disk was mounted on a record/reproducing apparatus and was made to pass through, with a linear speed of 8 m/sec., a unit for generating a magnetic field of 2.5 KOe. The recording was conducted with a laser beam of a wavelength of 830 nm, concentrated to ca. 1 μm and modulated in two levels of 4 and 8 mW, with a duty ratio of 50% and a frequency of 2 MHz. The bias magnetic field was 100 Oe. Binary signals could be reproduced by irradiation of a laser beam of 1.5 mW.

The above-explained experiment was repeated also on a magnetooptical disk already recorded over the entire surface. The previously recorded signal components were not detected in the reproduction, so that the possibility of overwriting was thus comfirmed.

EXAMPLE 8 AND REFERENCE EXAMPLE

Samples of the magnetooptical disk were prepared in a process similar to that of the Example 7 but with varied conditions (atmosphere and pressure) in the step between the formations of the first and second magnetic layers, as listed in Tab. 3. Those marked with * are examples of the present invention, and others are reference examples.

In examples 8-30 to 8-33, a disk electrode of 20 cm in diameter was placed at 5 cm from the polycarbonate substrate, and a plasma treatment was conducted with a discharge power of 50 W, in the presence of various gasses listed in Tab. 3 at a pressure of $5 \times 10^{-3}$ Torr in the sputtering chamber. In examples 8-5 to 8-14, the main valve of the vacuum pump was suitably closed to vary the remaining gas atmosphere.

Each sample was evaluated for the stability of the record bits 4f, shown in FIG. 5, in the absence of external magnetic field, through the measurement of an external magnetic field inducing the inversion of magnetization in the magnetic layers. "+" and "−" respectively indicate that the record bits are stable or unstable.

Also each samples was tested for recording and reproduction in the same manner as in the Example 7. "+" and "−" respectively indicate that the recording was satisfactorily or unsatisfactorily made.

TABLE 3

| Example | Atmosphere | Vacuum (Torr) | Time (min) | Stability of bits 4f | Record state |
|---|---|---|---|---|---|
| *Ex. 7 | argon gas | $5 \times 10^{-3}$ | 30 | + | + |
| 8-1 | " | " | 1/2 | − | − |
| *8-2 | " | " | 2 | − | − |
| *8-3 | " | " | 5 | + | + |
| 8-4 | " | " | 15 | + | + |
| 8-5 | remaining gas | $1 \times 10^{-6}$ | 1/2 | − | − |
| 8-6 | " | " | 2 | − | − |
| *8-7 | " | " | 5 | + | + |
| *8-8 | " | " | 15 | + | + |
| *8-9 | " | " | 30 | + | + |
| 8-10 | remaining gas | $3 \times 10^{-6}$ | 1/2 | − | − |
| 8-11 | " | " | 2 | − | − |
| *8-12 | " | " | 5 | + | + |
| *8-13 | " | " | 15 | + | + |
| *8-14 | " | " | 30 | + | + |
| *8-15 | oxygen gas | $3 \times 10^{-6}$ | 1/2 | + | + |
| *8-16 | " | " | 2 | + | + |
| *8-17 | " | " | 5 | + | + |
| *8-18 | " | " | 15 | + | + |
| *8-19 | " | " | 30 | + | + |
| *8-20 | nitrogen gas | $3 \times 10^{-6}$ | 1/2 | + | + |
| *8-21 | " | " | 2 | + | + |
| *8-22 | " | " | 5 | + | + |
| *8-23 | " | " | 15 | + | + |
| *8-24 | nitrogen gas | $3 \times 10^{-6}$ | 30 | + | + |
| *8-25 | hydrogen gas | $3 \times 10^{-6}$ | 1/2 | − | − |
| *8-26 | " | " | 2 | + | + |
| *8-27 | " | " | 5 | + | + |
| *8-28 | " | " | 15 | + | + |
| *8-29 | " | " | 30 | + | + |
| *8-30 | argon plasma | $3 \times 10^{-3}$ | 1/12 | + | + |
| *8-31 | oxygen plasma | " | 1/12 | + | + |
| *8-32 | nitrogen plasma | " | 1/12 | + | + |
| *8-33 | hydrogen plasma | " | 1/12 | + | + |

Results of the Example 7, Examples 8 and Reference Examples indicate that the recording by overwriting can be satisfactorily achieved by the magnetooptical recording medium prepared employing either one of the steps (A) to (C).

Figure 12:
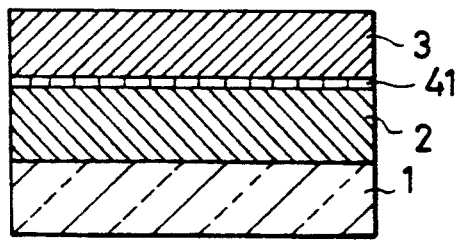
FIGS. 12 and 13 are schematic cross-sectional views of embodiments of the magnetooptical recording medium provided with an adjusting layer for the magnetic wall energy.
Figure 13:
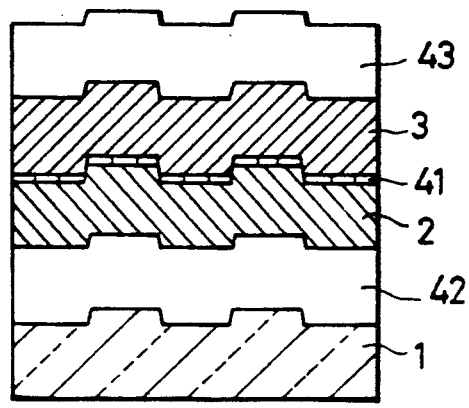

III. Formation of a magnetic wall energy adjusting layer between the magnetic layers Formation of an adjusting layer 41, as shown in FIG. 12, between the first and second magnetic layers 2, 3 allows to arbitrarily regulate the magnetic wall energy therebetween, thereby obtaining a medium satisfying the aforementioned condition (1). More practically there may be employed a structure shown in FIG. 13, using a pregrooved substrate 1 and provided with protective layers 42, 43. In FIGS. 12 and 13, same components as those in FIG. 3 are represented by same numbers and will not be explained further.

Said adjusting layer 41 may be composed of a material not deteriorating the magnetic layers, for example Ti, Cr, Al, Ni, Fe, Co, rare earth element or a fluoride thereof.

The thickness of said adjusting layer 41 is suitably selected in consideration of the materials and thicknesses of the first and second magnetic layers, but is generally selected within a range of 5 to 50 Å.

EXAMPLE 9

A pregrooved and preformatted polycarbonate disk substrate was set in a sputtering apparatus with ternary targets, and was rotated at a distance of 10 cm from the target.

A ZnS protective layer of 1000 Å in thickness was formed by sputtering from a first target in argon gas, with a sputtering speed of 100 Å/min. and a sputtering pressure of $5 \times 10^{-3}$ Torr. Then a TbFe alloy was sputtered from a second target, in argon gas, with a sputtering speed of 100 Å/min. and a sputtering pressure of $5 \times 10^{-3}$ Torr to obtain a first magnetic layer composed of $Tb_{18}Fe_{82}$ with a thickness of 500 Å, $T_L$=ca. 140° C. and $H_H$=ca. 5 KOe.

Then a Co adjusting layer was formed with a thickness of 10 Å, by sputtering in argon gas with a sputtering pressure of $5 \times 10^{-3}$ Torr. Then TbFe and Co were simultaneously sputtered from second and third targets in argon gas with a sputtering pressure of $5 \times 10^{-3}$ Torr to obtain a second magnetic layer composed of $Tb_{15}Fe_{68}Co_{17}$ with a thickness of ca. 200 Å, $T_H$=ca. 250° C. and $H_L$=ca. 2 KOe.

Subsequently a ZnS protective layer of 3000 Å in thickness was formed by sputtering from the first target in argon gas, with a sputtering speed of 100 Å/min. and a sputtering pressure of $5 \times 10^{-3}$ Torr.

After forming these layers, the above-mentioned substrate was adhered to a polycarbonate plate with hot-melt adhesive material to obtain a magnetooptical disk. Said disk was mounted on a record/reproducing apparatus and was made to pass through, with a linear speed of 8 m/sec., a unit for generating a magnetic field of 2.5 KOe. The recording was then conducted with a laser beam of a wavelength of 830 nm, concentrated to ca. 1 μm and modulated in two levels of 4 and 8 mW, with a duty ratio of 50% and a frequency of 2 MHz. The bias magnetic field was 100 Oe. Binary signals could be reproduced by irradiation with a laser beam of 1.5 mW.

The above-explained experiment was repeated with a magnetooptical disk already recorded over the entire surface. The previously recorded signal components were not detected in the reproduction, so that the possibility of overwriting was thus confirmed.

The adjusting layer was composed of Co in the foregoing embodiment, but it may also be composed of a magnetic material of which easy direction of magnetization is positioned longitudinally along the disk surface at room temperature but vertically to the disk surface at the recording temperature. The use of such material reduces the magnetic wall energy between the magnetic layers at room temperature and provides a larger exchange force to the magnetic layers at recording, thereby providing a magnetooptical recording medium enabling overwrite recording with a smaller bias magnetic field and superior in the stability of the record bits. Such structure will be shown in the following examples.

A sample for exchange force measurement was prepared by sputtering, on a slide glass, a first magnetic layer of $Tb_{18}Fe_{82}$ of 500 Å in thickness, then an adjusting layer of Fe or $Tb_{25}Fe_{70}Co_5$ in various thicknesses, and a second magnetic layer of $Tb_{22}Fe_{70}Co_8$ of 500 Å in thickness. The first magnetic layer showed a coercive force of 12 KOe, with prevailing Fe sub-lattice magnetization, while the second magnetic layer showed a coercive force of 6 KOe, with prevailing Tb sub-lattice magnetization.

Figure 14:
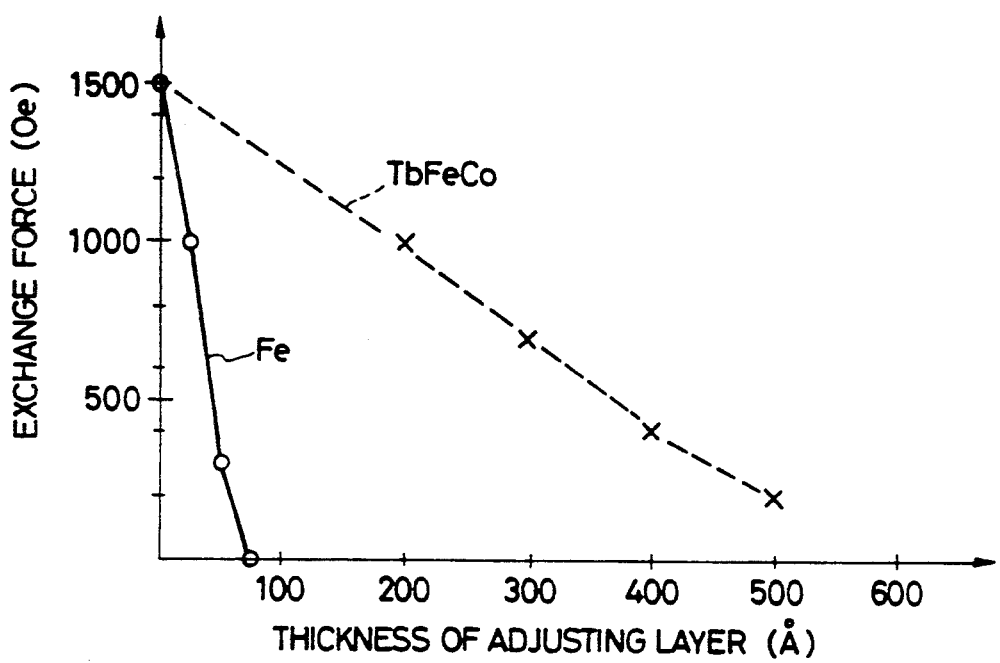
FIG. 14 is a chart showing the relation between the thickness of the adjusting layer and the exchange force of the magnetic layers, in the medium shown in FIG. 13.

Each sample was subjected to the measurement of the external magnetic field inducing the inversion of magnetization of the first and second magnetic layers, in a VSM and in the presence of an external magnetic field. In a decreasing magnetic field, the samples showed an inversion of magnetization of the second magnetic layer into a stable (opposite) direction with respect to that of the first magnetic layer. The exchange force applied to the second magnetic layer was determined from such inversion-inducing magnetic field, as shown in FIG. 14, which indicates the exchange force on the second magnetic layer in ordinate and the thickness of the adjusting layer (Fe or TbFeCo) in abscissa.

As will be apparent from this chart, the exchange force is annulated even at a layer thickness of 70 Å with a Fe layer having a longitudinal easy direction of magnetization. On the other hand, in case of the $Tb_{25}Fe_{70}Co_5$ with a coercive force of ca. 300 Oe and with a vertical easy direction of magnetization, parallel to those of the first and second magnetic layer, the exchange force is still effective even at a layer thickness of 500 Å.

Therefore, the stability of record bits and the stable recording characteristic can be both obtained by forming, between the first and second magnetic layers, an adjusting layer of a material of which easy direction of magnetization is longitudinal at room temperature but is vertical at the recording temperature.

Temperature-dependent change of easy direction of magnetization is already known in substances showing spin rearrangement. For example, $DyCo_5$, reported by M. Ohkoshi and H. Kobayashi in Physica, 86–88B (1977), p. 195-196, exhibits a change of the easy direction of magnetization from longitudinal to vertical in a temperature range of 50°–100° C. Similar results are known in compounds in which Dy is replaced by another rare earth element such as Nd, Pr or Tb, or in which Co is replaced by another transition metal such as Fe or Ni. Also Tsushima reported, in Oyo Buturi, 45, 10 (1976), p. 962–967, the spin rearrangement in rare earth orthoferrites and rare earth orthochromites. A suitable modification of the composition of these substances allows to achieve a change of the easy direction of magnetization from longitudinal to vertical state in the recording temperature range.

Also it is already known that a thin magnetic film has to satisfy a condition:

$$H_k \geq 4\pi M_s$$

in order to have a magnetization vertical to the film surface, wherein $M_s$ is the saturated magnetization and $H_k$ is the uniaxial anisotropic magnetic field in said vertical direction.

Therefore, in order that the adjusting layer has the easy magnetization axis in the longitudinal direction at room temperature and in the vertical direction at the recording temperature range, it is desirable to select the Curie point of said adjusting layer in the vicinity of said recording temperature. Since $M_s$ shows a rapid decrease in the vicinity of the Curie point, a substance showing a relation $H_k < 4\pi M_s$ at room temperature may show a relation $H_k \geq 4\pi M_s$ in the recording temperature range. As the component vertical to the substrate surface increases by the magnetization of the adjusting layer, said magnetization is further oriented vertical to the substrate surface by the exchange forces from the first and second magnetic layers. The exchange forces $H_{eff(1-2)}$ and $H_{eff(2-3)}$ working on the adjusting layer respectively from the first and second magnetic layers can be represented by:

$$H_{eff(1-2)} = \sigma_{w12}/2M_{s2}h_2$$

$$H_{eff(2-3)} = \sigma_{w23}/2M_{s2}h_2$$

wherein $M_{s2}$ is the saturation magnetization of the adjusting layer, $h_2$ is the thickness thereof, and $\sigma_{w12}$ $\sigma_{w23}$ are magnetic wall energies respectively between the first magnetic layer and the adjusting layer and between the second magnetic layer and the adjusting layer.

Therefore, in order to orient the magnetization of the adjusting layer in a direction vertical to the film surface in the recording temperature range by means of said exchange forces $H_{eff(1-2)}$ and $H_{eff(2-3)}$, it is advantageous to select a small saturation magnetization $M_s$ and a thickness $h_2$, as long as the easy direction of magnetization remains longitudinal at room temperature.

EXAMPLE 10

A pregrooved and preformatted polycarbonate disk substrate was placed in a sputtering apparatus with quaternary targets, and was rotated at a distance of 10 cm from the targets.

A Si protective layer of 500 Å in thickness was sputtered from a first target, in argon gas, with a sputtering speed of 100 Å/min., and a sputtering pressure of $5 \times 10^{-3}$ Torr. Then a GdTbFe alloy was sputtered from a second target, in argon gas, with a sputtering speed of 100 Å/min. and a sputtering pressure of $5 \times 10^{-3}$ Torr to obtain a first magnetic layer composed of $Tb_{12}Gd_{10}Fe_{78}$ with a thickness of 300 Å, $T_L$=ca. 150° C. and $H_H$=ca. 8 KOe. Fe was prevailing in the sub-lattice magnetization of the first magnetic layer.

Then a TbFeCo alloy was sputtered from a third target, in argon gas, with a sputtering speed of 100 Å/min. and a sputtering pressure of $5 \times 10^{-3}$ Torr to obtain an adjusting layer, composed of $Tb_{35}Fe_{60}Co_5$ having a thickness of 200 Å and a coercive force of almost zero at the Curie temperature of ca. 170° C. The easy direction of magnetization of said adjusting layer was neither longitudinal nor vertical, and the external magnetic field required for orienting the magnetization in either direction was ca. 2.5 KOe.

Then a TbFeCo alloy was sputtered from a fourth target, in argon gas, with a sputtering speed of 100 Å/min and a sputtering pressure of $5 \times 10^{-3}$ Torr to obtain a second magnetic layer composed of $Tb_{24}Fe_{68}Co_8$ with a thickness of 300 Å, $T_H$=ca. 180° C. and $H_L$=ca. 1.5 KOe. Tb was prevailing in the sub-lattice magnetization of said second magnetic layer.

Subsequently a Si protective layer of 1000 Å in thickness was formed by sputtering from the first target, in argon gas, with a sputtering speed of 100 Å/min. and a sputtering pressure of $5 \times 10^{-3}$ Torr.

After forming these layers, the above-mentioned substrate was adhered to a polycarbonate plate with hot-melt adhesive material to obtain a magnetooptical disk.

The effective bias magnetic field, caused by the exchange force on the second magnetic layer, was almost zero in thus prepared magnetooptical disk, when measured in the same manner as in FIG. 14.

Said magnetooptical disk was mounted on a record-/reproducing apparatus and was made to pass through, with a linear speed of ca. 8 m/sec., a unit generating a magnetic field of 2.5 KOe. The recording operation was then conducted with a laser beam of a wavelength of 830 nm, concentrated to ca. 1 μm and modulated in two levels of 4 and 8 mW, with a duty ratio of 50% and a frequency of 2 MHz. The bias magnetic field was 100 Oe. Binary signals could be reproduced by irradiation with a laser beam of 1.5 mW.

The above-explained experiment was repeated with a magnetooptical disk already recorded over the entire surface. The previously recorded signal components were not detected in the reproduction, so that the possibility of overwriting was confirmed.

EXAMPLE 11

Samples of the magnetooptical disk were prepared with the same process and materials as in the Example 10, except that the material and thickness of the adjusting layer were varied.

The prepared samples were subjected to the measurements of the effective bias field caused by the exchange force on the second magnetic layer and the recording characteristic in the same manner as in the Example 10. The results are summarized in Tab. 4.

TABLE 4

| Example | Adjusting layer | Thickness of adjusting la. | Effective bias field on 2nd layer | Recording characteristic |
|---|---|---|---|---|
| 10 | $Tb_{35}Fe_{60}Co_5$ | 200 Å | 0 Oe | Good |
| 11-1 | None | — | 2000 Oe | First-type record not possible |
| 11-2 | $Fe_{70}Cr_{30}$ | 40 Å | 200 Oe | Good |
| 11-3 | $DyCo_5$ | 200 Å | 0 Oe | Good |
| 11-4 | $Sm_{0.7}Fe_{0.3}FeO_3$ | 150 Å | 300 Oe | Good |
| 11-5 | Si | 40 Å | 250 Oe | First-type record sensitivity low, bit error rate high |
| 11-6 | Si | 60 Å | 150 Oe | First-type record not possible |

The sample 11-1 was not provided with the adjusting layer. In this case stable record bits could not be formed because the effective bias magnetic field, required for orienting the magnetization of the second magnetic layer in a direction stable with respect to that of the first magnetic layer, was larger than the coercive force of the second magnetic layer.

The $Fe_{70}Cr_{30}$ film employed in the sample 11-2 has a Curie point lower than 200° C. and a longitudinal easy axis of magnetization. With a thickness not exceeding 30 Å, the magnetization was oriented in the vertical direction by the exchange forces from the first and second magnetic layers. Therefore the effective bias field on the second magnetic layer became larger and stable recording could not be achieved. On the other hand, with a thickness of 100 Å or larger, vertical magnetization was not induced in the recording temperature range due to the excessively large saturation magnetization, so that the recording was not made due to the absence of the exchange force.

DyCo$_5$ (magnetic transition point 50°–80° C.) and Sm$_{0.7}$Er$_{0.3}$FeO$_3$ (magnetic transition point ca. 110° C.) employed in the samples 11-3 and 11-4 provided satisfactory recording in a thickness range of 100–400 Å. This result is based on a change of the easy axis of magnetization from the longitudinal direction to the vertical direction in the recording temperature range (50°–150° C.), despite of the fact that the effective bias field on the second magnetic layer is almost zero at room temperature.

Si employed in the samples 11-5 and 11-6 is not magnetic. With a thickness of 40–60 Å, the Si layer hinders the exchange coupling between the first and second magnetic layers, so that the measured effective bias field on the second magnetic layer was as small as 250-150 Oe. This effective bias field decreased with the rise of temperature, so that the first-type recording, in which the magnetization of the first magnetic layer is arranged in a direction stabler with respect to the magnetization of the second magnetic layer against the bias field was not possible at the recording temperature range.

Figure 15:
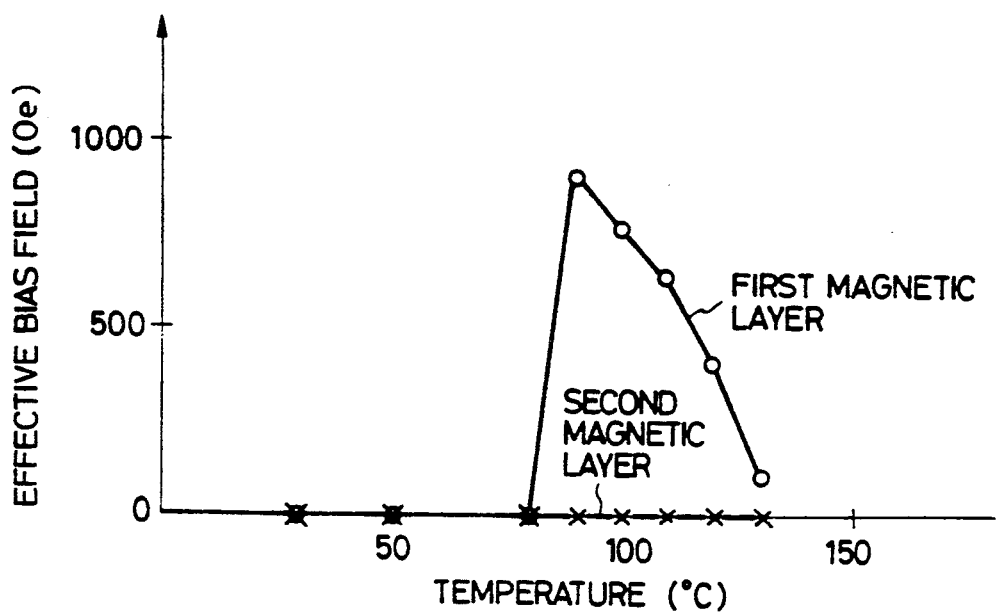
FIG. 15 is a chart showing the temperature characteristic of the effective bias magnetic field of the magnetic layers in the medium shown in FIG. 13.

FIG. 15 shows the effective bias fields on the first or second magnetic layer in ordinate, as a function of temperature in abscissa, measured on the sample of the Example 10.

The first magnetic layer receives no effective bias field up to 80° C., but receives, from 90° C., a bias field for orienting the magnetization of said first magnetic layer in a stable direction with respect to the second magnetic layer. Said bias field monotonously decreased above 90° C. to reach zero at the Curie point of the first magnetic layer. The second magnetic layer received no bias field over the entire temperature range measured. These results coincide with the satisfactory recording characteristic of the magnetooptical disk of the Example 10.

Figure 16:
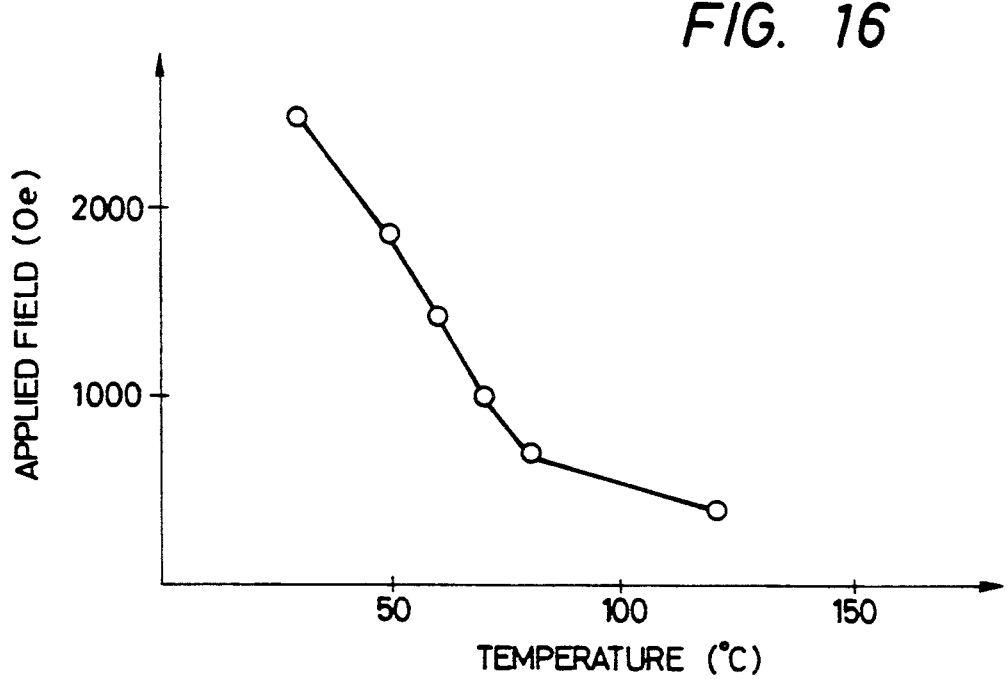
FIGS. 16 and 17 are charts showing the temperature characteristic of the magnetic field required for orienting the magnetization of the adjusting layer in the perpendicular direction.

Then a sample was prepared by sputtering an adjusting layer of Tb$_{35}$Fe$_{60}$Co$_5$, employed in the Example 10, with a thickness of 1000 Å on a slide glass, and by forming a Si$_3$N$_4$ protective layer of 1000 Å in thickness thereon. FIG. 16 shows the external magnetic field required to orient the magnetization of said Tb$_{35}$Fe$_{60}$Co$_5$ layer into the vertical direction, in ordinate, as a function of temperature in abscissa, measured on the above-mentioned sample. The magnitude of said required external field decreases with the rise of temperature, and becomes about 500 Oe in the temperature range of 80°–90° C. where the first magnetic layer starts to receive a large bias field. In the sample of the Example 10, it is assumed that the magnetization of the adjusting layer is oriented, with the rise of temperature, in the vertical direction at the interface between the first magnetic layer and the adjusting layer owing to the exchange force at said interface, and the magnetization of the adjusting layer in the vicinity of the interface with the second magnetic layer is also oriented in the vertical direction in a temperature range of 80°–90° C., so that a large effective bias field emerges in this state between the first and second magnetic layers through the adjusting layer.

The above-mentioned adjusting layer, composed of a rare earth-transition metal alloy, can be optimized in composition, in consideration of the following factors:

(i) The rare earth-transition metal alloy shows a magnetic anisotropy in the vertical direction, when the rare earth element represents a range 12–28 atomic % in the rare earth and transition metal elements. Outside said range, the easy axis of magnetization is in the longitudinal direction or in the direction of surface, possibly because of following two reasons. Firstly, the condition $H_k \geq 4\pi M_s$ for realizing a vertical magnetization cannot be satisfied, because of the large saturation magnetization $M_s$, wherein $H_k$ being the vertical anisotropic magnetic field. Secondly, the vertical magnetic anisotropy in a rare earth-transition metal alloy film is caused by the coupling of the rare earth element and the transition metal element. The magnetic moment of the rare earth-transition metal element pair has a high probability of orientation in the vertical direction only in the above-mentioned percentage.

(ii) The rare earth-transition metal alloy employed in the adjusting layer, if rich in the rare earth element compared with the compensation composition, is increased in the rare earth content from a composition showing vertical magnetic anisotropy thereby increasing the saturation magnetization and facilitating the magnetization in the longitudinal direction. If the alloy is rich in the transition metal element compared with the compensation composition, the transition metal is increased further from the composition showing vertical magnetic anisotropy, thereby increasing the saturation magnetization and facilitating the magnetization in the longitudinal direction. If the curie point of the material is selected in the vicinity of the recording temperature, the saturation magnetization decreases in the vicinity of the recording temperature, thereby satisfying the condition $H_k \geq 4\pi M_s$ for vertical magnetization. In this manner it is possible to orient the easy axis of magnetization in the surface direction at room temperature and in the vertical direction at the recording temperature.

The change of the easy axis of magnetization of the adjusting layer from the surface or longitudinal direction to the vertical direction was experimentally confirmed in the following manner.

Three samples were prepared by sputtering, on glass substrates, magnetic layers of Fe, Tb$_5$Gd$_5$Fe$_{90}$ or Tb$_{16}$Gd$_{16}$Fe$_{68}$ of a thickness of 500 Å as an adjusting layer, under an argon pressure of $5 \times 10^{-3}$ Torr. On each sample a second magnetic layer of Tb$_{24}$Fe$_{74}$Co$_6$ of a thickness of 500 Å was formed without breaking the vacuum, and a Si$_3$N$_4$ protective layer of 700 Å in thickness was formed thereon.

Each sample was subjected to the measurement of the external magnetic field required to orient the magnetization of the adjusting layer into the vertical direction, as a function of temperature.

Fe, Tb$_5$Gd$_5$Fe$_{90}$ or Tb$_{16}$Gd$_{16}$Fe$_{68}$ employed as the adjusting layer did not have a vertical easy axis of magnetization at room temperature.

Figure 17:
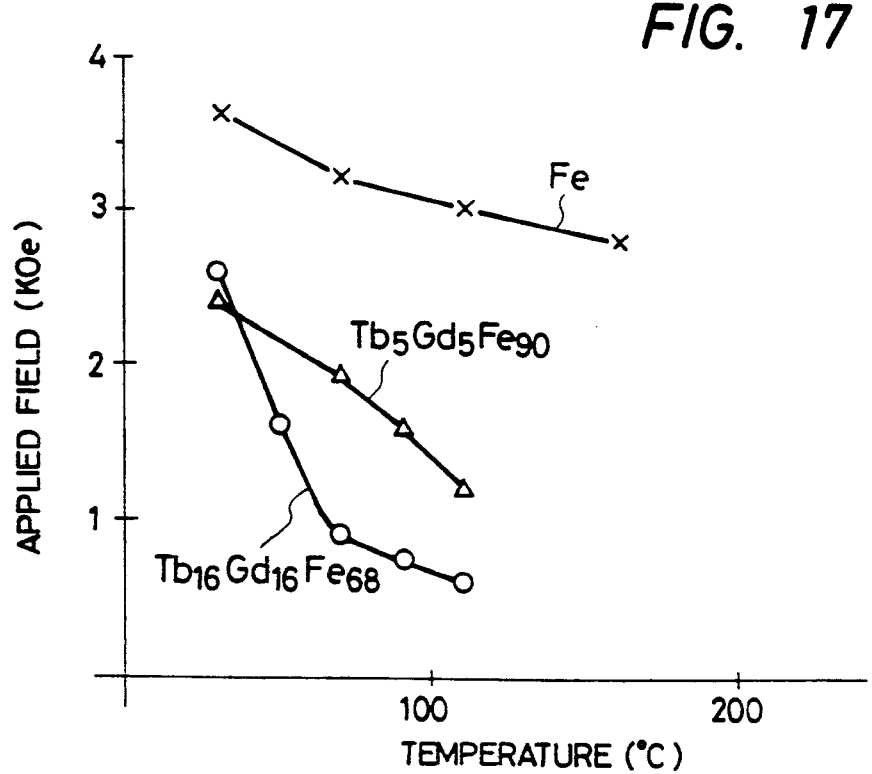

FIG. 17 shows the external magnetic field required for vertical orientation in ordinate, as a function of the temperature in abscissa, obtained in said measurement.

The adjusting layer composed of Fe did not show orientation of the magnetization into the vertical direction, since the decrease of saturation magnetization is still small at 160° C. The $Tb_5Gd_5Fe_{90}$ and $Tb_{16}Gd_{16}Fe_{68}$, both being rare earth-transition metal alloy and having the easy direction of magnetization also in the surface direction, show a significant decrease in magnetization because the Curie point is in a range of 100°-200° C. Thus the magnetization can be oriented in the vertical direction with a limited external magnetic field when heated to about 100° C. Particularly $Tb_{16}Gd_{16}Fe_{68}$, which is richer in the rare earth element compared to the compensation composition, shows easier orientation of the magnetization in the vertical direction with a smaller external field at a higher temperature, in comparison with $Tb_5Gd_5Fe_{90}$ which is richer in the transition metal element.

Besides the required external field becomes smaller, in the temperature range of 70°-80° C., than the coercive force of the second magnetic layer. A measurement for identifying whether the external magnetic field required for inverting the magnetization of the adjusting layer is dependent on the direction of magnetization of the second magnetic layer, namely whether an exchange force exists between the adjusting layer and the second magnetic layer, clarified that no exchange force was present at room temperature but a bias field caused by an exchange force of ca. 200 Oe was present at 90° and 110° C.

$Tb_{16}Gd_{16}Fe_{68}$, richer in the rare earth element than the compensation composition, shows an enhanced orientation of the easy direction of magnetization in the vertical direction at higher temperatures because of the following two reasons.

Firstly, it is empirically known that, in an exchange-coupled combination of the adjusting layer and the second magnetic layer, a stronger exchange force is obtained in a combination in which both layers are rich in the rare earth element or in the transition metal than in a combination in which one layer is rich in the rare earth element while the other is rich in the transition metal. Thus the adjusting layer is early oriented in the vertical direction, since the second magnetic layer is a magnetic film vertically oriented to the film surface.

Secondly, the rare earth elements have lower Curie points in isolated state. Thus, in the rare earth-transition metal alloys, the rare earth element contributes more significantly to the decrease of magnetization at higher temperatures, if the composition is rich in the rare earth element. For this reason the compensation temperature is present above room temperature.

A composition not showing vertical easy direction of magnetization because of the excessively large magnetization of the rare earth element shows a decrease of magnetization of said rare earth element at higher temperatures, so that the magnetization is represented by the magnetizations of the rare earth element and the transition metal which originally have vertical magnetic anisotropy.

EXAMPLE 12

A pregrooved and preformatted polycarbonate disk substrate was placed in a sputtering apparatus with quaternary targets, and was rotated at a distance of 10 cm from the targets A $Si_3N_4$ protective layer of 700 Å in thickness was formed by sputtering from a first target, in argon gas, with a sputtering speed of 100 Å/min , and a sputtering pressure of $5 \times 10^{-3}$ Torr. Then a TbDyFeCo alloy was sputtered from a second target, in argon gas, with a sputtering speed of 100 Å/min. and a sputtering pressure of $5 \times 10^{-3}$ Torr to obtain a first magnetic layer of $Tb_{15}Dy_5Fe_{76}Co_4$ with a thickness of 300 Å, $T_L$=ca. 150° C. and $H_H$=ca. 10 KOe. Fe and Co atoms were prevailing in the sub-lattice magnetization of the first magnetic layer Then a TbGd Fe alloy was sputtered from a third target, in argon gas, with a sputtering speed of 100 Å/min. and a sputtering pressure of $5 \times 10^{-3}$ Torr to form an adjusting layer of $Tb_{16}Gd_{16}Fe_{68}$ with a thickness of 200 Å, and Curie point of ca 160° C. Said adjusting layer did not show a vertical easy direction of magnetization at room temperature, and the external magnetic field required for orienting the magnetization into the vertical direction was ca. 2 KOe at room temperature. Then a TbGdFeCo alloy was sputtered from a fourth target, in argon gas, with a sputtering speed of 100 Å/min. and a sputtering pressure of $5 \times 10^{-3}$ Torr to obtain a second magnetic layer of $Tb_{20}Gd_5Fe_{67}Co_8$ with a thickness of 300 Å, $T_H$=ca. 190° C. and $H_L$=ca. 1.8 KOe. Tb and Gd were prevailing in the sub-lattice magnetization of said second magnetic layer.

Subsequently a $Si_3N_4$ protective layer of 800 Å in thickness was formed by sputtering from the first target, in argon gas, with a sputtering speed of 100 Å/min. and a sputtering pressure of $5 \times 10^{-3}$ Torr.

After these layer formations, the above-mentioned substrate was adhered to a polycarbonate plate with hot-melt adhesive material to obtain a magnetooptical disk.

Then there was made a measurement, with VSM (vibrating magnetization measurer), of the external magnetic field inducing the inversion of magnetization of the first and second magnetic layers The effective bias field cause by the exchange force on the second magnetic field was identified as almost zero.

Said magnetooptical disk was mounted on a record-/reproducing apparatus and was made to pass through, with a linear speed of ca. 8 m/sec., a unit generating a magnetic field of 2.5 KOe. The recording operation was then conducted with a laser beam of a wavelength of 830 nm, concentrated to ca. 1 μm and modulated in two levels of 4 and 8 mW, with a duty ratio of 50% and a frequency of 2 MHz. The bias field at recording was 150 Oe. Binary signals could reproduced by irradiation with a laser beam of 1.0 mW.

The above-explained experiment was repeated with a magnetooptical disk already recorded over the entire surface. The previously recorded signal components were not detected in the reproduction, so that the possibility of overwriting was thus confirmed.

EXAMPLE 13

Samples of the magnetooptical disk were prepared with the same process and materials as in the Example 12, except that the composition of the adjusting layer was modified.

Then there were measured the effective bias magnetic field caused by the exchange force on the second magnetic layer, and the recording characteristic, according to the same methods as in the Example 12. The results are summarized in Tab. 5.

TABLE 5

| Example | Adjusting layer | Note | Easy direction of magnetization | Coercive force of adj. layer | Effective bias field on 2nd mag. layer | Recording characteristic |
|---|---|---|---|---|---|---|
| 13-1 | $Tb_{2.5}Gd_{2.5}Fe_{95}$ | Fe rich | Surface | — | 0 | Not good (1st type recording not possible) |
| 13-2 | $Tb_5Gd_5Fe_{90}$ | " | " | — | 0 | Not good (1st type recording sensitivity low) |
| 13-3 | $Tb_7Gd_7Fe_{86}$ | " | Vertical | 0.3 KOe | 0.5 KOe | Not good (1st type recording not possible) |
| 13-4 | $Tb_9Gd_9Fe_{82}$ | " | " | 1.5 | 2.5 | Not good (1st type recording not possible) |
| 13-5 | $Tb_{10}Gd_{10}Fe_{80}$ | " | " | 7 | 2.5 | Not good (1st type recording not possible) |
| 13-6 | $Tb_{12}Gd_{12}Fe_{76}$ | Tb, Gd rich | " | 5 | 2.5 | Not good (1st type recording not possible) |
| 13-7 | $Tb_{13}Gd_{13}Fe_{74}$ | " | " | 1 | 2.0 | Not good (1st type recording not possible) |
| 13-8 | $Tb_{15}Gd_{15}Fe_{70}$ | " | Surface | — | 0 | Good |
| 13-9 | $Tb_{20}Gd_{20}Fe_{60}$ | " | " | — | 0 | Good |
| 13-10 | $Tb_{25}Gd_{25}Fe_{50}$ | " | " | — | 0 | Good |
| 13-11 | $Tb_{40}Gd_{40}Fe_{20}$ | " | " | — | 0.1 | Not good (1st type recording sensitivity low) |

In Tab. 5, the column "Note" indicates whether the composition of the adjusting layer is rich in Fe or in Tb and Gd.

Satisfactory recording characteristic was found in the samples 13-8 to 13-10, in which the rare earth elements (Tb, Gd) represented 20-50 atomic % in the adjusting layer.

All the samples were easy to magnetize in the surface direction, as these compositions were rich in the rare earth elements of Tb and Gd, compared to the compensation composition.

In the samples 13-1 to 13-3, the effective bias field on the second magnetic layer was almost zero because the adjusting layer was rich in the transition metal (Fe), but the recording of first type could not be achieved in stable manner, because the bias field caused by the exchange force between the first and second magnetic layers and acting to orient the magnetization of these layers in stable directions was small.

The samples 13-4–13-7, having a vertically magnetized adjusting layer, shows an effective bias field on the second magnetic layer in the order of 2.0 to 2.5 KOe, larger than the coercive force thereof. The recording of first type could be made in these samples, since the magnetization of the second magnetic layer is always oriented in a stable direction with respect to the magnetization of the first magnetic layer.

The sample 13-8 had the highest proportion of the rare earth element and a Curie point lower than 100° C. The recording of first type could be made satisfactorily because there was no sufficient bias field caused by the exchange force between the first and second magnetic layers at the recording temperature.

EXAMPLE 14

In the samples of the Example 13, the compositions of the first magnetic layer, adjusting layer and second magnetic layer were respectively rich in the transition metal, rich in rare earth element and rich in rare earth element.

In the present example, samples were prepared with same thicknesses, materials and structures as those in the Example 13, except that the first and second magnetic layers and the adjusting layer were selected from a transition metal-rich composition (TM) and a rare earth-rich composition (RE) of a same coercive force and a same Curie temperature. The samples were evaluated in the same manner as in the Example 13, as summarized in Tab. 6.

TABLE 6

| | Structure | | | Effect. bias | |
|---|---|---|---|---|---|
| Sample | 1st mag. layer | Adjust. layer | 2nd mag. layer | field on 2nd mag. layer | Recording characteristic |
| 14-1 | TM | TM | TM | 1 KOe | Not good (1st type recording not possible) |
| 14-2 | TM | RE | TM | 0 | Not good (1st type recording sensitivity low) |
| 14-3 | RE | TM | TM | 0 | Not good (1st type recording sensitivity low) |
| 14-4 | RE | RE | TM | 0 | Not good (1st type recording sensitivity low) |

TABLE 6-continued

| | Structure | | | Effect. bias | |
|---|---|---|---|---|---|
| Sample | 1st mag. layer | Adjust. layer | 2nd mag. layer | field on 2nd mag. layer | Recording characteristic |
| 14-5 | RE | TM | RE | 0 | Not good (1st type recording unstable) |
| 14-6 | RE | RE | RE | 1 | Not good (1st type recording not possible) |
| 14-7 | TM | TM | RE | 0 | Not good (1st type recording sensitivity low) |

TABLE 7

| Layer | Type | Composition | Coercive force | Curie point |
|---|---|---|---|---|
| 1st mag. layer | TM | $Tb_{15}Dy_5Fe_{76}Co_4$ | 10 KOe | 150° C. |
| | RE | $Tb_{16.5}Dy_{5.5}Fe_{74}Co_4$ | 10 Field for vertical orientation | 150° C. |
| Adjust. layer | TM | $Tb_6Gd_6Fe_{88}$ | 2 KOe | 150° C. |
| | RE | $Tb_{16}Gd_{16}Fe_{68}$ | 2 | 150° C. |
| 2nd mag. layer | TM | $Tb_{12}Gd_3Fe_{80}Co_5$ | 1.8 | 190° C. |
| | RE | $Tb_{20}Gd_5Fe_{67}Co_8$ | 1.8 | 190° C. |

In Tab. 6 there are shown, corresponding to the coercive force of the adjusting layer, the values of external magnetic field required for orienting the magnetization into the vertical direction. As will be apparent from Tab. 7, the samples 14-1 to 14-4, with transition metal-rich second magnetic layer, showed a larger decrease in the coercive force at an elevated temperature than in the samples of the Example 13 with rare earth-rich composition, so that the coercive force of the second magnetic layer became insufficient for forming stable bits at the temperature of recording of first type. For this reason there was encountered a low sensitivity for the recording of first type or unstable recording.

The samples 14-3 to 14-6, with rare earth-rich first magnetic layers, showed a smaller decrease of the coercive force at the elevated temperature, in comparison with the transition metal-rich compositions in the Example 13. Consequently the condition $H_H - H_{Heff} < 0$ for recording in the first magnetic layer at the estimated recording temperature of the first type. Thus the recording of first type could not be conducted, or the sensitivity therefor was low.

Also the samples 14-1, 14-2, 14-5 and 14-6, in which the first and second magnetic layers were both rich in the rare earch element or in the transition metal, showed a strong exchange force even at a relatively low temperature when the medium was heated, and the recording of first type was only conducted unstable in all these samples, because the magnetization of the second magnetic layer was oriented in the stable direction with respect to that of the first magnetic layer.

The samples 14-1, 14-3, 14-5 and 14-7, with transition metal-rich adjusting layers, showed a smaller bias magnetic field caused by the exchange force acting on the first and second magnetic layers through the adjusting layer, in comparison with the samples of the Example 13 with rare earth-rich adjusting layers. Consequently the sensitivity for the recording of first type was lowered.

From the foregoing results it can be concluded that the optimum combination of the compositions of the first and second magnetic layers and the adjusting layer corresponds to the case of the Example 13, in which the first magnetic layer, adjusting layer and second magnetic layer are respectively rich in transition metal, rare earth element and rare earth element.

In the foregoing examples, the recording film has triple-layered structure consisting of the first and second magnetic layers and the adjusting layer, but it is also possible to form, between the first magnetic layer and the substrate, a fourth magnetic layer of a strong magnetooptical effect in strong exchange-coupling with the first magnetic layer. In such case the sum of the thicknesses of said first and fourth magnetic layers is preferably in excess of 200 Å for increasing the reproduction output.

In the following there will be given more detailed explanation on the structure of the magnetooptical recording medium of the present invention and variations thereof.

Thickness of Magnetic Layer

In the medium shown in FIG. 3, the thickness L1 of the first magnetic layer 2 and the thickness L2 of the second magnetic layer 3 are preferably determined in the following manner.

In the conventional exchange-coupled double-layered film, the magnetization of a record bit in either of two states is inverted in two magnetic layers according to the state to be recorded. On the other hand, in the present invention, the magnetization of the first magnetic layer 2, principally related to the reproduction, is inverted according to the state to be recorded, while the magnetization of the second magnetic layer 3, principally related to the recording, coincides with the direction of the field from the magnetic field generating unit 8 shown in FIG. 6 and remains unchanged. Since the sensitivity of the magnetooptical recording medium is lowered as the thickness of the magnetic layer not contributing to the magnetooptical effect increases, it is necessary to minimize the total thickness L1+L2 of said magnetic film and to optimize the combination of L1 and L2 so as to increase the magnetooptical effect at the reproduction. As will be explained in the following examples, the layer thicknesses should satisfy following conditions:

$$600 \text{ Å} \geq L1 + L2 \geq 1000 \text{ Å}$$

$$200 \text{ Å} \geq L1$$

in order to obtain a satisfactory sensitivity and a large magnetooptical effect.

EXAMPLE 15

A pregrooved and preformatted polycarbonate disk substrate was set in a sputtering apparatus with ternary targets, and was rotated at a distance of 10 cm from the targets.

A ZnS protective layer of 800 Å in thickness was formed by sputtering from a first target, in argon gas, with a sputtering speed of 100 Å/min. and a sputtering pressure of $5 \times 10^{-3}$ Torr. Then a TbFe alloy was sputtered, in argon gas, from a second target with a sputtering speed of 100 Å/min. and a sputtering pressure of $5 \times 10^{-3}$ Torr to obtain a first magnetic layer of $Tb_{19.5}Fe_{80.5}$ with a thickness of 300 Å, $T_L$=ca. 140° C. and $H_H$=ca. 8 KOe.

Then a TbFeCo alloy was sputtered, in argon gas, with a sputtering pressure of $5 \times 10^{-3}$ Torr to obtain a second magnetic layer of $Tb_{24.5}Fe_{68}Co_{7.5}$ with a thickness of 400 Å, $T_H$=ca. 190° C. and $H_L$=ca. 0.8 KOe.

Subsequently a ZnS protective layer of 3000 Å in thickness was formed by sputtering, in argon gas, from the first target with a sputtering speed of 100 Å/min. and a sputtering pressure of $5 \times 10^{-3}$ Torr.

After these layer formations, the above-mentioned substrate was adhered to a polycarbonate plate with hot-melt adhesive material to obtain a magnetooptical disk. (600 Å<L1+L2=700 Å<1000 Å, 200 Å<L1=300 Å)

Said magnetooptical disk was set on a record/reproducing apparatus, and was made to pass through, with a linear speed of ca. 8 m/sec., a unit for generating a magnetic field of 2.5 KOe. The recording operation was then conducted with a laser beam of a wavelength of 830 nm, concentrated to ca. 1 μm and modulated in two levels of 4 and 8 mW, with a duty ratio of 50% and a frequency of 2 MHz. The bias field was 100 Oe.

Binary signals could be reproduced by irradiation with a laser beam of 1.5 mW.

The above-explained experiment was repeated on a magnetooptical disk already recorded over the entire surface. The previously recorded signal components were not detected in the reproduction, and the possibility of overwriting was thus confirmed.

EXAMPLE 16

Samples of magnetooptical disk were prepared with the same process and materials as those in the Example 15, except that the thicknesses of the first and second magnetic layers were modified.

For evaluating the reproduction signal from each sample, the reflectance at 830 nm and the Kerr rotation angle were measured. Also there was calculated the product of aquare root of reflectance and Kerr rotation angle, which is usually accepted as an index for the reproducing performance in case the photosensor is composed of a photodiode. These results are summarized in Tab. 8.

TABLE 8 magnetooptical effect (Kerr rotation angle) (°)  
reflectance  
√reflectance × Kerr rotation angle

| First magnetic layer ($L_1$) (Å) | 0 | 100 | 200 | 300 | 400 | 500 | 600 | 700 |
|---|---|---|---|---|---|---|---|---|
| 600 | 44<br>0.195<br>19.4 | | | | 51.3<br>0.178<br>21.6 | | | |
| 550 | | | | | | | | |
| 500 | 38.2<br>0.207<br>17.4 | 45.6<br>0.195<br>20.1 | 50.2<br>0.185<br>21.6 | 52.4<br>0.179<br>22.2 | 53.1<br>0.177<br>22.3 | 53.0<br>0.176<br>22.2 | | |
| 450 | | | | | | | | |
| 400 | 33.1<br>0.211<br>15.2 | 41.7<br>0.203<br>18.8 | 48.2<br>0.191<br>21.1 | 52.4<br>0.182<br>22.3 | 54.5<br>0.176<br>22.9 | 55.3<br>0.173<br>23.0 | | |
| 350 | | | | | | | | |
| 300 | 29.7<br>0.191<br>13.0 | 37.8<br>0.202<br>17.0 | 44.4<br>0.196<br>19.7 | 49.7<br>0.186<br>21.4 | 53.3<br>0.177<br>22.4 | 55.3<br>0.171<br>22.9 | | |
| 250 | | | | | | | | |
| 200 | 27.0<br>0.134<br>9.87 | 33.7<br>0.177<br>14.2 | 37.8<br>0.193<br>16.6 | 41.8<br>0.190<br>18.2 | 45.4<br>0.181<br>19.3 | 48.2<br>0.172<br>20.0 | 49.9<br>0.167<br>20.4 | |
| 150 | 24.0<br>0.093<br>7.31 | 30.9<br>0.151<br>12.0 | 32.8<br>0.184<br>14.0 | 35.0<br>0.191<br>15.3 | 37.7<br>0.186<br>16.2 | 40.1<br>0.177<br>16.9 | 41.9<br>0.170<br>17.3 | 42.9<br>0.165<br>17.4 |
| 100 | 15.6<br>0.051<br>3.52 | 26.4<br>0.117<br>9.04 | 25.9<br>0.168<br>10.6 | 26.0<br>0.191<br>11.3 | 27.1<br>0.193<br>11.9 | 28.6<br>0.186<br>12.3 | 30.0<br>0.178<br>12.7 | 31.0<br>0.172<br>12.8 |
| 50 | 13.0<br>0.019<br>1.81 | 18.3<br>0.077<br>5.06 | 15.8<br>0.145<br>6.03 | 14.4<br>0.188<br>6.24 | 14.1<br>0.203<br>6.37 | 14.6<br>0.201<br>6.52 | 15.2<br>0.193<br>6.67 | 15.7<br>0.186<br>6.79 |

($L_2$) (Å)

In the record bit of the present invention, the magnetization of the second magnetic layer is not changed by the state of record and does not contribute to the magnetooptical effect. In case the first magnetic layer 2 is thin, the intensity of reflected light is reduced and the aforementioned performance index is also reduced if the second magnetic layer 3 is thin or absent.

The intensity of the reflected light becomes almost constant if the total thickness L1+L2 of the first and second magnetic layers 2, 3 exceeds 400 Å.

It is also found out that said performance index and Kerr rotation angle become saturated at substantially constant values when the total thickness L1+L2 of the first and second magnetic layers is equal to or larger than 600 Å, but, if the thickness L1 of the first magnetic layer 2 is less than 200 Å, the Kerr rotation angle is saturated at a smaller value than the saturation value when said thickness L1 is larger than 200 Å even when the thickness L2 of the second magnetic layer 3 is increased. From these results it is concluded that the conditions 600 Å<L1+L2 and 200 Å<L1 are preferable.

These samples were subjected to a test of recording and reproduction in the same manner as in the Example 15, and satisfactory reproduction signal as in the Example 15 was obtained from the samples in which L1+L2 was equal to or larger than 600 Å.

On the other hand, when L1+L2 was equal to 1000 Å, the laser powers required for the recordings of first and second types were respectively 2.5 times of those required when L1+L2 was 600 Å, and said powers rapidly increased when L1+L2 exceeded 1000 Å. Thus a condition L1+L2 <1000 Å was concluded preferable.

As explained in the foregoing, though the second magnetic layer 3 does not change its magnetization during the reproduction of the recorded signals of first and second types, thus not contributing to the magnetooptical effect, the presence of said second magnetic layer provides a Kerr rotation angle and a reproduction performance index equivalent to the case where the first magnetic layer 2 has a thickness L1+L2.

For the purpose of comparison, the reflectance, Kerr rotation angle and performance index were determined by applying a field stronger than the coercive force of the first magnetic layer in each sample, thereby inverting the magnetization of the second magnetic layer 3 as well as that of the first magnetic layer both in the recordings of first and second types, just as in the conventional exchange-coupled double-layered magnetic film. The results are summarized in Tab. 9.

TABLE 9

| First magnetic layer (L₁) (Å) | Second magnetic layer (L₂) (Å) 0 | 50 | 100 | 150 | 200 | 250 | 300 | 350 | 400 | 450 | 500 | 550 | 600 | 650 | 700 |
|---|---|---|---|---|---|---|---|---|---|---|---|---|---|---|---|
| 600 | 43.9 / 0.195 / 19.4 | | 47.6 / 0.186 / 20.5 | | 49.6 / 0.181 / 21.1 | | 50.2 / 0.178 / 21.2 | | 50.0 / 0.178 / 21.1 | | 49.5 / 0.178 / 20.9 | | 49.1 / 0.178 / 20.7 | | |
| 550 | | | | | | | | | | | | | | | |
| 500 | 38.2 / 0.207 / 17.4 | | 43.5 / 0.195 / 19.2 | | 47.6 / 0.185 / 20.5 | | 49.9 / 0.179 / 21.1 | | 50.6 / 0.177 / 21.3 | | 50.3 / 0.176 / 21.1 | | 50.1 / 0.176 / 21.0 | | 49.7 / 0.176 / 20.8 |
| 450 | | | | | | | | | | | | | | | |
| 400 | 33.1 / 0.211 / 15.2 | | 38.6 / 0.203 / 17.4 | | 44.3 / 0.191 / 19.4 | | 48.7 / 0.182 / 20.8 | | 51.2 / 0.176 / 21.5 | | 52.2 / 0.173 / 21.7 | | 52.2 / 0.172 / 21.7 | | 51.9 / 0.172 / 21.5 |
| 350 | | | | | | | | | | | | | | | |
| 300 | 29.7 / 0.191 / 13.0 | | 34.7 / 0.202 / 15.6 | | 40.5 / 0.197 / 18.0 | | 46.4 / 0.186 / 20.1 | | 51.2 / 0.177 / 21.5 | | 54.1 / 0.172 / 22.4 | | 55.3 / 0.169 / 22.7 | | 55.5 / 0.167 / 22.7 |
| 250 | | | | | | | | | | | | | | | |
| 200 | 27.0 / 0.134 / 9.87 | | 33.1 / 0.178 / 14.0 | | 38.0 / 0.194 / 16.7 | | 43.7 / 0.192 / 19.1 | | 49.7 / 0.182 / 21.2 | | 54.7 / 0.174 / 22.8 | | 58.0 / 0.168 / 23.8 | | 59.5 / 0.165 / 24.2 |
| 150 | 24.0 / 0.093 / 7.3 | | 33.1 / 0.153 / 12.9 | | 37.7 / 0.186 / 16.2 | | 42.5 / 0.193 / 18.7 | | 48.3 / 0.187 / 20.9 | | 53.9 / 0.179 / 22.8 | | 58.2 / 0.171 / 24.1 | | 60.8 / 0.167 / 24.8 |
| 100 | 15.6 / 0.051 / 3.52 | | 33.4 / 0.12 / 11.5 | | 38.1 / 0.170 / 15.7 | | 41.7 / 0.193 / 18.3 | | 46.6 / 0.195 / 20.5 | | 52.2 / 0.187 / 22.6 | | 57.2 / 0.179 / 24.2 | | 60.7 / 0.173 / 25.3 |
| 50 | 13.0 / 0.019 / 1.81 | | 33.3 / 0.078 / 9.32 | | 39.5 / 0.147 / 15.1 | | 41.5 / 0.190 / 18.1 | | 44.7 / 0.207 / 20.2 | | 49.4 / 0.202 / 22.2 | | 54.6 / 0.194 / 24.1 | | 58.9 / 0.187 / 25.5 |

Cell values are: reflectance / magnetooptical effect (√reflectance × Kerr rotation angle) / Kerr rotation angle (°)

In this case, large rotation angle and index can be obtained if the thickness of the second magnetic layer is in a range of 300–400 Å, even if the first magnetic layer 2 is thinner than 200 Å, because the second magnetic layer 3 shows a magnetooptical effect induced by the inversion of magnetization, and because the second magnetic layer 3 has a higher Curie point and shows a larger Kerr rotation angle than the first magnetic layer 2 at a same thickness. However the contribution of the second magnetic layer 3 in the magnetooptical effect is negligible when the thickness of the first magnetic layer 2 exceeds 200–250 Å.

These results coincide with those of Tab. 8 that the presence of the second magnetic layer 3 provides a Kerr rotation angle and a performance index equivalent to those when the thickness of the first magnetic layer 2 is equal to L1+L2.

Also when the ZnS protective layers in the samples of the Example 15 are replaced by those of $Si_3N_4$, SiC, SiO or $Al_2O_3$, the relationship of the thicknesses of the first and second magnetic layers providing saturated rotation angle and performance index remains unchanged. SiC, having - refractive index larger than that of $Si_3N_4$ or ZnS, increased the index by about 10%, but the recording sensitivity was lowered for a same thickness L1+L2. On the other hand, SiO or $Al_2O_3$, having refractive indexes lower than those of $Si_3N_4$ or ZnS, decreased the performance index by about 10%.

Also the relationship of the thicknesses of the first and second magnetic layers providing saturated rotation angle and performance index was not affected by a change of the material constituting the first magnetic layer 2, from TbFe to GdTbFe, TdFeCo, GdTbFeCo or DyTbFeCo.

Compensation Temperature of Magnetic Layers

In the magnetooptical recording medium as shown in FIG. 3, the compensation temperature $T_{Hcomp}$ of the second magnetic layer 3 is preferably positioned between room temperature and Curie temperature $T_H$ of said second magnetic layer. Also such medium allows a recording process utilizing said compensation temperature. This process will be explained in the following, separately in a case of $T_L < T_{Hcomp}$ and a case of $T_{Hcomp} < T_L$.

(i) Case $T_L < T_{Hcomp}$

Referring to FIG. 5, in one of the states 4b prior to the first preliminary recording, in which the magnetizations of the first and second magnetic layers are in a same direction, said magnetic layers are stabilized by the exchange force, so that the magnetization of the first magnetic layer can only be inverted by a magnetic field $H_H' + H_{Heff}'$, which are respectively the coercive force of the first magnetic layer and the exchange force acting on said layer at a temperature t and which are both functions of the temperature t, while the magnetization of the second magnetic layer can only be inverted by a magnetic field $H_L' + H_{Leff}'$, which are respectively the coercive force of the second magnetic layer and the exchange force acting on said layer at a temperature t and which are both functions of the temperature t. For this reason the preliminary recording bit 4c can be stably formed, even in the presence of a certain bias field in either direction. However, in the other of the states 4b shown in FIG. 5, in which the magnetizations of the first and second magnetic layers are mutually oppositely directed, each magnetic layer receives an exchange force to invert its magnetization. Thus, there will result a situation (a) or (b) explained in the following.

(a) If a situation $H_H' - H_{Heff}' < 0$ occurs when the magnetic layers are heated close to $T_L$ at the preliminary recording of first type, the magnetization of the first magnetic layer is inverted and arranged in a stable direction with respect to the magnetization of the second magnetic layer, thus completing the preliminary recording of first type.

(b) On the other hand, if a condition $H_L' - H_{Leff}' < 0$ is reached before the inversion of magnetization of the first magnetic layer, the magnetization of the second magnetic layer is inverted and arranged in a stable direction with respect to the magnetization of the first magnetic layer. Therefore, the preliminary recording of first type, requiring the inversion of magnetization of the first magnetic layer, becomes impossible.

Therefore the value of $H_L'$ should be increased as far as possible, and, for this purpose, $H_L$ should be maximized, but can only be increased to ca. 2 KOe because the second magnetic layer needs to be uniformly magnetized by the magnetic field generating unit 8 shown in FIG. 6. Consequently, in order to maximize the coercive force of the second magnetic layer in the vicinity of the temperature $T_L$, it is important to select the compensation temperature $T_{Hcomp}$ of the second magnetic layer close to $T_L$.

In this manner it is rendered possible to prevent the decrease in the coercive force $H_L'$ of the second magnetic layer in the course of heating toward the compensation temperature $T_{Hcomp}$, because the coercive force of the second magnetic layer becomes infinite at the compensation temperature $T_{Hcomp}$ even if the saturation magnetization $M_s$ of the second magnetic layer is decreased.

As will be apparent from the following examples, it is possible to achieve the preliminary recording of the first type in stable manner, by selecting a second magnetic layer satisfying conditions:

$T_L < T_{Hcomp}$; and (coercive force of second layer at temperature $t$)/(coercive force of second layer at room temperature $(= H_H)) > 0.5$.

Among the aforementioned substances, the above-mentioned conditions can be satisfied by a TbGdCo alloy richer in Tb than the compensation composition. Also there may be employed substances obtaining by adding suitable impurities such as another rare earth element or another transition metal to the above-mentioned ternary compound.

EXAMPLE 17

A pregrooved and preformatted polycarbonate disk substrate was set in a sputtering apparatus with ternary targets, and was rotated at a distance of 10 cm from the targets.

After the sputtering apparatus was evacuated to $1 \times 10^{-6}$ Torr or lower, a ZnS protective layer of 1000 Å in thickness was formed by sputtering, in argon gas, from a first target with a sputtering speed of 100 Å/min. and a sputtering pressure of $5 \times 10^{-3}$ Torr. Then a TbFe alloy was sputtered, in argon gas, from a second target with a sputtering speed of 100 Å/min. and a sputtering pressure of $5 \times 10^{-3}$ Torr to obtain a first magnetic layer of $Tb_{18}Fe_{82}$, with a thickness of 300 Å, $T_L$=ca. 130° C. and $H_H$=ca. 10 KOe.

Then a TbFeCo alloy was sputtered, in argon gas, with a sputtering pressure of $5 \times 10^{-3}$ Torr to obtain a second magnetic layer of $Tb_{27}Fe_{64}Co_9$ with a thickness of 500 Å, $T_H$=ca. 190° C., $T_{Hcomp}$=210° C. and $H_L$=ca. 1 KOe.

Subsequently a ZnS protective layer of 3000 Å in thickness was formed by sputtering, in argon gas, from the first target with a sputtering speed of Å and a sputtering pressure of $5 \times 10^{-3}$ Torr.

After these layer formations, the above-mentioned substrate was adhered with a polycarbonate plate with hot-melt adhesive material to obtain a magnetooptical disk.

The second magnetic layer showed a coercive force of ca. 700 Oe around the Curie point (130° C.) of the first magnetic layer, when measured by the method explained in the Example 18.

This magnetooptical disk was mounted on a record-/reproducing apparatus, and was made to pass through, with a linear speed of ca. 8 m/sec., a unit generating a magnetic field of 2.5 KOe. The recording was conducted with a laser beam of a wavelength of 830 nm, concentrated to ca. 1 μm and modulated in two levels of 4 and 8 mW, with a duty ratio of 50% and a frequency of 2 MHz. The bias field was 100 Oe in a direction to invert the magnetization of the second magnetic layer. Binary signals could be reproduced by irradiation with a laser beam of 1.5 mW.

The above-explained experiment was repeated with a magnetooptical disk already recorded over the entire surface. The previously recorded signal components were not detected in the reproduction, and this result confirms that the overwriting is possible.

EXAMPLE 18

According to a process similar to that in the Example 17, there were prepared a magnetooptical disk sample 18-1 having a ZnS layer of 1000 Å, a first magnetic layer of $Tb_{18}Fe_{82}$ of 300 Å, a second magnetic layer of $Tb_{27}Fe_{64}Co_9$ of 500 Å, and a ZnS layer 1000 Å formed in this order on a glass substrate, and a sample 18-2 of the same structure except that the second magnetic layer was replaced by $Tb_{15}Fe_{81}Co_4$.

B-H loops were determined by measuring the magnetic field inducing the inversion of magnetization, by Kerr effect, in the samples 18-1 and 18-2, at various temperatures. In this manner obtained were the temperature characteristic of the coercive force (FIG. 18) and the temperature dependence of the difference of coercive force and exchange force (FIG. 19), for the $Tb_{18}Fe_{82}$ layer (hereinafter called layer A), $Tb_{27}Fe_{64}Co_9$ layer (layer B) and $Tb_{15}Fe_{81}Co_4$ (layer C).

Figure 18:
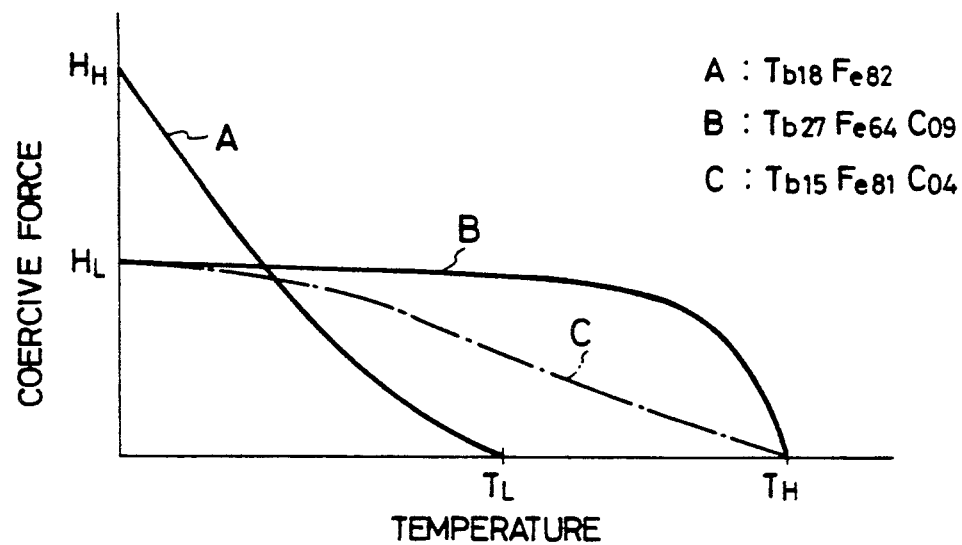
FIG. 18 is a chart showing the temperature characteristic of the coercive force of the magnetic layers in the medium shown in FIG. 3.

As shown in FIG. 18, the layer A showed, at room temperature, a coercive force $H_H$ of ca. 10 KOe and a Curie point $T_1$ of ca. 130° C.

Also at room temperature, the layers B and C showed a coercive force $H_L$ of ca. 1 KOe and a curie point $T_H$ of ca. 190° C.

The compensation temperature was ca. 210° C. and ca. $-130°$ C. respectively for the layers B and C. The forces of the layers B and C around $T_L$ were respectively ca. 70% and ca. 30% of those at room temperature.

Figure 19:
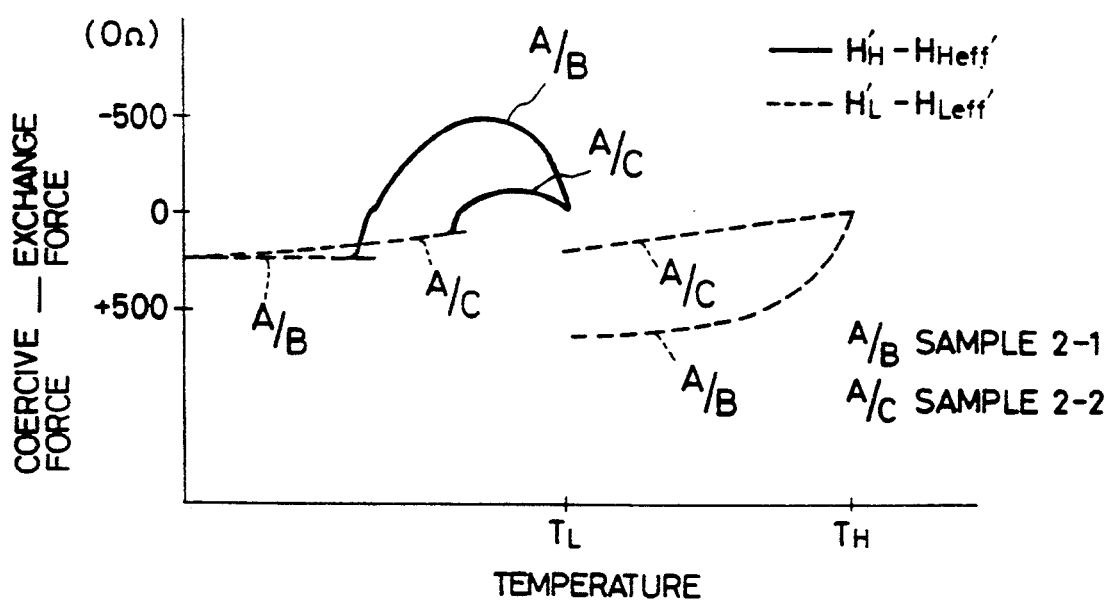
FIG. 19 is a chart showing the temperature characteristic of the coercive force and exchange force of the magnetic layers in the medium shown in FIG. 3.

In FIG. 19 showing the temperature dependence of the difference of coercive force and exchange force, broken lines indicate $H_L' - H_{HEFF}'$ for the layer B or C, while solid lines indicate $H_H' - H_{Heff}'$ for the first magnetic layer A.

The lines marked as A/B are related to the sample 18-1, while those marked as A/C are related to the sample 18-2.

In practice, only the smaller one of $H_H' - H_{Heff}'$ and $H_L' - H_{Leff}'$ is measurable. The larger one cannot be measured because, when the external magnetic field is increased, the magnetization of a magnetic layer with a smaller coercivity is inverted at a point lower than the inverting magnetic field.

The meaning of Gi.19 will be explained in the following.

When the inverting magnetic field is measured with increasing temperature, $H_L' - H_{Leff}'$ of the second magnetic layer initially has a positive value of 200-3000 Oe. However, at a temperature lower than $T_L$ by 20°-50° C., $H_H' - H_{Heff}'$ of the first magnetic layer becomes negative, so that the second magnetic layer is spontaneously oriented in the stable direction with respect to the magnetization of the first magnetic layer. At a temperature higher than $T_L$, the first magnetic layer is no longer magnetized to annulate the exchange force, so that only the coercive force of the second magnetic layer is measured.

While the sample 18-1 starts the preliminary recording of the first type from a temperature lower than $T_L$ by about 50° C. and shows the inversion of magnetization of the first magnetic layer due to a strong exchange force, the sample 18-2 starts said preliminary recording at a temperature lower than $T_L$ by about 20° C. due to a weaker exchange force.

This difference results from a difference in the temperature-dependent coercive force of the second magnetic layer, or in the compensation temperature. The value of (coercive force − exchange force) of the first magnetic layer changes from a large positive value to a negative value as the sample temperature is increased. Therefore, if the value of (coercive force − exchange force) of the second magnetic value is a relatively large positive value at the temperature range of preliminary recording of the first type, the first magnetic layer receives a strong exchange force (value of (coercive force − exchange force) being a large negative value) from a relatively low temperature at the preliminary recording of the first type, thereby orienting the magnetization into a stable direction with respect to the magnetization of the second magnetic layer.

In conclusion, it is concluded that the temperature dependence of the coercive force of the second magnetic layer and the magnitude relationship between the compensation temperature of the second magnetic layer and the Curie temperature of the first magnetic layer are the factors determining the stability and sensitivity of the preliminary recording of first type.

EXAMPLE 19

Samples 19-1 to 19-6 of magnetooptical disk were prepared with the same process, structure and thicknesses as in the Example 17, except that the substance of the second magnetic layer was changed, and subjected to the evaluation of recording and reproduction in the same conditions as in the Example 17. The results are shown in Tab. 10.

TABLE 10

| Example | Composition of 2nd mag. layer (atom. %) | $T_H$ of 2nd mag. layer (°C.) | Compensation temp. of 2nd mag. layer $T_{Hcomp}$ | Ratio of coercive force at $T_L$ to room temp. | Threshold value for first type recording | Evaluation of first type record at 4 mW | Evaluation of second type record at 8 mW |
|---|---|---|---|---|---|---|---|
| Ex. 17 | $Tb_{27}Fe_{64}Co_9$ | 190 | 210 | 0.7 | 3.5 mW | + | + |
| 19-1 | $Tb_{15}Fe_{81}Co_4$ | 190 | below room temp. | 0.3 | 4.5 mW | − | + |
| 19-2 | $Tb_{15}Fe_{71.5}Co_{13.5}$ | 240 | below room temp. | 0.5 | 4 mW | ± | ± |
| 19-3 | $Tb_{15}Fe_{66}Co_{19}$ | 280 | below room temp. | 0.7 | 3.5 mW | + | − |
| 19-4 | $Tb_{27}Fe_{67}Co_6$ | 170 | 240 | 0.7 | 3.5 mW | + | + |
| 19-5 | $Tb_{27}Fe_{61}Co_{12}$ | 215 | 210 | 0.8 | 3.5 mW | + | ± |
| 19-6 | $Gd_{13}Tb_{14}Fe_{64}Co_9$ | 197 | 220 | 0.8 | 3.5 mW | + | + |

However the coercive force $H_L$ of the second magnetic layer is about 1 KOe in all the samples. In Tab. 10, "Ratio of coercive force at $T_L$ to room temp." indicates the coercive force at the temperature $T_L$ of the first magnetic layer (ca. 130° C. in the present example) divided by the coercive force at room temperature.

The threshold value for the recording of first type indicates the laser power enabling the recording.

The recording of first or second type was evaluated as "+" if a satisfactory reproduction signal of a C/N ratio of about 40 dB could be obtained, as "±" if the recorded signal could be confirmed, and as "−" if recording was not made.

As shown in Tab. 10, the recording of first type could be satisfactorily made only in the samples having the ratio of coercive force at $T_L$ to that at room temperature is equal to or larger than 0.5 (samples 17, 19-2 to 19-6), in which the compensation temperature of the second magnetic layer is higher than the Curie temperature of the first magnetic layer, or the Curie temperature $T_H$ of the second magnetic layer is higher than that in other samples (case of samples 19-2 and 19-3).

Similarly the recording of second type could be satisfactorily made in the samples having the Curie temperature $T_H$ of the second magnetic layer lower than 200° C. (samples 17, 19-4, 19-5 and 19-6).

Figure 20:
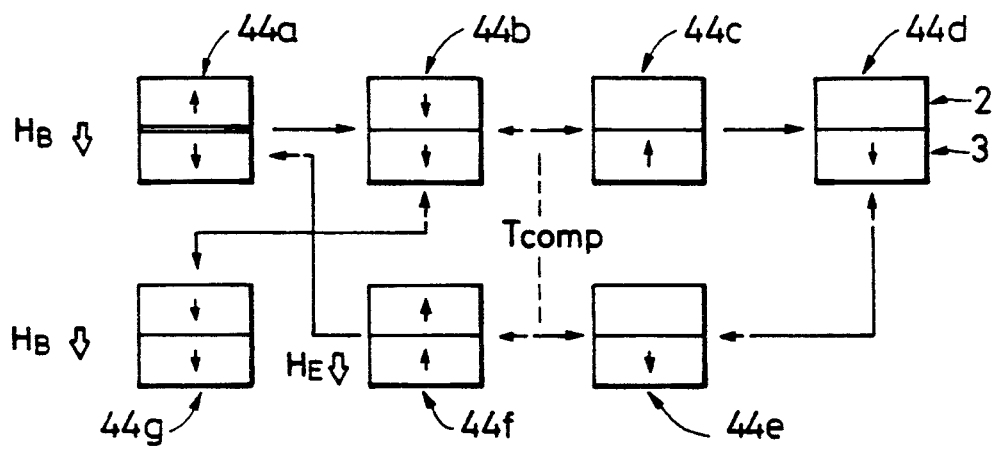
FIGS. 20 and 21 are schematic views showing states of magnetization in the recording process utilizing the compensation temperature.

Also a medium with $T_L < T_{Hcomp}$ explained above can be utilized in a recording process as shown in FIG. 20, in which there are shown a first magnetic layer 2 and a second magnetic layer 3. Various states of magnetization of said layers are represented by 44a-44g. In the recording process, at a position different from the recording head, there is applied a downward external magnetic field $H_E$ of a magnitude enough for magnetizing the second magnetic layer of a coercive force $H_L$ in one direction but insufficient for inverting the magnetization of the first magnetic layer of a coercive force $H_H$, and a downward bias magnetic field $H_B$ for facilitating the recording in the second magnetic layer is applied at the position of the recording head.

Prior to the explanation of the steps of said recording process, there will be briefly explained the states 44a-44g and the transitions therebetween.

44a and 44g indicate two different record states at room temperature. Heating with a laser beam causes a transition in the order of 44b, 44c and 44d. 44b and 44f, or 44c and 44e represent different states at a substantially same temperature. An arrow ⟷ indicates a reversible magnetizing process, while arrows ← and → indicate irreversible magnetizing processes. The compensation temperature of the second magnetic layer is positioned between 44b and 44c, or between 44c and 44f.

FIG. 20 shows a case in which the rare earth lattice magnetization is prevailing in the first and second magnetic layers. In such case, the state 44g in which the magnetizations of the layers are mutually in a same direction is stable, while the state 44a in which the magnetizations are mutually oppositely directed is unstable, due to the mutual exchange effect of the two layers, and an interfacial magnetic wall exists in said unstable state 44a. However the coercive force of the second magnetic layer has to be so adjusted as that said unstable state can be maintained even in the absence of the magnetic field. In the room temperature state (44a, 44g), the magnetization of the second magnetic layer with smaller coercive force is always oriented downwards by the external magnetic field $H_E$.

In the following there will be explained the steps of the recording process.

Figure 22:
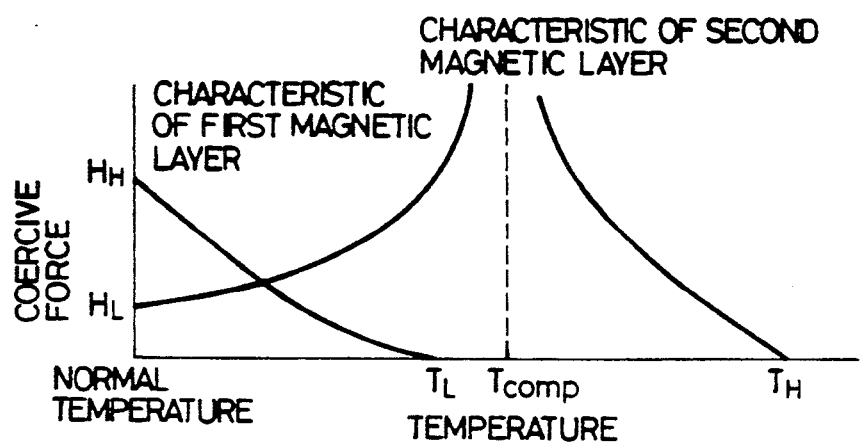

When the temperature is raised from the state 44a, the coercive force of the first magnetic layer decreases while that of the second magnetic layer increases as shown in FIG. 22. As the magnetizations of two layers tend to be oriented in a same direction by the exchange force, the magnetization of the first magnetic layer is inverted downwards as shown by 44b. If the temperature is lowered from this state, the magnetization remains unchanged to reach the state 44g. After the temperature is raised from the state 44g to reach the state 44b, the state 44g is re-gained even if the temperature is decreased. That is, the state 44g is raised from either one of the state 44a and the state 44g by the application of a laser power heating the magnetic layer to a temperature at which the state 44b is reached.

If the temperature is further raised from the state 44b to a state 44c across the compensation temperature $T_{comp}$ of the second magnetic layer, the magnetization thereof is reversibly inverted. If the temperature is further elevated, the coercive force of the second magnetic layer is reduced, so that the magnetization thereof is inverted by the bias field $H_B$ as shown by 44d. If the temperature is lowered from this state, the magnetization remains unchanged, and the magnetization of the second magnetic layer is reversibly inverted when crossing the compensation temperature $T_{comp}$. At the same time the first magnetic layer starts to show upward magnetization due to the exchange force. The coercive force of the second magnetic layer becomes smaller when it is cooled to room temperature, and the magnetization thereof is inverted by the external field $H_E$. However, the first magnetic layer, because of the large coercive force thereof, does not show inversion of the magnetization by the external field $H_E$ but retains the record state. In this manner, by the application of a laser power corresponding to the temperature of 44d, both states 44a and 44g are transformed to the state 44a.

Thus different states of magnetization can be obtained by the application of different laser powers, and this is a principle of overwriting.

Figure 21:
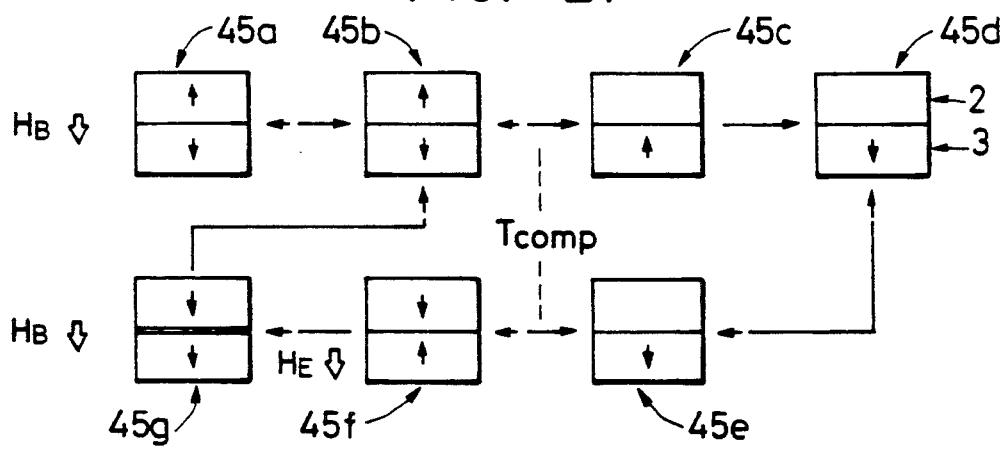

FIG. 21 shows a case in which transition metal sub-lattice magentization is prevailing in the first magnetic layer, while rare earth sub-lattice magnetization is prevailing in the second magnetic layer. In such case a state 45a, in which the magentizations of both layers are mutually oppositely directed, is a stable state, and a state 45g, in which the magnetizations of both layers are mutually in a same direction, is an unstable state, due to the exchange effect between the two layers, and an interfacial magnetic wall exists in said unstable state 45g. In a similar manner as shown in FIG. 20, the application of a laser power corresponding to the temperature of a state 45b brings the states 45a and 45g to the state 45a, while the application of a laser power corresponding to the temperature of a state 45d brings the states 45a and 45g to the state 45g. Consequently, different states of magnetization can be again obtained by the application of different laser powers. In this manner overwriting can be achieved.

The magnitude of the field $H_B$ is smaller than that of the field $H_E$. If $H_B$ is larger than $H_E$, the field $H_E$ becomes unnecessary but the control of the compositions and layer thicknesses of the medium becomes more difficult. More specifically, if $H_B > H_E$, $H_B$ has to be considerably large, and it is considerably difficult to realize the state 44f in FIG. 20 or 45b in FIG. 21 by the exchange force, against such large magnetic field. Since the second magnetic layer has a compensation temperature as explained before, the magnetization of the second magnetic layer in the against the magnetic vield $H_B$.

EXAMPLE 20

A pregrooved and preformatted polycarbonate disk substrate was set in a sputtering apparatus with ternary targets, and was rotated at a distance of 10 cm from the targets.

A $Si_3N_4$ protective layer of 700 Å in thickness was formed by sputtering, in argon gas, from a first target with a sputtering speed of 100 Å/min. and a sputtering pressure of $5 \times 10^{-3}$ Torr. Then a TbFe alloy was sputtered, in argon gas, from a second target with a sputtering speed of 100 Å/min. and a sputtering pressure of $5 \times 10^{-3}$ Torr to obtain a first magnetic layer with prevailing Tb sub-lattic magnetization, with a thickness of 500 Å, $T_L$=ca. 130° C. and $H_H$=ca. 5 KOe.

Then a Gd-Tb-Fe-Co alloy was sputtered, in argon gas, from a third target with a sputtering speed of 100 Å/min and a sputtering pressure of $5 \times 10^{-3}$ Torr to obtain a second magnetic layer with prevailing GdTb sub-lattice magnetization, with a thickness of 800 Å, $T_H$=ca. 220° C., $H_L$=ca. 1.5 KOe and $T_{comp}$=ca. 140° C.

Subsequently a $Si_3N_4$ protective layer of 700 Å in thickness was formed by sputtering, in argon gas, from the first target with a sputtering speed of 100 Å/min. and a sputtering pressure of $5 \times 10^{-3}$ Torr.

After these layer formations, the above-mentioned substrate was adhered to a polycarbonate plate with hot-melt adhesive material to obtain a magnetooptical disk. Said magnetooptical disk was set on a record/reproducing apparatus, and the recording was conducted with a laser beam of a wavelength of 830 nm, focused to ca. 1.5 μm and modulated in two levels of 2.7 and 5.5 mW, with a duty ratio of 50% and a frequency of 2 MHz, and with a linear speed of ca. 8 m/sec and under the application of a bias magnetic field of 200 Oe and an external magnetic field of 2 KOe. Subsequently binary signals could be reproduced by irradiation with a laser beam of 1 mW.

After the above-explained experiment, recording was conducted on the same track with a same power and a frequency of 3 MHz. The previously recorded signals were not detected, and the possibility of over-writing was thus confirmed.

EXAMPLE 21

A magnetooptical disk was prepared in the same manner as in the Example 20, except that, for the first magnetic layer, a TbFe alloy was sputtered from the second target with a sputtering speed of 100 Å/min. and a sputtering pressure of $5 \times 10^{-3}$ Torr to obtain a magnetic layer with prevailing Fe sub-lattice magnetization, with a thickness of 500 Å, $T_L$=ca. 125° C., and $H_H$=ca. 4 KOe, and said disk was evaluated in the same manner.

The evaluation clarified that the overwriting was possible also.

(ii) Case $T_{Hcomp} < T_L$

The recording process is conducted in the following manner:

(a) To the recording medium there is applied, at a position different from the recording head, a magnetic field B enough for magnetizing the second mangetic layer of a coercive force $H_L$ in a direction but insufficient for inverting the magnetization of the first magnetic layer of a coercive force $H_H$.

(b) Then there is conducted, according to the input signal, either the preliminary recording of first type in which a bias magnetic field is applied by the recording head and a laser power enough for heating the medium close to the compensation temperature $T_{Hcomp}$ is simultaneously applied, thereby orienting the magnetzation of the first magnetic layer in a stable direction with respect to the magnetization of the second magnetic layer without varying said magnetization, or the preliminary recording of second type in which a laser power enough for heating the medium close to the higher of the Curie temperatures $T_L$, $T_H$ of the first and second magnetic layers is applied simultaneously with the application of the bias magnetic field, thereby inverting the magnetization of the second magnetic layer and simultaneously magnetizing the first magnetic layer in a stable direction with respect to the magnetization of said second magnetic layer.

(c) Then the medium is so moved that the preliminarily recorded bit passes through the aforementioned magnetic field B, whereby the bit formed by the preliminary recording of first type does not change the direction of magnetization in the first and second magnetic layers, while the bit formed by the preliminary recording of second type does not change the direction of magnetization of the first magnetic layer but inverts the magnetization of the second magnetic layer in a direction same as that of said magnetic field B.

In this case the Curie temperatures $T_L$, $T_H$ of the first and second magnetic layers should satisfy a relation $T_L \leq T_H$. On the other hand, the condition for the recording of first type is $H_H' - H_{Heff}' < 0$, and $H_H'$ should preferably decrease rapidly at elevated temperature. Consequently, the compensation temperature $T_{comp}$ of the first magnetic layer should preferably be lower than room temperature. The relation of the compensation temperature, Curie temperature and coercive in these magnetic layers is shown in FIG. 23.

EXAMPLE 22

A pregrooved and preformatted polycarbonate disk substrate was set in a sputtering apparatus with ternary targets, and was rotated at a distance of 10 cm from the targets.

A ZnS protective layer of 1000 Å in thickness was formed by sputtering, in argon gas, from a first target with a sputtering speed of 100 Å/min. and a sputtering pressure of $5 \times 10^{-3}$ Torr. Then a TbFe alloy was sputtered, in argon gas, from a second target with a sputtering speed of 100 Å/min. and a sputtering pressure of $5 \times 10^{-3}$ Torr to obtain a first magnetic layer of $Tb_{18}Fe_{82}$ with a thickness of 300 Å, $T_L$=ca. 130° C., a compensation temperature below room temperature, and $H_H$=ca. 10 KOe.

Then a TbFeCo alloy was sputtered, in argon gas, with a sputtering pressure of $5 \times 10^{-3}$ Torr to obtain a second magnetic layer of $Tb_{27}Fe_{51}Co_9Cu_{13}$ with a thickness of 500 Å, $T_h$=ca. 210° C., $H_L$=ca. 1 KOe and a compensation temperature of 100 °C.

Subsequently a ZnS protective layer of 1000 Å in thickness was formed by sputtering, in argon gas, from the first target with a sputtering speed of 100 Å/min. and a sputtering pressure of $5 \times 10^{-3}$ Torr.

After forming these layers, the above-mentioned substrate was adhered to a polycarbonate plate with hot-melt adhesive material to obtain a magnetooptical disk.

Thus prepared was mounted on a record/reproducing apparatus, and was made to pass through a unit generating a magnetic field of 2.5 KOe with a linear speed of ca. 8 m/sec. The recording was then conducted with a laser beam of a wavelength of 830 nm, concentrated to ca. 1 μm and modulated in two levels of 4 and 8 mW with a duty ratio of 50% and a frequency of 2 MHz. The bias field was 100 Oe in a direction to invert the magnetization of the second magnetic layer. Binary signals could then be reproduced by irradiation with a laser beam of 1.5 mW.

The above-explained experiment was repeated with a sample disk recorded over the entire surface. The previously recorded signal components were not detected in the reproduction, and the possibility of over-writing was confirmed in this manner.

EXAMPLE 23

A sample of magnetooptical disk was prepared in the same manner as in the Example 22, except that the first magnetic layer was composed of $Tb_{18}Fe_{72}Co_{10}$, having a Curie temperature of ca. 220° C., a compensation temperature below room temperature, and a coercive force of ca. 10 KOe.

EXAMPLE 24

A sample of magnetooptical disk was prepared in the same manner as in the Example 22, except that the second magnetic layer was composed of $Tb_{15}Fe_{77}Co_8$, having a Curie temperature of ca. 210° C., a compensation temperature below room temperature, and a coercive force of ca. 1 KOe.

The samples of the Examples 22, 23 and 24 were subjected to the test of recording and reproduction, according to the process of the Example 22 and with varying recording laser power. Tab. 11 summarizes the threshold values (where C/N ratio is saturated) of the recordings of first and second types, and the corresponding C/N ratios.

TABLE 11

| Sample | 1st type recording | | 2nd type recording | |
|---|---|---|---|---|
| | threshold v. | C/N | threshold v. | C/N |
| Example 22 | 2 mW | 46 dB | 6 mW | 46 dB |
| Example 23 | 2.5 mW | 49 dB | 7 mW | 49 dB |
| Example 24 | 4.5 mW | 35 dB | 6 mW | 45 dB |

Tab. 11 shows that the samples of the Examples 22 and 23 have higher sensitivities of the recording of first type and larger C/N ratios compared to the sample of the Example 24. These results reflect that the second magnetic layer has a compensation temperature higher than room temperature and increases the coercive force $H_L$ of the second magnetic layer in the course of recording, whereby the second magnetic layer is stabilized with respect to the magnetic field and the inversion of magnetization of the first magnetic layer takes place stably from a low temperature.

Also the comparison of the Examples 22 and 23 suggests that the Example 23 shows an increased C/N ratio at the reproduction, though the recording sensitivity is somewhat lost, because of the higher Curie temperature of the first magnetic layer.

Protective Layer

FIG. 24 is a schematic cross-sectional view showing an embodiment of the magnetooptical recording medium of the present invention, wherein a protective layer 46 is provided on the second magnetic layer 3. Said protective layer 46 is preferably formed with a thickness equal to or larger than 200 Å, in order to form a continuous film. Also, as shown in FIG. 25, a protective layer 27 may be provided between the substrate 1 and the first magnetic layer 2, and said protective layer 47 is also preferably formed with a thickness equal to or larger than 200 Å, in order to obtain a continuous film. The corrosion resistance of the medium can be further improved by adhering another substrate 49, as shown in FIG. 26, onto the protective layer 46 by means of an adhesive layer 48. Furthermore, recording and reproduction can be made from both sides if the layers 47 to 46 are formed also on the substrate 49.

Said protective layer is composed of a dense nonmagnetic material, usually an inorganic dielectric material, such as $Si_3N_4$, SiC, ZnS, AlN, SiO, $Al_2O_3$, Si or Ge. In the structures shown in FIGS. 25 and 26, the protective layers 46, 47 may be composed of different materials, but are preferably formed with a same material in consideration of the stability of the magnetic characteristics during storage. In FIGS. 24 to 26, same components as those in FIG. 3 are represented by same numbers or symbols, and will not be explained further.

EXAMPLE 25

A pregrooved and preformatted glass disk substrate was set in a sputtering apparatus with ternary targets, and was rotated at a distance of 10 cm from the targets.

A GdTbFeAl alloy was sputtered, in argon gas, from a second target with a sputtering speed of 100 Å/min. and a sputtering pressure of $5 \times 10^{-3}$ Torr to obtain a first magnetic layer of $Gd_{15}Tb_5Fe_{79}Al_1$ of a thickenss of 210 Å, $T_L$=ca. 165° C. and $H_H$=ca. 10 KOe.

Then a TbFeCoCr alloy was sputtered, in argon gas, with a sputtering pressure $5 \times 10^{-3}$ Torr to obtain a second magnetic layer of $Tb_{23}Fe_{60}Co_{14}Cr_3$ with a thickness of 500 Å, $T_H$=ca. 190° C. and $H_L$=ca. 1 KOe.

Subsequently a ZnS protective layer of 1500 Å in thickness was formed by sputtering, in argon gas, from a first target with a sputtering speed of 100 Å/min. and a sputtering pressure of $5 \times 10^{-3}$ Torr.

After these layer formations, the above-mentioned substrate was adhered to a polycarbonate plate with hot-melt adhesive material to obtain a magnetooptical disk. Said disk was mounted on a record/reproducing apparatus, and was made to pass through, with a linear speed of ca. 5 m/sec., a unit generating a magnetic field of 2.5 KOe. Then the recording was conducted with a laser beam of a wavelength of 830 nm, concentrated to ca. 1 μm and modulated in two levels of 4 and 8 mW, with a duty ratio of 50% and a frequency of 500 KHz. The bias field was 100 Oe. Binary signals could then be reproduced by irradiation with a laser beam of 1.0 mW.

The above-explained experiment was repeated with a magnetooptical disk recorded already over the entire surface. The previously recorded signal components were not detected, and the possibility of over-writing was thus confirmed.

EXAMPLE 26

Samples 26-1 to 26-11 of the structures shown in Tab. 11 were prepared in the same manner as in the Example 25. In Tab. 12, Mag(1) and Mag(2) indicate the first and second magnetic layers prepared as explained in the Example 25 and composed respectively of $Gd_{15}Tb_5Fe_{7.9}Al_1$ and $Tb_{23}Fe_{60}Co_{14}Cr_3$ with same thicknesses and coercive forces explained before. Also glass means a glass disk substrate. Tab. 12 shows the values of $H_L$ and $\sigma_w/2M_sh$ measured on each sample.

TABLE 12

| Sample | Structure | Protective layer-thickness | $H_L$ (Oe) | $\sigma_w/2M_sh$ |
|---|---|---|---|---|
| 26-1 | glass/Mag (1)/Mag (2) | — | 1000 | 800 |
| 26-2 | glass/Mag (1)/Mag (2)/ Protect. layer | ZnS-100 Å | 1000 | 400 |
| 26-3 | glass/Mag (1)/Mag (2)/ Protect. layer | ZnS-200 | 1000 | 350 |
| 26-4 | glass/Mag (1)/Mag (2)/ Protect. layer | ZnS-400 | 1000 | 300 |
| 26-5 | glass/Mag (1)/Mag (2)/ Protect. layer | ZnS-1000 | 1000 | 300 |
| 26-6 | glass/Mag (1)/Mag (2)/ Protect. layer | $Si_3N_4$-200 | 1000 | 300 |
| 26-7 | glass/Mag (1)/Mag (2)/ Protect. layer | SiC-200 | 1000 | 300 |
| 26-8 | glass/Mag (1)/Mag (2)/ Protect. layer | SiO-300 | 1000 | 300 |
| 26-9 | glass/Mag (1)/Mag (2)/ Protect. layer | $Si_3N_4$-1000 | 1000 | 300 |
| 26-10 | glass/Mag (1)/Mag (2)/ Protect. layer | SiC-1000 | 1000 | 300 |
| 26-11 | glass/Mag (1)/Mag (2)/ Protect. layer | SiO-1000 | 1000 | 300 |

The values of $H_L$ and $\sigma_w/2M_sh$ were measured by preparing a sample, composed of a first magnetic layer and a second magnetic layer on a substrate, in the same process as in the Example 25, and determining the magnetic field inducing the inversion of the magnetization of the second magnetic layer, by means of the magnetooptical effect and in the presence of an external magnetic field.

In the following there will be explained the relation, examined from the results shown in Tab. 12, between the protective layer and the condition $H_L > \sigma_w/2M_sh$ for the stability of the record bit 4f shown in FIG. 5.

The sample 26-1 did not have a protective layer in contact with the second magnetic layer, and $H_L - \sigma_w/2M_sh$ was 200 Oe. This indicates that the mutually opposite magnetizations of the first and second magnetic layers can stably exist with a margin of 200 Oe in the absence of the external field. In practice, however, 1-5% of the magnetization of the second magnetic layer is inverted because inverted domains are generated by a smaller field.

The samples 26-2 to 26-5, having a ZnS protective layer in contact with the second magnetic layer, showed a decrease in $\sigma_w/2M_sh$ with the increase in thickness of said protective layer. At a thickness of ZnS layer between 100 and 200 Å, $\sigma_w/2M_sh$ reaches a substantially constant value same as that at a ZnS thickness of 1000 Å, providing a margin of ca. 700 Oe. These samples did not show the above-mentioned inversion of magnetization of the second magnetic layer in the absence of the external field, and were therefore stable.

Electron microscope observation of the samples proved that the protective layer was transformed from an island structure to a continuous film at a thickness of 100–200 Å. It is estimated that the protective layer generates a compression stress in the second magnetic layer, thus inducing a change in $\sigma_w/2M_sh$.

In the samples 26-2 to 26-11 investigated was the effect of material constituting the protective layer formed in contact with the second magnetic layer. It was confirmed that a protective layer composed of $Si_3N_4$, SiC or SiO had an effect of reducing $\sigma_w/2M_sh$, or of stabilizing the record bit.

When the samples 26-2 to 26-11 were maintained in an atmosphere of a temperature 45° C. and a humidity of 65% for 3 days, the sample 26-2 with the protective layer of 100 Å showed an increase of by about 30%, other samples showed decreases less than 10%.

EXAMPLE 27

A progrooved and preformatted polycarbonate disk substrate was set in a sputtering apparatus, with ternary targets, and was rotated at a distance of 10 cm from the targets.

A Si protective layer of 500 Å in thickness was formed by sputtering, in argon gas, from a first target with a sputtering speed of 100 Å/min and a sputtering pressure of $5 \times 10^{-3}$ Torr. Then a GdTbFeCo alloy was sputtered, in argon gas, from a second target with a sputtering speed of 100 Å/min. and a sputtering pressure of $5 \times 10^{-3}$ Torr to obtain a first magnetic layer of $Gd_{10}Tb_{10}Fe_{78}Co_2$ with a thickness of 190 Å, $T_L$=ca. 160° C. and $H_H$=ca. 12 KOe.

Then a TbDyFeCo alloy was sputtered, in argon gas, with a sputtering pressure of $5 \times 10^{-3}$ Torr to obtain a second magnetic layer of $Tb_{12}Dy_{12}Fe_{64}Co_{12}$ of a thickness of 500 Å, $T_H$=ca. 185° C. and $H_L$=ca. 1 KOe.

Then a Si protective layer of 1000 Å in thickness was formed by sputtering, in argon gas, from the first target with a sputtering speed of 100 Å/min. and a sputtering pressure of $5 \times 10^{-3}$ Torr.

After these layer formations, the above-mentioned substrate was adhered to a polycarbonate plate with hot-melt adhesive material to botain a magnetooptical disk. Said disk was mounted on a record/reproducing apparatus and was made to pass through, with a linear speed of ca. 8 m/sec., a unit generating a magnetic field of 2.5 KOe. The recording operation was then conducted with a laser beam of a wavelength of 830 nm, concentrated to ca. 1 μm and modulated at two levels of 4 and 8 mW with a duty ratio of 50% and a frequency of 2 MHz. The bias field was 100 Oe in a direction to facilitate the inversion of magnetization of the second magnetic layer. Then binary signals could be reproduced by irradiation with a laser beam of 1.5 mW.

The above-explained experiment was repeated with a magnetooptical disk already recorded over the entire surface. The previously recorded signal components were not detected in the reproduction, so that the possibility of overwriting was confirmed.

EXAMPLE 28

Samples 28-1 to 28-16 were prepared in the same manner as in the Example 27, as shown in Tab. 13. The first magnetic layer (Mag(1)) and the second magnetic layer (Mag(2)) were respectively composed of $Gd_{10}Tb_{10}Fe_{78}Co_2$ and $Tb_{12}Dy_{12}Fe_{64}Co_{12}$ of the same thicknesses and coercive forces as in the Example 27. PC indicates a polycarbonate substrate.

Tab. 13 shows the values of $H_L$ and $\sigma_w/2M_sh$ measured on said samples.

the same manner as in the Example 27, and determining the magnetic field inducing the inversion of magnetization of the second magnetic layer, by means of the magnetooptical effect, in the presence of an external magnetic field.

The value of $\sigma_w/2M_sh$ after storage was obtained by placing the samples 28-1 to 28-16 in an atmosphere of a temperature of 60° C. and a relative humidity of 80% for 500 hours. No results are shown for the samples 28-1 to 28-3, as the measurement was not possible by the deterioration of the magnetic characteristic of the second magnetic layer.

In the following there will be explained the relation, examined from the results shown in Tab. 13, between the protective layers provided on both sides of the first and second magnetic layers, and the condition $H_L > \sigma_w/2M_sh$ for the stability of the record bit $4f$ shown in FIG. 5.

The samples 28-1, 28-2 did not have a protective layer in contact with the second magnetic layer, and $H_L - \sigma_w/2M_sh = 200$ Oe. This signifies that the mutually unstable arrangement of magnetizations of the first and second magnetic layers can stably exist with a margin of 200 Oe, in the absence of the external field. In

TABLE 13

| Sample | Structure | Prot. layer (1) material/ thickness (Å) | Prot. layer (2) material/ thickness (Å) | $H_L$ (Oe) | $\sigma_w/2M_sh$ (Oe) | $\sigma_w/2M_sh$ (Oe) after storage |
|---|---|---|---|---|---|---|
| 28-1 | PC/Prot. Layer (1)/ Mag (1)/Mag (2) | ZnS/150 | — | 1200 | 1000 | — |
| 28-2 | PC/Prot. Layer (1)/ Mag (1)/Mag (2) | ZnS/1000 | — | 1000 | 800 | — |
| 28-3 | PC/Prot. Layer (1)/ Mag (1)/Mag (2)/ Prot. Layer (2) | ZnS/800 | ZnS/100 | 1000 | 400 | — |
| 28-4 | PC/Prot. Layer (1)/ Mag (1)/Mag (2)/ Prot. Layer (2) | ZnS/800 | ZnS/200 | 1000 | 350 | 700 |
| 28-5 | PC/Prot. Layer (1)/ Mag (1)/Mag (2)/ Prot. Layer (2) | ZnS/800 | ZnS/400 | 1000 | 300 | 300 |
| 28-6 | PC/Prot. Layer (1)/ Mag (1)/Mag (2)/ Prot. Layer (2) | ZnS/800 | ZnS/800 | 1000 | 300 | 300 |
| 28-7 | PC/Prot. Layer (1)/ Mag (1)/Mag (2)/ Prot. Layer (2) | SiO/800 | SiO/800 | 1000 | 300 | 300 |
| 28-8 | PC/Prot. Layer (1)/ Mag (1)/Mag (2)/ Prot. Layer (2) | SiO/800 | SiO/800 | 1000 | 300 | 450 |
| 28-9 | PC/Prot. Layer (1)/ Mag (1)/Mag (2)/ Prot. Layer (2) | $Si_3N_4$/800 | $Si_3N_4$/800 | 1000 | 300 | 300 |
| 28-10 | PC/Prot. Layer (1)/ Mag (1)/Mag (2)/ Prot. Layer (2) | SiC/800 | SiC/800 | 1000 | 300 | 300 |
| 28-11 | PC/Prot. Layer (1)/ Mag (1)/Mag (2)/ Prot. Layer (2) | ZnS/800 | SiO/800 | 1000 | 300 | 400 |
| 28-12 | PC/Prot. Layer (1)/ Mag (1)/Mag (2)/ Prot. Layer (2) | ZnS/800 | SiC/800 | 1000 | 300 | 450 |
| 28-13 | PC/Prot. Layer (1)/ Mag (1)/Mag (2)/ Prot. Layer (2) | ZnS/800 | $Si_3N_4$/800 | 1000 | 300 | 500 |
| 28-14 | PC/Prot. Layer (1)/ Mag (1)/Mag (2)/ Prot. Layer (2) | $Si_3N_4$/800 | ZnS/800 | 1000 | 300 | 500 |
| 28-15 | PC/Prot. Layer (1)/ Mag (1)/Mag (2)/ Prot. Layer (2) | $Si_3N_4$/800 | SiC/800 | 1000 | 300 | 450 |
| 28-16 | PC/Prot. Layer (1)/ Mag (1)/Mag (2)/ Prot. Layer (2) | $Si_3N_4$/800 | SiO/800 | 1000 | 300 | 450 |

The values of $H_L$ and $\sigma_w/2M_sh$ were measured by preparing a sample, composed of a first magnetic layer and a second magnetic layer on a substrate, formed in practice, however, 1-5% of the magnetization of the second magnetic layer is inverted because inverted domains are generated by a smaller field.

The samples 28-3 to 28-6, having ZnS protective layers in contact with the first and second magnetic layers, showed a decrease in $\sigma_w/2M_sh$ with the increase in the thickness of said protective layers. At a thickness of ZnS layers above ca. 200 Å, $\sigma_w/2M_sh$ reaches a substantially constant value, providing a margin of ca. 700 Oe. These samples did not show the above-mentioned inversion of magnetization of the second magnetic layer in the absence of the external field, and the record bits were therefore stable.

Electron microscope observation of the samples proved that the protective layer was transformed from an island structure to a continuous film at a thickness of 100-200 Å. It is estimated that the protective layer generates a compression stress in the second magnetic layer, thus inducing a change in $\sigma_w/2M_sh$.

In the samples 28-7 to 28-16, the protective layers were fixed to a thickness of 800 Å at which the effect on $\sigma_w/2M_sh$ is already saturated and which provides a sufficient protective effect for example for preventing the entry of moisture into the magnetic layers.

In the sample 28-7 the sputtering pressure for SiO was $3\times10^{-3}$ Torr for both first and second layers, while in the sample 28-8 the sputtering pressure for SiO was $8\times10^{-3}$ Torr for the second layer only. The sample 28-7 is a case in which the protective layers have a same stress, while the sample 28-8 is a case in which the protective layers have mutually different stresses.

As a reference, the magnitude of stress was measured on samples for stress measurement, prepared by forming a SiO layer of ca. 5000 Å by sputtering on a glass substrate of 1.5 mm in thickness. The layer formed with a sputtering pressure of $3\times10^{-3}$ Torr provided a compression stress of ca. 70 kg/mm², while that formed with a pressure of $8\times10^{-3}$ Torr provided a compression stress of ca. 15 kg/mm².

The samples 28-7 and 28-8 showed a value of $\sigma_w/2M_sh$ of ca. 300 Oe immediately after the preparation.

However, after a storage of 500 hours at 60° C. and 80% relative humidity, the sample 28-8 with two SiO layers of different compression stresses showed an increase in $\sigma_w/2M_sh$, rendering the record bits more unstable.

The samples 28-9 to 28-16 were prepared with various materials for the protective layers, but the sputtering pressures therefor were kept constant at $5\times10^{-3}$ Torr.

All the samples showed a value of $\sigma_w/2M_sh$ of ca. 300 Oe immediately after the preparation. Thus the recording is made stabler compared to the case without the protective layers.

However, after a storage for 500 hours at 60° C. and 80% relative humidity, the samples in which two protective layers are composed of different materials showed a change in $\sigma_w/2M_sh$.

The ZnS, SiC or $Si_3N_4$ sputtered layer of 5000 Å in thickness, when subjected to the measurement of stress in the same manner as the SiO layer, showed a compression stress of ca. 50, 80 or 90 kg/mm² respectively. When stored for 500 hours at 60° C. and 80% relative humidity, these samples showed an increase in the stress, which was as high as ca. 20 to 30% in SiC and $Si_3N_4$.

These results indicate that the stability of record bits is related to the stress of the protective layers. Particularly in consideration of prolonged storage, the balance of stresses of the protective layers should remain unchanged, and, for this purpose it is effective to prepare both protective layers with a same material, and with same manufacturing conditions such as the sputtering pressure.

Triple-layered Structure

The magnetooptical recording medium of the present invention may have a triple-layered structure, by adding a magnetic layer to the above-explained two-layered structure. Such triple-layered structure will be explained further in the following.

FIGS. 27 and 28 are schematic cross-sectional views of embodiments of the magnetooptical recording medium of the present invention. The medium shown in FIG. 27 is composed of a pregrooved translucent substrate 51, and, a first magnetic layer 52, a second magnetic layer 53 and a third magnetic layer 54 laminated thereon. The first magnetic layer 52 has a high Curie point ($T_{H1}$) and a low coercive force ($H_{L1}$), while the second magnetic layer has a low Curie point ($T_{L2}$) and a high coercive force ($H_{H2}$), and the third magnetic layer 54 has a high Curie point ($T_{H3}$) and a low coercive force ($H_{L3}$). The terms "high" and "low" are defined by relative comparison between the first and third magnetic layers and the second magnetic layer, the comparison of coercive force being at room temperature.

Relation of magnitude of the Curie point or the coercive is not critically defined between the first and third magnetic layers, but preferred relations are $T_{H1} \geq T_{H3}$ and $H_{L1} \geq H_{L3}$.

It is generally desirable that the first magnetic layer 52 has $T_{H1}$ of 150°-400° C. and $H_{L1}$ of 0.1-1 KOe, the second magnetic layer 53 has $T_{L2}$ of 70°-200° C. and $H_{H2}$ of 2-10 KOe, and the third magnetic layer 54 has $T_{H3}$ of 100°-250° C. and $H_{L3}$ of 0.5-4 KOe.

In the magnetooptical recording medium of the present invention, the neighboring magnetic layers are coupled by exchange force. The first and second magnetic layers are relatively strongly coupled, while the second and third are relatively weakly coupled.

In the magnetooptical recording medium of the present invention, the above-mentioned three magnetic layers are so coupled as to satisfy following relations:

$$\frac{\sigma_{w12}}{2M_{s1}h_1} > H_{L1} \qquad (9)$$

$$\frac{\sigma_{w23}}{2M_{s3}h_3} < H_{L3} \qquad (10)$$

wherein:
$\sigma_{w12}$: magnetic wall energy of first and second magnetic layers 52, 53;
$\sigma_{w23}$: magnetic wall energy of second and third magnetic layers 53, 54;
$h_1, h_2, h_3$ thicknesses of first, second and third magnetic layers 52, 53, 54;
$M_{s1}, M_{s2}, M_{s3}$: saturation magnetizations of first, second and third magnetic layers.

The reason of these relations will be explained later.

The thickness, coercive force, saturation magnetization and magnetic wall energy of said magnetic layers 52, 53, 54 are so selected that the two states of magnetization (shown by 60f in FIG. 29) of the finally recorded bits can exist in stable manner, or that the above-mentioned relations are satisfied.

Each magnetic layer can be composed of a substance exhibiting a vertical magnetic anisotropy and a magnetooptical effect, preferably an amorphous magnetic alloy of a rare earth element and a transition metal element such as GdCo, GdFe, TbFe, DyFe, GdTbFe, TbDyFe, GdFeCo, TbFeCo or GdTbCo.

FIG. 28 shows another embodiment of the magnetooptical disk of the present invention, in which protective layers 55, 56 are provided for improving the durability or enhancing the magnetooptical effect of the three magnetic layers 52, 53, 54.

An adhesive layer 57 is provided for adhering another covering substrate 58. Also recording and reproduction can be made from both sides if the covering substrate 58 with the layers from 55 to 56.

Figure 29:
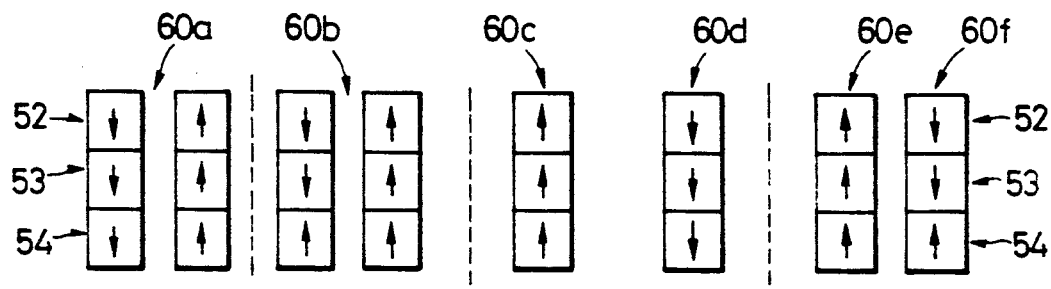
FIGS. 29, 31 to 33 are charts showing states of magnetization in the recording process utilizing the medium shown in FIG. 27.
Figure 30:
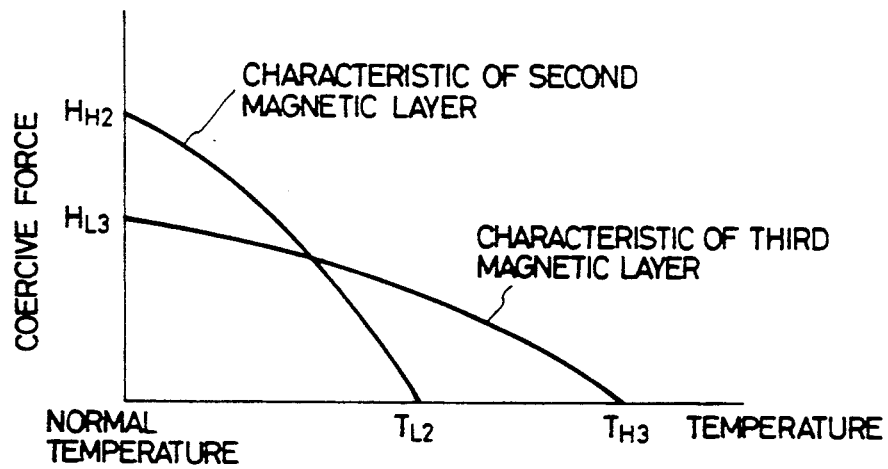
FIGS. 30 and 34 are charts showing the temperature characteristic of the coercive force of the magnetic layers in the medium shown in FIG. 27.

Now reference is made to FIGS. 29 and 30 for explaining the recording process of the present embodiment, wherein, prior to the recording, the magnetization of the magnetic layer 52 and that of the magnetic layer 53 may be in a mutually parallel stable state, or in a mutually opposite (antiparallel) stable state.

The aforementioned apparatus shown in FIG. 6 can also be employed in the recording and reproduction of information to or from the magnetooptical recording medium of the present embodiment. It is assumed that a part of the magnetic layers has an initial magnetization as shown by 60a in FIG. 29. More specifically it is assumed, in this case, that the magnetizations of the first, second and third magnetic layers are stable, prior to recording, when they are oriented in a same direction. The magnetooptical disk 9, being rotated by a spindle motor, passes the position of a magnetic field generating unit 8 shown in FIG. 6, generating a magnetic field of which intensity is selected at a suitable level between the coercive forces of the second and third magnetic layers 53, 54 (magnetic field being upwards in the present embodiment), whereby, as shown by 60d in FIG. 29, the third magnetic layer 54 is uniformly magnetized while the second magnetic layer 53 retains the initial magnetization state. Also the first magnetic layer 52, strongly coupled with the second magnetic layer, retains the initial magnetization.

The rotated magnetooptical disk 9, in passing the position of a record/reproducing head 5, is irradiated by a laser beam with one of two power levels according to the signal from a recording signal generator 6. The first laser power is sufficient to heat the disk to a temperature close to the Curie point of the second magnetic layer 53, while the second laser power is enough for heating the disk to a temperature close to the Curie point of the third magnetic layer 54. Referring to FIG. 30 showing the temperature dependence of the coercive forces of the magnetic layers 53, 54, the first laser power can heat the disk close to $T_{L2}$, while the second laser power can heat the disk close to $T_{H3}$.

The first laser power heats the second and third magnetic layers 53, 54 close to the Curie point of the second magnetic layer 53, but the third magnetic layer 54 has a coercive force capable of stably maintaining the bit at this temperature. Thus, through a suitable selection of the recording bias magnetic field, a record bit shown by 60c in FIG. 29 can be obtained, as a preliminary recording of first type, from either state in 60b. The first magnetic layer 52 assumes the illustrated magnetization by the exchange coupling with the second magnetic layer 53.

The suitable selection of the bias magnetic field has the following meaning.

In said preliminary recording of first type, such bias magnetic field is essentially unnecessary, since the second magnetic layer 53 receives a force (exchange force) to orient the magnetization in a stable direction (same direction in this case) with respect to the direction of magnetization of the third magnetic layer 54. However said bias magnetic field is provided, in a preliminary recording of second type to be explained later, in a direction to assist the magnetic inversion of the third magnetic layer 54. Also said bias magnetic field should preferably have a same magnitude and a same direction in the preliminary recording with both first laser power and second laser power. In consideration of the foregoing, the bias magnetic field is preferably selected at a minimum necessary intensity required for the preliminary recording with the second laser power of the principle explained below.

When the disk is heated close to the Curie point of the third magnetic layer by a second laser power (preliminary recording of second type), the magnetization of said third magnetic layer 54 is inverted by the above-mentioned bias magnetic field. Also the magnetizations of the second and first magnetic layers 53, 52 are oriented in a stable direction (same direction in this case) with respect to the magnetization of the third magnetic layer 54. In this manner a record bit as shown by 60b, in FIG. 29, can be from either state 60b.

Thus each area of the magnetooptical disk can have a record state 60c or 60d, shown in FIG. 29, by the bias field and by the first or second laser power corresponding to the input signal.

Then the magnetooptical disk 9 is further rotated, so that the record bit 60c or 60d passes again through the magnetic field generating unit 8, of which field intensity is selected, as explained before, between the coercive forces of the second and third magnetic layers 53, 54. Thus the record bit 60c remains unchanged and assumes a state 60e. On the other hand, the record bit 60d causes the inversion of magnetization of the third magnetic layer 54 to assume a state 60f.

In order that the record bit 60f can exist stably, there are required the aforementioned relations:

$$\frac{\sigma_{w12}}{2M_{s1}h_1} > H_{L1} \text{ and } \frac{\sigma_{w23}}{2M_{s3}h_3} < H_{L3}$$

for the following reasons.

$\sigma_{w12}/2M_{s1}h_1$ indicates the magnitude of the exchange force received by the first magnetic layer, or represents the magnitude of a magnetic field acting to orient the magnetization of the first magnetic layer in a stable direction (same direction in the present case) with respect to the magnetization of the second magnetic layer. Therefore, in order that the magnetization of the first magnetic layer is always oriented in a stable direction (same direction in the present case) with respect to the magnetization of the second magnetic layer, the coercive force $H_{L1}$ of the first magnetic layer should be smaller than said exhange force, or $\sigma_{w12}/2M_{s1}h_1 > H_{L1}$.

Also, $\sigma_{w23}/2M_{s3}h_3$ indicates the magnitude of the exchange force received by the third magnetic layer, or represents the magnitude of a magnetic field acting to orient the magnetization of the third magnetic layer in a stable direction (same direction in the present case) with respect to the magnetization of the second magnetic layer. In order that the magnetization of the third magnetic layer is not inverted by said magnetic field, or in order that the record 60f, in FIG. 29, can stably exist, there should be satisfied a condition $\sigma_{w23}/2M_{s3}h_3 < H_{L3}$ wherein $H_{L3}$ is the coercive force of the third magnetic layer.

The second and third magnetic layers 53, 54 have to be exchange-coupled in order to obtain an effective bias magnetic field caused by the exchange force at the recording, but the above-mentioned condition cannot be satisfied, and the record bits 60f cannot exist stably, if the exchange coupling is too strong. In the preparation of the magnetooptical recording medium of the present invention, therefore, it is possible to optimize said exchange-coupling, by selecting the coercive force of the third magnetic layer 54 at a relatively large value within a range not exceeding the intensity of the magnetic field generated by the magnetic field generating unit, and, if said exchange coupling is excessively large, by suitably selecting the composition of the third magnetic layer or by forming an intermediate layer of several to several thousands of Angstroms in thickness between the second and third magnetic layers (by exposing to gas or plasma reactive to the material of the second magnetic layer after sputtering thereof or by sputtering a dielectric layer from a target).

The recording process of the present embodiment enables an overwriting operation, since the record bits 60e, 60f do not rely on the state prior to recording but solely on the laser power at the recording. The record bits 60e, 60f can be reproduced by irradiation with a reproducing laser beam and processing the resulting light with a signal reproducing unit 7 shown in FIG. 6. The magnitude (modulation) of the reproduced signal principally depends on the magnetooptical effect of the first magnetic layer. This recording process can provide a recording with a reproduction signal of a high magnitude or a high degree of modulation because of the above-mentioned fact, and a fact that, in the medium of the present invention having three magnetic layers, a material with a high Curie point, or with a strong magnetooptical effect, can be used for the first magnetic layer 52 receiving the reproducing laser beam.

Figure 31:
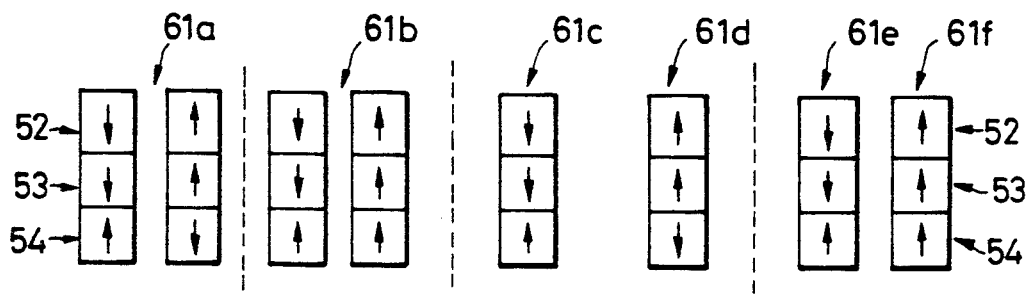
Figure 32:
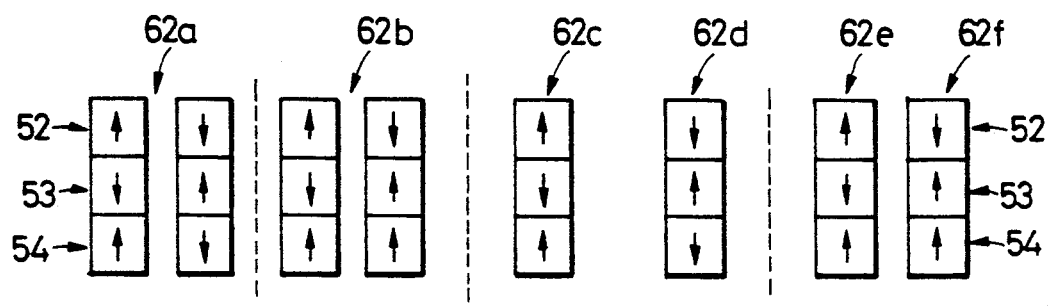

In the foregoing description relating to FIG. 29, it is assumed that the magnetizations of the first, second and third magnetic layers 52, 53, 54 are stable when they are oriented in a same direction, but a similar process can be realized when the magnetizations are stable when they are oppositely oriented. FIGS. 31 and 32 illustrate states of magnetization in such recording process, wherein 61a–61f and 62a–62f respectively correspond to the states 60a–60f in FIG. 29, and the recording is conducted in a similar manner as shown in FIG. 29.

EXAMPLE 29

A pregrooved and preformatted polycarbonate disk substrate was set in a sputtering apparatus with quaternary targets, and was rotated at a distance of 10 cm from the targets.

A ZnS protective layer of 800 Å in thickness was formed by sputtering, in argon gas, from a first target with a sputtering speed of 100 Å/min. and a sputtering pressure of $5 \times 10^{-3}$ Torr.

Then a GdFeCo alloy was sputtered, in argon gas, from a second target with a sputtering speed of 100 Å/min. and a sputtering pressure of $5 \times 10^{-3}$ Torr to obtain a first magnetic layer of $Gd_{20}Fe_{56}Co_{24}$ with a thickness of 400 Å and $T_{H1}$=ca. 350° C. $H_{L1}$ of said first magnetic layer itself was lower than ca. 500 Oe, and the transition metal was prevailing in the sub-lattice magnetization.

Then a TbFe alloy was sputtered from a third target under similar conditions to obtain a second magnetic layer of $Tb_{18}Fe_{82}$ with a thickness of 400 Å and $T_{L2}$=ca. 140° C. $H_{H2}$ of said second magnetic layer itself was above ca. 5000 Oe, and the transition metal was prevailing in the sub-lattice magnetization.

Then a GdTbFeCo alloy was sputtered from a fourth target under similar conditions to obtain a third magnetic layer of $Gd_{13}Tb_{13}Fe_{69.5}Co_{4.5}$ with a thickness of 300 Å and $T_{H3}$=ca. 210° C. $H_{L3}$ of said third magnetic layer itself was ca. 500–1500 Oe, and the rare earth metal was prevailing in the sub-lattice magnetization.

Subsequently a ZnS protective layer of 2000 Å in thickness was formed by sputtering from the first target.

After these layer formations, the above mentioned substrate was adhered to a polycarbonate plate with hot-melt adhesive material to obtain a magnetooptical disk. Said disk was mounted on a record/reproducing apparatus, and was made to pass through, with a linear speed of ca. 7 m/min., a unit generating a magnetic field of 2 KOe. Recording was then conducted with a laser beam of a wavelength of 830 nm, concentrated to ca. 1 μm and modulated in two levels of 4 and 8 mW, with a duty ratio of 50% and a frequency of 2 MHz. The bias field was 150 Oe. Binary signals could be then reproduced by irradiation with a laser beam of 1 mW.

Also recording test was made in the same method as in the Example 29, and the state of record of 4 and 8 mW was evaluated, as shown in Tab. 14.

TABLE 14

| Sample | Composition | | | Recording bit stability | | Record state | |
|---|---|---|---|---|---|---|---|
| | 1st mag. layer rich in | 2nd mag. layer rich in | 3rd mag. layer rich in | 60e | 60f | 4 mW | 8 mW |
| Ex. 29 | trans. metal | trans. metal | rare earth | + | + | + | + |
| 30-1 | rare earth | rare earth | trans. metal | + | + | + | + |
| 30-2 | trans. metal | trans. metal | trans. metal | + | − | − | ± |
| 30-3 | trans. metal | rare earth | rare earth | + | − | − | ± |
| 30-4 | rare earth | trans. metal | trans. metal | + | − | − | ± |
| 30-5 | rare earth | rare earth | rare earth | + | − | − | ± |
| 30-6 | rare earth | trans. metal | rare earth | ± | ± | ± | ± |
| 30-7 | trans. metal | rare earth | trans. metal | ± | ± | ± | ± |

The stability of record bits is represented by "+" or "−" respectively if the state 60e or 60f can stably exist or not in the absence of the external magnetic field.

The record state was evaluated as "−" if the reproduction signal could not be confirmed from the record with 4 mW or 8 mW, "±" if the reproduction signal could be confirmed but not satisfactory, and "+" if a satisfactory reproduction signal of C/N ratio of about 40 dB or higher could be obtained.

The results in Tab. 14 indicates that, for achieving satisfactory recording with stable record bits, the first and second magnetic layers should preferably be rich simultaneously in the transition metal (transition metal prevailing in the sub-lattice magnetization) or in the rare earth element (rare earth element prevailing in the sub-lattice magnetization) compared to the compensation composition, and the third magnetic layer should preferably prevailing element opposite to that in the first and second magnetic layers, as in the samples 29 and 30-1.

In another embodiment of the triple-layered magnetooptical recording medium of the structure shown in FIGS. 27 and 28, thee may be adopted relations:

$$H_1 > H_3 > H_2 \tag{11}$$

$$T_3 \geq T_2 \geq T_1 \tag{12}$$

wherein $T_1$, $T_2$ and $T_3$ are the Curie points respectively of the first, second and third magnetic layers 52, 53, 54, and $H_1$, $H_2$ and $H_3$ are the coercive forces respectively of said magnetic layers.

In general, the first magnetic layer 52 has $T_1$ in a range from 70° to 200° C. and $H_1$ in a range from 2 to 10 KOe, while the second magnetic layer 53 has $T_2$ from 90° to 400° C. and $H_2$ from 0.1 to 1 KOe, and the third magnetic layer 54 has $T_3$ from 150° to 400° C. and $H_3$ from 0.5 to 4 KOe. In such case, in order to achieve stable recording, the layer thicknesses, saturation magnetizations and magnetic wall energies should preferably be so regulated as to substantially satisfy following relations:

$$\frac{\sigma_{w12}}{2M_{s1}h_1} < H_1 \tag{13}$$

$$\frac{\sigma_{w23}}{2M_{s3}h_3} < H_3 \tag{14}$$

$$\frac{\sigma_{w12}}{2M_{s2}h_2} < \frac{\sigma_{w23}}{2M_{s2}h_2} \tag{15}$$

wherein $\sigma_{w12}$ is the magnetic wall energy of the first and second magnetic layers; $\sigma_{w23}$ is the magnetic wall energy of the second and third magnetic layers; $h_1$, $h_2$ and $h_3$ are the thicknesses of the first, second and third magnetic layers; and $M_{s1}$, $M_{s2}$ and $M_{s3}$ are the saturation magnetizations of said layers.

The information recording is conducted in the following manner, with the apparatus shown in FIG. 6.

It is assumed, prior to the recording, that the magnetizations of the first magnetic layer 52 and of the second magnetic layer 53 are in a mutually opposite (antiparallel) stable state, while the magnetizations of the second and third magnetic layers 53, 54 are in a mutually parallel stable state. It is also assumed that a part of the magnetic layers is in a state of magnetization shown by 63a in FIG. 33.

Figure 33:
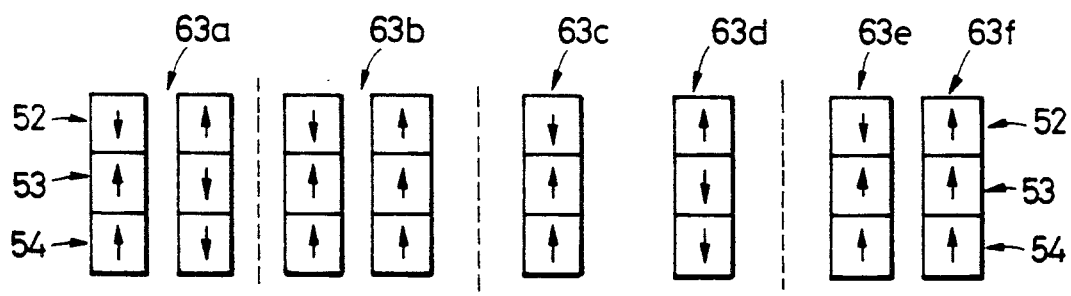

The magnetooptical disk 9, being rotated by the spindle motor as shown in FIG. 6, passes through the position of the magnetic field generating unit 8, generating a magnetic field, which is upwards in the present case and of which intensity is adjusted to a value between the coercive forces of the first and second magnetic layers 52, 53, whereby the second and third magnetic layers 53, 54 are uniformly magnetized but the first magnetic layer 52 retains the initial state of magnetization, as shown by 63b in FIG. 33.

Figure 34:
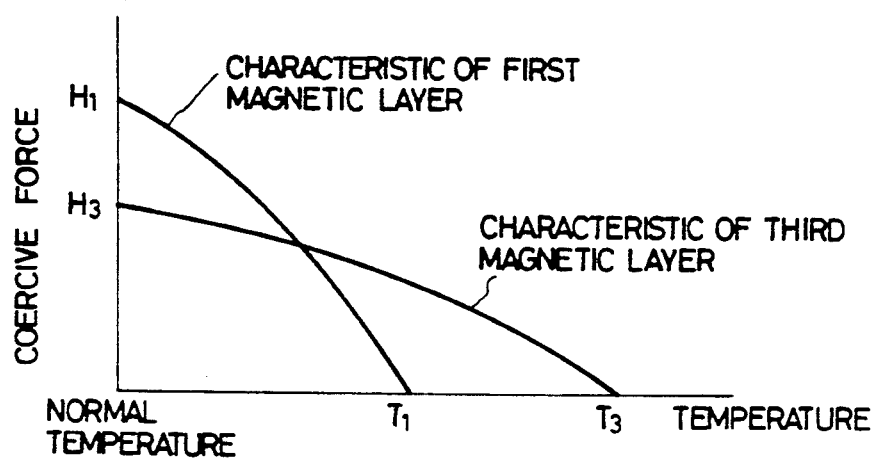

Then the magnetooptical disk 9 is rotated, and, in passing the record/reproducing head 5, is irradiated by a laser beam with one of two power levels, according to a signal from the recording signal generator 6. The first laser power is enough for heating the disk to a temperature close to the Curie point of the first magnetic layer (a temperature close to $T_1$ and allowing to orient the magnetization of the first magnetic layer in a stable direction with respect to the magnetizations of the second and third magnetic layers), while the second laser power is enough for heating the disk to a temperature close to the Curie points of the second and third magnetic layers (a temperature close to $T_2$ and $T_3$ and allowing to uniformly invert the magnetizations of the second and third magnetic layers). Referring to FIG. 34 showing the temperature dependence of the coercive forces of the magnetic layers 52, 54, the first laser power can elevate the temperature of the disk close to $T_1$ while the second laser power can elevate the temperature of the disk close to $T_3$.

The first laser power heats the first and third magnetic layers 52, 54 close to the Curie point of the first magnetic layer 52, but the third magnetic layer 54 has a coercive force allowing to stably maintain the record bit at this temperature. Thus, through a suitable selection of the bias magnetic field, a record bit as shown by 63c in FIG. 33 can be formed, as a preliminary recording of first type, from either state of magnetization shown by 63b. The magnetization of the second magnetic layer, having a stronger exchange force with the third magnetic layer than with the first magnetic layer, becomes always parallel with the magnetization of the third magnetic layer, as illustrated.

The suitable selection of the bias magnetic field has the following meaning.

In said preliminary recording of first type, the bias magnetic field is essentially unnecessary because the first magnetic layer 52 receives an exchange force to orient the magnetization thereof in a stable (opposite or antiparallel in the present case) direction with respect to the magnetization of the third magnetic layer 54. However the bias magnetic field is provided for the preliminary recording with the second laser power to be explained later, in a direction to assist the inversion of magnetization of the third magnetic layer 54, or a direction to hinder the preliminary recording of first type. It is convenient that said bias magnetic field is maintained in a same intensity and in a same direction, both in the preliminary recording of first and second types. In consideration of these conditions, the bias magnetic field should preferably be maintained at a minimum necessary level for the preliminary recording of second type to be explained in the following, and such bias field corresponds to the above-mentioned suitable selection.

When the disk is heated close to the Curie point of the third magnetic layer 54 by the second laser power for the preliminary recording of second type, the magnetizations of the third and second magnetic layers 54, 53 are inverted by the bias magnetic field selected as explained above. Subsequently the magnetization of the first magnetic layer 52 is also oriented in a stable (opposite or antiparallel in the present case) direction with respect to the magnetization of the third magnetic layer 54. In this manner a preliminary recording bit as shown by 63d in FIG. 33 can be formed from either state of magnetization shown by 63b.

In this manner each area of the magnetooptical disk can form a preliminary record of the state 63c of 63d as shown in FIG. 33, by means of the bias magnetic field and the laser power of first or second level according to the input signal.

Then the magnetooptical disk 9 is further rotated and passes again the position of the magnetic field generating unit 8, generating a magnetic field of which intensity is selected between the coercive forces of the first and third magnetic layers 52, 54 as explained before, whereby the record bit 63c remains unchanged as a final record bit 63e, while the record bit 63d assumes another final record state 63f as the result of magnetic inversion of the third magnetic layer.

In order that the record bit 63f can stably exist, the aforementioned conditions (13) to (15) should be satisfied, because of the following reasons.

$\sigma_{w12}/2M_{s1}h_1$ indicates the magnitude of the exchange force received by the first magnetic layer, or represents the magnitude of a magnetic field acting to rearrange the magnetization of the first magnetic layer in a stable (opposite or antiparallel in the present case) direction with respect to the magnetization of the second magnetic layer. Therefore, in order that the first magnetic layer can retain its magnetization unchanged against said magnetic field, said layer should have a coercive force $H_1$ larger than the magnitude of said exchange force $(\sigma_{w12}/2M_{s1}h_1 < H_1$.

The second magnetic layer 53 receives, from a magnetic wall at the interface with the first magnetic layer 52, an exchange force of a magnitude $\sigma_{w12}/2M_{s2}h_2$ and of a direction to orient the magnetization of the second magnetic layer in a stable direction with respect to the magnetization of the first magnetic layer 52, and also receives, from a magnetic wall at the interface with the third magnetic layer 54, an exchange force of a magnitude $\sigma_{w23}/2M_{s2}h_2$ and of a direction to orient the magnetization of the second magnetic layer in a stable direction with respect to the magnetization of the third magnetic layer 54. Consequently, in order that the magnetization of the second magnetic layer is constantly oriented in a stable direction with respect to the magnetization of the third magnetic layer during and after the recording operation, there are required conditions $(\sigma_{w23}/2M_{s2}h_2) > (\sigma_{w12}/2M_{s1}h_1)$ and $(\sigma_{w23}/2M_{s2}h_2) > H_2$.

Also $\sigma_{w23}/2M_{s3}h_3$ indicates the magnitude of the exchange force received by the third magnetic layer 54, or represents the magnitude of a magnetic field acting, across the second magnetic layer 53, to rearrange the magnetization of the third magnetic layer in a stable (opposite or antiparallel in the present case) direction with respect to the magnetization of the first magnetic layer 52. In order that the magnetization of the third magnetic layer 54 is not inverted against said magnetic field, or in order that the record bit 63f in FIG. 33 can stably exist, the coercive force $H_3$ of the third magnetic layer 54 should satisfy a condition $(\sigma_{w23}/2M_{s3}h_3) < H_3$.

From the foregoing explanation the interfacial magnetic wall energies should satisfy a condition $\sigma_{w23} > \sigma_{w12}$, so that:

a) it is desirable to realize a weak coupling between the first and second magnetic layers, by adopting a composition rich in rare earth element compared with the compensation composition for one of said layers and a composition rich in transition metal for the other of said layers; and b) to realize a strong coupling between the second and third magnetic layers by adopting compositions both rich in the rare earth element or compositions both rich in the transition metal.

Also it is possible to reduce the exchange force from the third magnetic layer to the second magnetic layer, by reducing the exchange force $\sigma_{w12}/2M_{s2}h_2$ from the first magnetic layer to the second magnetic layer, and the exchange force $\sigma_{w23}/2M_{s2}h_2$ from the third magnetic layer to the second magnetic layer. For this purpose it is advantageous to reduce the saturation magnetization $M_{s2}$ of the second magnetic layer, namely to minimize the coercive force $H_2$ thereof. Therefore at least a condition $H_3 > H_2$ is desirable.

In the recording process of the present embodiment, the record bits 63e and 53f do not depend on the state prior to recording but are solely controlled by the recording laser power, so that an overwriting operation is possible. The record bits 63e, 63f can be reproduced by irradiation with a reproducing laser beam and by processing of the resulting light with the recording signal reproducer 7.

EXAMPLE 31

A pregrooved and preformatted polycarbonate disk substrate was set in a sputtering apparatus with four targets, and was rotated at a distance of 10 cm from the targets.

A ZnS protective layer of 800 Å in thickness was formed by sputtering, in argon gas, from a first target, with a sputtering speed of 100 Å/min. and a sputtering pressure of $5 \times 10^{-3}$ Torr.

Then a TbFe alloy was sputtered, in argon gas, from a second target with a sputtering speed of 100 Å/min. and a sputtering pressure of $5 \times 10^{-3}$ Torr to obtain a first magnetic layer of $Tb_{18}Fe_{82}$ of a thickness of 300 Å and $T_1 =$ca. 140° C. $H_1$ of said first magnetic layer itself was ca. 10 KOe, and the transistion metal was prevailing in the sub-lattice magnetization Then a TbFeCo alloy was sputtered under similar conditions from a third target to obtain a second magnetic layer of $Tb_{25}Fe_{65}Co_{10}$ with a thickness of 150 Å and $T_2 =$ca. 210° C. $H_2$ of said second magnetic layer itself was lower than ca. 200 Oe, and the rare earth element was prevailing in the sub-lattice magnetization.

Subsequently a TbFeCo alloy was sputtered under similar conditions from a fourth target to obtain a third magnetic layer of $Tb_{23}Fe_{67}Co_{10}$ with a thickness of 300 Å and $T_3 =$ca. 210° C. $H_{L3}$ of said third magnetic layer itself was ca. 500–1500 Oe, and the rare earth element was prevailing in the sub-lattice magnetization.

Then a ZnS protective layer of 2000 Å in thickness was formed by sputtering from the first target under similar conditions.

After said layer formation, the above-mentioned substrate was adhered to a polycarbonate plate with hot-melt adhesive material to obtain a magnetooptical disk. Said disk was mounted on a record/reproducing apparatus, and was made to pass through, with a linear speed of ca. 7 m/sec., a unit for generating a magnetic field of 2 KOe. The recording was conducted with a laser beam of a wavelength of 830 nm, concentrated to ca. 1 $\mu$ and modulated in two levels of 4 and 8 mW with a duty ratio of 50% and a frequency of 2 MHz. The bias field was 150 Oe. Then binary signals could be reproduced by irradiation with a laser beam of 1 mW.

The above-explained experiment was repeated with a magnetooptical disk already recorded over the entire surface. The previously recorded signal components were not detected in the reproduction, and the possibility of overwriting was thus confirmed.

EXAMPLE 32

Samples of magnetooptical disk shown in Tab. 15 were prepared in the same manner as in Example 31. The thickness of the layers were maintained same as in the Example 31 for the purpose of comparison, but the compositions of the first, second and third magnetic layers were selected in various combinations of compositions rich in the rare earth element and those rich in the transition metal. The coercive forces of the first and third magnetic layers were respectively regulated to ca. 10 KOe and ca. 1 KOe through the control of contents of Tb and Fe.

In Tab. 15, TM means a composition rich in the transition metal compared with the compensation composition, and RE means a composition rich in the rare earth element.

TABLE 15

| Sample | Composition | | | $H_2$ of 2nd mag. layer | Bit Stability | Record state |
|---|---|---|---|---|---|---|
| | 1st mag. layer rich in | 2nd mag. layer rich in | 3rd mag. layer rich in | | | |
| EX. 31 | TM | RE | RE | 200 Oe | + | + |
| 32-1 | TM | RE | RE | 500 | + | + |
| 32-2 | TM | RE | RE | 1000 | ± | + |
| 32-3 | TM | RE | RE | 1500 | − | − |
| 32-4 | RE | TM | TM | 300 | + | + |
| 32-5 | RE | TM | TM | 700 | + | + |
| 32-6 | TM | TM | RE | 500 | + | − |
| 32-7 | TM | TM | TM | 500 | − | − |
| 32-8 | RE | RE | TM | 200 | + | − |

In the first magnetic layer, the TM-rich composition was $Tb_{18}Fe_{82}$, while the RE-rich composition was $Tb_{20}FE_{80}$. In the third magnetic layer, the TM-rich composition was $Tb_{15}FE_{75}Co_{10}$, while the RE-rich composition was $Tb_{23}Fe_{67}Co_{10}$.

The stability of the record bit, particularly in the state 63f, was investigated on thus prepared samples, by measuring the external magnetic field inducing the inversion of magnetization by a VSM. In the results shown in Tab. 15, "+" indicates stable existence of the record bit in the state of 63f in the absence of external field, while "−" indicates a partial inversion of the magnetization of the third magnetic layer. Also the recordings of first and second types were conducted in the same method as in the Example 31, and the result was evaluated as "+" or "−" respectively if satisfactory reproduction signal was obtained or not.

The results on the Example 31 and the Example 32-1 to 32-5 listed in Tab. 15 indicate that satisfactory bit stability and satisfactory record state could be obtained, as explained in the foregoing, by a combination of a TM-rich first magnetic layer with RE-rich second and third magnetic layers or of an RE-rich first magnetic layer with TM-rich second and third magnetic layers, and when the coercive force $H_2$ of the second magnetic layer is smaller than the coercive force $H_3$ of the third magnetic layer.

EXAMPLE 33

Samples of magnetooptical disk shown in Tab. 16 were prepared in the same manner as in the Example 31. The thicknesses of the layers were maintained same as in the Example 31 for the purpose of comparison, but the composition of the second magnetic layer was varied in comparison with the Example 31. The coercive force thereof was less than ca. 200 Oe, and the rare earth element was prevailing in the sub-lattice magnetization, as in the Example 31.

The prepared samples were evaluated in the same manner as in the Example 32.

TABLE 16

| Sample | Composition of 2nd mag. layer | $T_2$(°C.) | Bit stability | Record state |
|---|---|---|---|---|
| 33-1 | $Tb_{24}Fe_{76}$ | 140 | + | + |
| 33-2 | $Tb_{13}Gd_{12}Fe_{75}$ | 160 | + | + |
| 33-3 | $Tb_{13}Gd_{12}Fe_{73}Co_2$ | 180 | + | + |
| 33-4 | $Tb_{13}Gd_{12}Fe_{71}Co_4$ | 200 | + | + |
| 33-5 | $Dy_{25}Fe_{75}$ | 70 | + | ± |
| 33-6 | $Tb_5 Gd_{20}Fe_{70}Co_d$ | 250 | + | ± |
| 33-7 | $Tb_5 Gd_{20}Fe_{65}Co_{10}$ | 300 | + | − |

The results of the samples listed in Tab. 16 indicate that satisfactory recording could be obtained when the curie point $T_2$ of the second magnetic layer is located between $T_1$ and $T_3$, (Examples 33-1 to 33-4), the recording of first type could not be satisfactorily made if $T_2$ was lower than $T_1$ (Example 33-5).

Also the recording of second type could not be made satisfactorily when $T_2$ is higher than $T_3$ (Examples 33-6, 33-7).

Quadruple-layered Structure

Furthermore, the magnetooptical recording medium of the present invention may be provided with four magnetic layers, as will be explained in the following.

Figure 35:
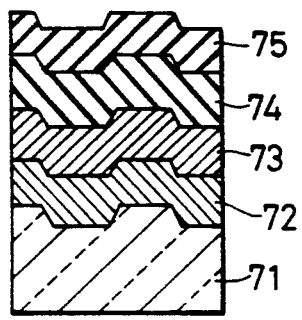
FIGS. 35 and 36 are schematic cross-sectional views of embodiments of the magnetooptical recording medium of the present invention utilizing quadraple-layered magnetic film.
Figure 36:
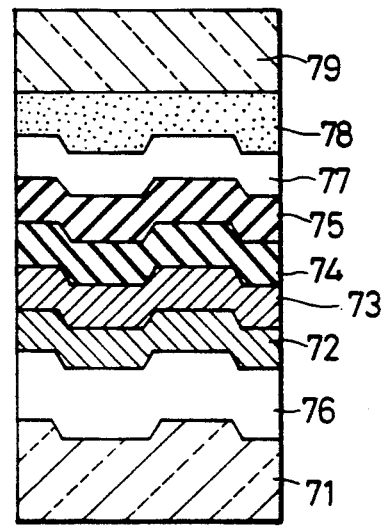

FIGS. 35 and 36 are schematic cross-sectional views of quadraple-layered embodiments of the magnetooptical recording medium of the present invention. The medium shown in FIG. 35 is composed of a pregrooved translucent substrate 71, and, a first magnetic layer 72, a second magnetic layer 73, a third magnetic layer 74 and a fourth magnetic layer 75 laminated thereon. Said first, second, third and fourth magnetic layers respectively have Curie points $T_1$, $T_2$, $T_3$ and $T_4$; coercive forces $H_1$, $H_2$, $H_3$ and $H_4$; thicknesses $h_1$, $h_2$, $h_3$ and $h_4$; and saturation magnetizations $M_{s1}$, $M_{s2}$, $M_{s3}$ and $M_{s4}$. Also the magnetic wall energies between the first and second magnetic layers, between the second and third magnetic layers, and between the third and fourth magnetic layers are respectively represented by $\sigma_{w12}$, $\sigma_{w23}$ and $\sigma_{w34}$. The above-mentioned four magnetic layers satisfy following conditions I–IV, through mutual exchange-couplings.

I. For the Curie points of the magnetic layers:

$$T_1, T_4 > T_2, T_3 \tag{16}$$

II. For the coercive forces of the magnetic layers:

$$H_2 > H_4 > H_1, H_3 \quad (17)$$

III. For the thicknesses of the magnetic layers:

$$h_1 + h_2 \geqq 250 \text{ Å}$$

$$h_1 + h_2 + h_3 + h_4 \geqq 600 \text{ Å} \quad (18)$$

IV. or the saturation magnetizations, thicknesses, coercive forces and magnetic wall energies of the magnetic layers:

$$\frac{\sigma_{w12}}{2M_{s1}h_1} > H_1 \quad (19)$$

$$H_2 > \frac{\sigma_{w12}}{2M_{s2}h_2}, \frac{\sigma_{w23}}{2M_{s2}h_2} \quad (20)$$

$$H_3 < \frac{\sigma_{w23}}{2M_{s3}h_3}, \frac{\sigma_{w34}}{2M_{s3}h_3} \quad (21)$$

$$H_4 > \frac{\sigma_{w34}}{2M_{s4}h_4} \quad (22)$$

It is generally desirable that the first magnetic layer 72 has $T_1$ of 150°-400° C., $H_1$ of 0.1-1 KOe, a thickness $h_1$ of 50-300 Å; the second magnetic layer 73 has $T_2$ of 70°-200° C., $H_2$ of 2-12 KOe, a thickness $h_2$ of 50-300 Å; the third magnetic layer 74 has $T_3$ of 0°-200° C., $H_3$ of 0.1-1 KOe, a thickness $h_3$ of 50-300 Å; and the fourth magnetic layer 75 has $T_4$ of 100°-300° C., $H_4$ of 0.5-4 KOe, and a thickness $h_4$ of 50-600 Å.

Each magnetic layer can be principally composed of a substance exhibiting a vertical magnetic anisotropy and a magnetooptical effect, preferably an amorphous alloy of a rare earth element and a transition metal element, such GdCo, GdFe, TbFe, DyFe, GdTbFe, TbDyFe, GdTbFeCo, TbFeCo or GdTbCo.

In the magnetooptical recording medium of the present invention, neighboring magnetic layers are coupled with an exchange force. The first and second magnetic layers are relatively strongly couple, while the second and third magnetic layers relatively weakly coupled, and the third and fourth magnetic layers are relatively weakly coupled. A large magnetic wall energy is present between the strongly coupled layers, while a weak magnetic wall energy is present between the weakly coupled layers. The value of the magnetic wall energy $\sigma_w$ is optimized in regulating $M_s$, h, H and $\sigma_w$ for satisfying the aforementioned relations IV.

Figure 37:
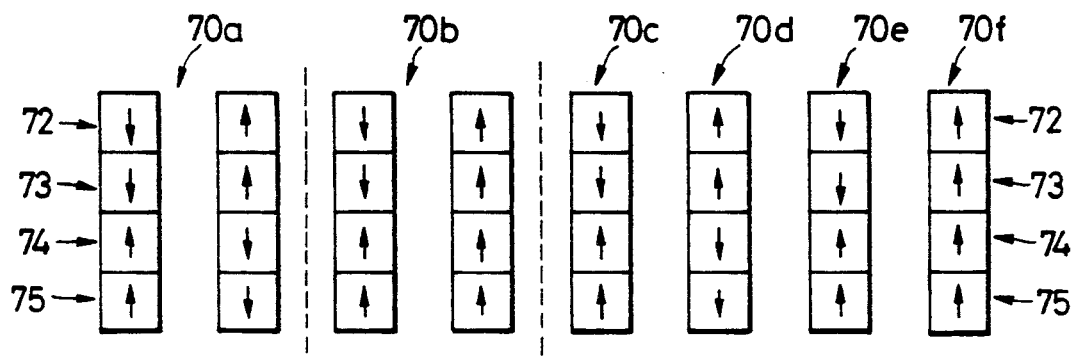
FIG. 37 is a schematic view showing states of magnetization in the recording process utilizing the medium shown in FIG. 35.

In the four magnetic layers 72, 73, 74, 75 the thickness, coercive force, saturation magnetization and magnetic wall energy of each layer are so regulated to satisfy the aforementioned relations, and such regulation will stabilize the finally completed two states of magnetization shown by 70e and 70f in FIG. 37.

In another embodiment of the magnetooptical recording medium shown in FIG. 36, protective layers 76, 77 are provided for improving the durability of the four magnetic layers 72, 73, 74, 75 or enhancing the magnetooptical effect thereof.

An adhesive layer 78 is provided for adhering a covering substrate 79. Recording and reproduction can be made from both sides if the layers of 72 to 77 are formed also on said covering substrate 79.

Figure 38:
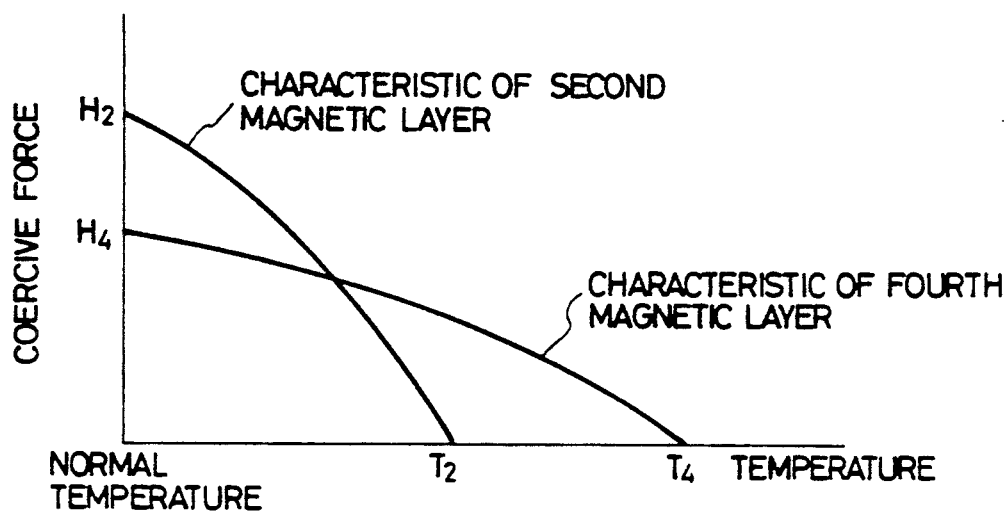
FIG. 38 is a chart showing the temperature characteristic of the coercive force of the magnetic layers in the medium shown in FIG. 35.

Now reference is made to FIGS. 37 and 38 for explaining the recording process of the present embodiment, wherein, prior to the recording, among four magnetic layers, the magnetizations of mutually neighboring layers may be in a mutually parallel stable state, or in a mutually opposite (antiparallel) stable state.

However, since mutually parallel magnetizations provide a relatively strong coupling while mutually antiparallel magnetizations provide a relatively weak coupling, the magnetooptical recording medium of the present invention should preferably have such state of magnetization that the magnetizations of the first and second magnetic layers are in a mutually parallel stable state while those of the second and fourth magnetic layers are in a mutually antiparallel stable state.

The recording and reproducing operation on the medium of the present embodiment can also be conducted with the apparatus shown in FIG. 6. It is assumed that a part of said medium has an initial magnetization as shown by 70a in FIG. 37, and that the magnetizations of the third and fourth magnetic layers are in a mutually parallel stable state. As shown in FIG. 6, the magnetooptical disk 9, being rotated by a spindle motor, passes the position of a magnetic field generating unit 8, generating an upward magnetic field of which intensity is selected at a suitable level between the coercive forces of the second and fourth magnetic layers 73, 75, whereby, as shown by 70b in FIG. 37, the fourth magnetic layer 75 is uniformly magnetized, and the third magnetic layer 74, strongly coupled with the fourth layer 75, is also magnetized in the same direction. On the other hand, the second magnetic layer 73 retains the initial magnetization, and the first magnetic layer 72, strongly coupled with the second magnetic layer 73, also retains the initial magnetization.

The rotated magnetooptical disk 9, in passing the position of a record/reproducing head 5, is irradiated by a laser beam with one of two power levels according to the signal from a recording signal generator 6. The first laser power is enough for heating the disk to a temperature close to the Curie point of the second magnetic layer 73, while the second laser power is enough for heating the disk to a temperature close to the Curie point of the fourth magnetic layer 75. Referring to FIG. 38 showing the temperature dependence of the magnetic layers 73, 75, the first laser power can heat the disk close to $T_2$, while the second laser power can heat the disk close to $T_4$.

The first laser power heats the second and fourth magnetic layers 73, 75 close to the Curie point of the second magnetic layer, but the fourth magnetic layer 75 has a coercive force capable of stably maintaining the bit at this temperature. Thus, through a suitable selection of the recording bias magnetic field, the magnetizations of the magnetic layers are oriented in stable directions with respect to the magnetization of the fourth magnetic layer in the course of temperature lowering of the record bit area.

In this manner a record bit shown by 70c in FIG. 37 can be formed, as a preliminary recording of first type, from either state of magnetization shown by 70b.

The suitable selection of the bias magnetic field has the following meaning. In said preliminary recording of first type, such bias magnetic field is essentially unnecessary, since the magnetizations of the first, second and third magnetic layers receive forces (exchange forces) to orient the magnetizations thereof in respective stable directions with respect to the magnetization of the fourth magnetic layer 75. However said bias magnetic field is provided, in a preliminary recording utilizing the second laser power to be explained later, in a direction to assist the magnetic inversion of the fourth magnetic layer 75. Also said bias magnetic field should preferably have a same magnitude and a same direction in both preliminary recordings with the first and second laser power. In consideration of such conditions, the bias magnetic field is preferably selected at a minimum necessary intensity required for the preliminary recording with the second laser power to be explained later, and such selection corresponds to the above-mentioned suitable selection.

When the disk is heated close to the Curie point of the fourth magnetic layer 75 by a second laser power (preliminary recording of second type), the magnetization of said fourth magnetic layer 75 is inverted by the above-mentioned bias magnetic field. Also the magnetizations of the first, second and third magnetic layers are oriented in stable directions with respect to the magnetization of the fourth layer 75. Thus a record bit shown by 70$d$ in FIG. 37 can be formed from either state of magnetization shown in 70$b$.

Thus each area of the magnetooptical disk can have a preliminary record bit 70$c$ or 70$d$, shown in FIG. 37, by the bias field and by the first or second laser power corresponding to the input signal.

Then the magnetooptical disk 9 is further rotated, so that the preliminary record bit 70$c$ or 70$d$ passes again through the magnetic field generating unit 8, of which field intensity is selected, as explained before, between the coercive forces of the magnetic layers 73, 75. Thus the record bit 70$c$ remains unchanged and assumes a final record state 70$e$. On the other hand, the record bit 70$d$ causes the inversion of magnetizations of the third and fourth magnetic layers 74, 75 to assume another final record state 70$f$.

The aforementioned relations (18) to (22) are required in order that the record bit 70$f$ can stably exist.

The relations (20) and (22) are required in order that the second and fourth magnetic layers assume an unstable state.

The relation (19) is required to cause a strong coupling between the first and second magnetic layers, and to constantly orient the magnetization of the first magnetic layer in a stable direction with respect to the magnetization of the second magnetic layer.

The relation (21) is required in order to constantly stabilize the magnetization of the third layer with respect to the magnetization of either the fourth or the second magnetic layer.

Also the relation (18) is required in order to optimize the recording sensitivity and the C/N ratio in reproduction, as will be clarified in the following examples.

The record bit states 70$e$, 70$f$ do not depend on the states prior to recording but are solely determined by the recording laser power, so that the over-writing operation is rendered possible. The record bits 70$e$, 70$f$ can be reproduced by irradiating the disk with a reproducing laser beam and processing the resulting light with the recording signal reproducer 7.

The intensity or modulation of the reproduced signal principally depends on the magnetooptical effect of the first and second magnetic layers as explained before. The present embodiment enables recording with strong reproduction signal, since a material of a high Curie point, namely of a large magnetooptical effect, can be used for the first magnetic layer which receives the reproducing beam.

EXAMPLE 34

A pregrooved and preformatted polycarbonate disk substrate was set in a sputtering apparatus, with ternary targets, and was rotated at a distance of 10 cm from the targets.

A ZnS protective layer of 900 Å in thickness was formed by sputtering, in argon gas, from a first target with a sputtering speed of 100 Å/min. and a sputtering pressure of $5 \times 10^{-3}$ Torr.

Then a GdFECoTi alloy was sputtered, in argon gas, from a second target with a sputtering speed of 100 Å/min. and a sputtering pressure of $5 \times 10^{-3}$ Torr to obtain a first magnetic layer of $Gd_{18}Fe_{55}Co_{24}Ti_3$ with a thickness of 200 Å and $T_1=$ca. 350° C. $H_1$ of said first magnetic layer itself was lower than ca. 300 Oe, and the transition metal was prevailing in the sub-lattice magnetization.

Then a TbFe alloy was sputtered from a third target under similar conditions to obtain a second magnetic layer of $Tb_{18}Fe_{82}$ with a thickness 150 Å and $T_2=$ca. 140° C. $H_2$ of said second magnetic layer itself was 10 KOe, and the transition metal was prevailing in the sub-lattice magnetization.

Then a GdTbFe alloy was sputtered from a fourth target under similar conditions to obtain a third magnetic layer of $Gd_{11}Tb_{11}Fe_{76}$ with a thickness of 100 Å and $T_3=$ca. 160° C. $H_3$ of said third magnetic layer was 100-300 Oe, and the rare earth element was prevailing in the sub-lattice magnetization.

Then a TbFeCo alloy was sputtered from a fifth target under similar conditions to form a fourth magnetic layer of $Tb_{23}Fe_{72}Co_5$ with a thickness of 200 Å and $T_4=$ca. 210° C. $H_4$ of said fourth magnetic layer itself was 500-1500 Oe, and the rare earth element was prevailing in the sub-lattice magnetization.

Subsequently a ZnS protective layer of 2000 Å in thickness was formed by sputtering from the first ½ target under the same conditions as before.

After said layer formations, the above-mentioned substrate was adhered to a polycarbonate plate with hot-melt adhesive material to obtain a magnetooptical disk.

Said disk was mounted on a record/reproducing apparatus, and was made to pass through a unit generating a magnetic field of 2 KOe, with a linear speed of ca. 7 m/sec. Recording was conducted with a laser beam of a wavelength of 830 nm, focused to ca. 1 μm and modulated in two levels of 4 and 8 mW, with a duty ratio of 50% and a frequency of 2 MHz. The bias field was 150 Oe. Binary signals could then be reproduced by irradiation with a laser beam of 1 mW.

The above-explained experiment was repeated with a magnetooptical disk already recorded over the entire surface. The previously recorded signals were not detected in the reproduction, and the possibility of overwriting was confirmed in this manner.

EXAMPLE 35

Samples of magnetooptical disk was prepared with the same materials and structure as in the Example 34, with varying thicknesses in the first to fourth magnetic layers. Results of measurements of reflectance and Kerr rotation angle are shown in Tab. 17. The reflectance was generally in a range of 23-24%, including the reflection of ca. 4% from the surface of the substrate. Also a larger Kerr rotation angle will provide a larger C/N ratio of the reproduction signal.

TABLE 17

| Sample | h1 (Å) | h2 (Å) | h3 (Å) | h4 (Å) | h1 + h2 (Å) | h1 + h2 + h3 + h4 (Å) | θk (°) |
|---|---|---|---|---|---|---|---|
| 35-1 | 50 | 100 | 100 | 700 | 150 | 950 | 0.70 |
| 35-2 | 100 | 100 | 100 | 700 | 200 | 1000 | 0.76 |
| 35-3 | 150 | 100 | 100 | 700 | 250 | 1050 | 0.83 |
| 35-4 | 200 | 100 | 100 | 700 | 300 | 1100 | 0.83 |
| 35-5 | 100 | 50 | 100 | 700 | 150 | 950 | 0.72 |
| 35-6 | 100 | 100 | 100 | 700 | 200 | 1000 | 0.76 |
| 35-7 | 100 | 150 | 100 | 700 | 250 | 1050 | 0.79 |
| 35-8 | 100 | 200 | 100 | 700 | 300 | 1100 | 0.79 |
| 35-9 | 100 | 300 | 100 | 700 | 400 | 1200 | 0.79 |
| 35-10 | 200 | 100 | 50 | 100 | 300 | 450 | 0.60 |
| 35-11 | 200 | 100 | 100 | 100 | 300 | 500 | 0.74 |
| 35-12 | 200 | 100 | 100 | 200 | 300 | 600 | 0.83 |
| 35-13 | 200 | 100 | 100 | 300 | 300 | 700 | 0.83 |
| 35-14 | 200 | 100 | 100 | 400 | 300 | 800 | 0.83 |
| 35-15 | 200 | 100 | 100 | 500 | 300 | 900 | 0.83 |
| 35-16 | 200 | 100 | 100 | 600 | 300 | 1000 | 0.83 |

The results on the samples 35-1 to 35-9 indicate that the Kerr rotation angle θk shows saturation close to a value for a sufficiently thick first magnetic layer, if the total thickness $h_1 + h_2$ of the first and second magnetic layers exceeds 250 Å, only when the total thickness of the first to fourth magnetic layer is sufficiently large.

Also the results on the samples 35-10 to 35-16 indicate that the Kerr rotation angle θk shows saturation, if the total thickness $h_1 + h_2$ of the first and second magnetic layers exceeds 250 Å, when the total thickness of the first to fourth magnetic layers is equal to or larger than 600 Å.

Therefore, in order to obtain a high C/N ratio at the reproduction, it is preferable to select the layer thicknesses in such a manner as to satisfy conditions $h_1 + h_2 \geq 250$ Å and $h_1 + h_2 + h_3 + h_4 \geq 600$ Å.

Other Recording Processes than Overwriting

In the foregoing embodiments, the magnetooptical recording medium of the present invention has been explained in relation to an overwriting process, but said medium can also be employed in the conventional recording process consisting of recording, erasure and re-recording. In such process there can be considered a case in which the magnetizations of two magnetic layers are in a mutually stable state in the recorded area, and another case in which said magnetizations are in a mutually stable state in the unrecorded area. These two cases will be separately explained in the following.

(i) Case of stable state in unrecorded area

Recording is conducted on a magnetooptical recording medium of a structure as shown in FIG. 3, with an apparatus as shown in FIG. 6. The recording process is illustrated in FIG. 39, wherein it is assumed that the magnetizations of the magnetic layers 2, 3 are stable when they are oriented in a same direction (parallel).

Figure 39:
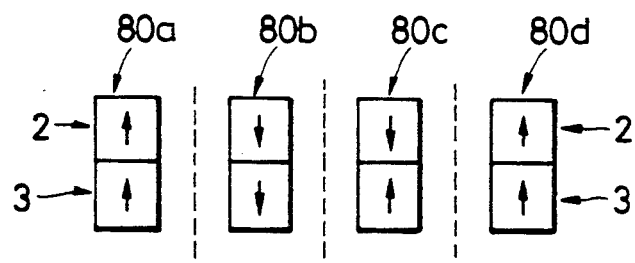
FIGS. 39, 41, 42 and 43 are charts showing states of magnetization in the recording and erasing processes utilizing the medium shown in FIG. 3.

At first the magnetizations of the disk 9 are oriented upwards as shown by 80a in FIG. 39. An area to be recorded is locally heated, by a laser beam of a recording power from the record/reproducing head 5, to a temperature close to the Curie point of the second magnetic layer 3. Simultaneously there is applied a bias magnetic field (downward in FIG. 39) of a magnitude which is necessary, or, preferably minimum necessary as will be explained later, for inverting the magnetization of the second magnetic layer 3. Thus, following the magnetic inversion of the second magnetic layer 3, the magnetization of the first magnetic layer 2 is also oriented in a stable direction (same direction in the present case) with respect to the magnetization f the second magnetic layer 3. In this manner a record bit 80b shown in FIG. 39 is formed.

Upon rotation of the magnetooptical disk 9, said bit 80b passes through the position of the magnetic field generating unit 8, of which field intensity is selected between the coercive forces $H_L$ and $H_H$ of the two magnetic layers and of which field is oriented in a direction to invert the magnetization of the second magnetic layer in the bit 80b in FIG. 39, whereby the second magnetic layer 3 is magnetized along the direction of the field from said unit 8 as shown by 80c, while the first magnetic layer 2 retains the magnetization state 80b. In this manner the magnetizations of the two magnetic layers are in a mutually opposite or antiparallel state, and such state is utilized as the final record.

The record bit 80c can be erased in the following manner. The magnetooptical disk is rotated by a spindle motor, and the record bit, in passing the record/reproducing head 5, is irradiated with a laser beam of an erasing power, whereby the irradiated area is heated close to the Curie point of the first magnetic layer 2. Since the second magnetic layer 3 has a coercive force enough for retaining the bit in stable manner at such temperature, the record bit is erased as shown by 80d in FIG. 39 through a suitable selection of the bias magnetic field.

The suitable selection of the bias field has the following meaning.

In this erasing process, the bias field is essentially unnecessary because the first magnetic layer 2 receives an exchange force to orient its magnetization in a stable direction (same direction in this case) with respect to the magnetization of the second magnetic layer 3. However, as explained before, the bias field is provided, for the recording process, in a direction to assist the magnetic inversion of the second magnetic layer 3. It is convenient if said bias field selected for the recording process can be maintained also in the erasing process with same magnitude and direction. Based on such consideration, the suitable selection of the bias field is achieved by selecting an intensity and a direction enabling the recording process and not hindering the erasing process, preferably an intensity and a direction which are minimum necessary for the recording process, and such bias field is then maintained also in the erasing process.

However it is also possible to remove the bias field at the erasing, since it is essentially unnecessary as explained before. Also it is not necessary to maintain the bias field in the same direction and magnitude in the recording and erasing processes, if the record/reproducing head is capable of varying the bias field according to the recording and reproducing operations. Since the recording and erasing operations basically require mutually opposite bias fields, and such variation of the bias field enables recording are erasure at a higher speed.

Figure 41:
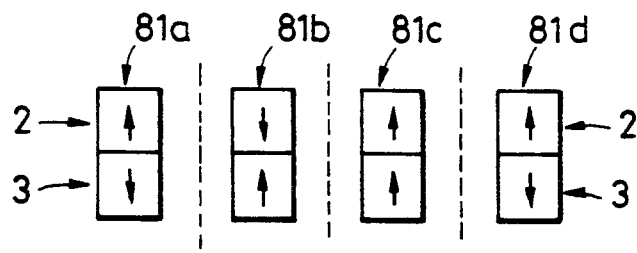

Though FIG. 39 shows the principle of recording and erasure in case the magnetizations of the first and second magnetic layers are stable when they are oriented in a same direction, a substantially same principle is applicable also if said magnetizations are stable when they are oriented in mutually opposite or antiparallel directions. Such principle is illustrated in FIG. 41, wherein the states of magnetization 81a–81d respectively correspond to 80a–80d shown in FIG. 39.

EXAMPLE 36

A pregrooved and preformatted polycarbonate disk substrate was set in a sputtering apparatus with ternary targets, and was rotated at a distance of 10 cm from the targets.

A ZnS protective layer of 1000 Å in thickness was formed by sputtering, in argon gas, from a first target with a sputtering speed of 100 Å and a sputtering pressure of $5 \times 10^{-3}$ Torr. Then a TbFe alloy was sputtered, in argon gas, from a second target with a sputtering speed of 100 Å and a sputtering pressure of $5 \times 10^{-3}$ Torr to obtain a first magnetic layer of $Tb_{18}Fe_{82}$ with a thickness of 500 Å, $T_L$=ca. 140° C. and $H_H$=ca. 10 KOe.

Then a TbFeCo alloy was sputtered, in argon gas, with a sputtering pressure $5 \times 10^{-3}$ Torr to obtain a second magnetic layer of $Tb_{23}Fe_{73}Co_4$ with a thickness of 500 Å, $T_L$=ca. 180° C. and $H_L$=ca. 1 KOe.

Subsequently a ZnS protective layer of 3000 Å in thickness was formed by sputtering, in argon gas, from the first target with a sputtering speed of 100 Å/min. and a sputtering pressure of $5 \times 10^{-3}$ Torr.

After said layer formations, the above-mentioned substrate was adhered to a polycarbonate plate with hot-melt adhesive material to obtain a magnetooptical disk.

Said disk was mounted on a record/reproducing apparatus, and was made to pass through a magnetic field generating unit of a field intensity of 2.5 KOe, with a linear speed of ca. 15 m/sec., and the recording and erasing were conducted with a laser beam of a wavelength of 830 nm, focused to ca. 1 μm. The recording was conducted with a laser beam of 5 mW, modulated with a duty ratio of 50% and a frequency of 4 MHz.

The bias field was ca. 150 Oe, in a direction to invert the magnetization of the second magnetic layer. Intensity and direction of the bias field were maintained same, both at recording and at erasing.

The erasure was conducted by irradiation with a continuous laser beam of various powers.

Figure 40:
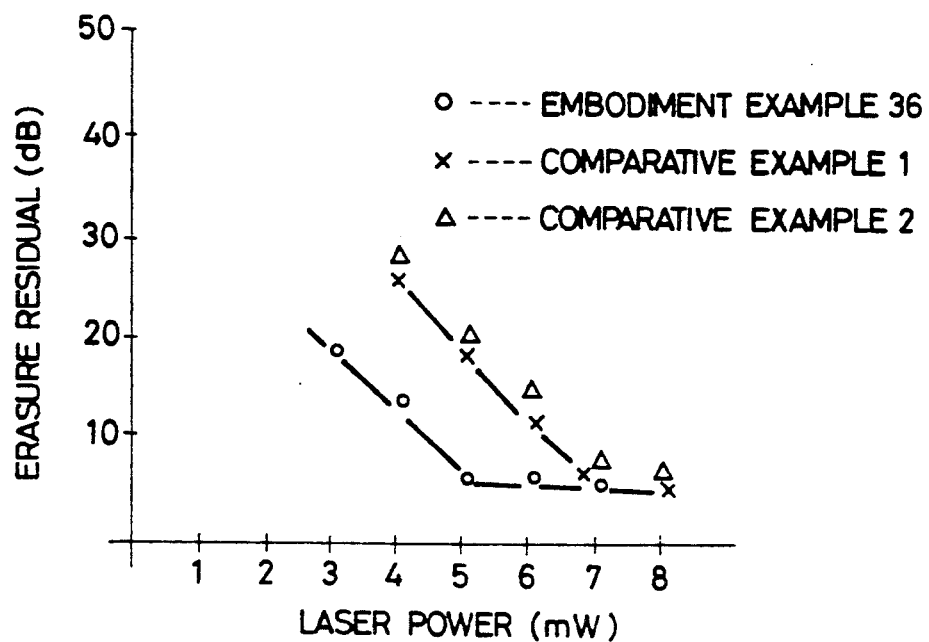
FIG. 40 is a chart showing the relation between the erasing laser power and the residual signal after erasure in the medium shown in FIG. 3.

The reproduction was then conducted by irradiation with a laser beam of 1 mW. When the erasing laser power was equal to or larger than 5 mW, the remaining unerased signal was less than 10 dB at the reproduction and was saturated as shown in FIG. 40, and this level corresponds to an almost complete erasure.

REFERENCE EXAMPLES 1, 2

A sample of Reference Example 1 was prepared in the same manner and structure as in the Example 36, except that a ZnS intermediate layer of 100 Å was formed between the first and second magnetic layers, which, in this case were magnetostatically coupled.

Also a sample of Reference Example 2 was prepared by forming the first magnetic layer in a thickness of 1000 Å only, instead of forming the first and second magnetic layers, in a similar process as in the Example 36.

These samples were tested in recording and erasing in the same manner as in the Example 36. As shown in FIG. 40, the erasure required a power of ca. 7 mW.

It was confirmed that, in the Example 36 and in the Reference Examples 1 and 2, a signal with a C/N ratio of 45-50 dB could be recorded with a laser power of 5 mW.

(ii) Case of stable state in recorded area

Recording is conducted on a magnetooptical recording medium of a structure as shown in FIG. 3, with an apparatus as shown in FIG. 6. The recording process is illustrated in FIG. 42, wherein it is assumed that the magnetizations of the magnetic layers 2, 3 are stable when they are oriented in a same (parallel) direction.

Figure 42:
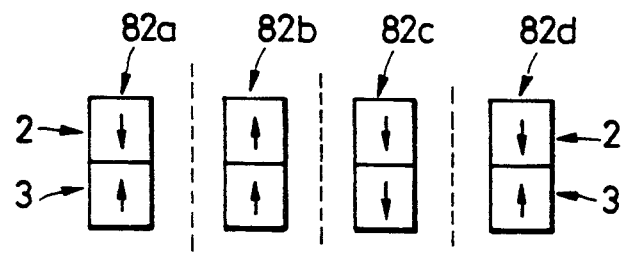

At first the magnetizations of the disk 9 are oriented as shown by 82a in FIG. 42. An area recorded is locally heated, by a laser beam of a recording power from the record/reproducing head 5, to a temperature close to the Curie point of the second magnetic layer 3. Simultaneously there is applied a bias magnetic field(upward in FIG. 42) of a magnitude which is necessary, or, preferably minimum necessary as will be explained later, for inverting the magnetization of the second magnetic layer 3. Thus, following the magnetic inversion of the second magnetic layer 3, the magnetization of the first magnetic layer 2 is also oriented in a stable direction (same direction in the present case) with respect to the magnetization of the second magnetic layer 3. In this manner there is formed a record bit as shown by 82b in FIG. 42. The bias field in this state is however not necessary, since, in this medium, the magnetizations are stable when they are oriented in a same direction.

Said bit can be erased by passing the disk 9 again under the record/reproducing head 5. Said area is locally heated, by a laser beam of an erasing power, close to the Curie point of the second magnetic layer 3. Simultaneously there is applied a bias magnetic field (downward in FIG. 42) of a magnitude which is necessary, preferably minimum necessary as will be explained later, for inverting the magnetization of the second magnetic layer 3. Thus, following the magnetic inversion of the second magnetic layer 3, the magnetization of the first magnetic layer 2 is oriented in a stable direction (same direction in this case) with respect to the magnetization of the second magnetic layer 3.

Then the disk 9 is further rotated whereby the area 82c passes through the position of the magnetic field generating unit 8, of which field intensity is selected at a value between the coercive forces $H_L$, $H_H$ of the magnetic layers and of which field is oriented in a direction to invert the magnetization of the second magnetic layer 3 in the bit 83d, whereby the second magnetic layer 3 is magnetized according to the direction of the magnetic field from the unit 8, while the first magnetic layer 2 retains the magnetization of the state 82c. In this manner the magnetic layers show mutually opposite magnetizations, thus returning to the state 82a. The erasure is achieved in this manner.

Figure 43:
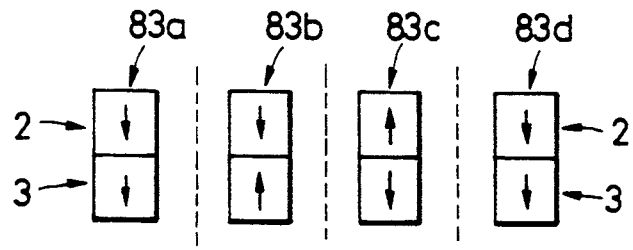

Though FIG. 42 shows the principle of recording and erasure in case the magnetizations of the first and second magnetic layers 2, 3 are stable when they are oriented in a same direction, a substantially same principle is applicable also if said magnetizations are stable when they are oriented in mutually opposite or antiparallel directions. Such principle is illustrated in FIG. 43, wherein the states of magnetization 83a-83d respectively correspond to 82a-82d in FIG. 42.

EXAMPLE 37

A pregrooved and preformatted polycarbonate disk substrate was set in a sputtering apparatus with ternary targets, and was rotated at a distance of 10 cm from the targets.

A ZnS protective layer of 1000 Å in thickness was formed by sputtering, in argon gas, from a first target with a sputtering speed of 100 Å/min. and a sputtering pressrue of $5\times10^{-3}$ Torr. Then a TbFe alloy was sputtered, in argon gas, from a second target with a sputtering speed of 100 Å/min. and a sputtering pressure of $5\times10^{-3}$ Torr to obtain a first magnetic layer of $Tb_{18}Fe_{82}$ with a thickness of 300 Å, $T_L$=ca. 140° C. and $H_H$=ca. 10 KOe.

Then a TbFeCo alloy was sputtered, in argon gas, with a sputtering pressure of $5\times10^{-3}$ Torr to obtain a second magnetic layer of $Tb_{23}Fe_{63}Co_{14}$ with a thickness of 500 Å, $T_H$=ca. 200° C. and $H_L$=ca. 1 KOe.

Subsequently a ZnS protective layer of 3000 Å in thickness was formed by sputtering, in argon gas, from the first target with a sputtering speed of 100 Å/min. and a sputtering pressure of $5\times10^{-3}$ Torr.

After said layer formations, the above-mentioned substrate was adhered to a polycarbonate plate with hot-melt adhesive material to obtain a magnetooptical disk.

Said disk was mounted on a record/reproducing apparatus, and was made to pass through, with a linear speed of ca. 15 m/sec., a magnetic field generating unit of a field intensity of 2.5 KOe, and the recording and erasing were conducted with a laser beam of a wavelength of 830 nm focused to ca. 1 μm.

The recording was conducted with the laser beam modulated with a duty ratio of 50% and a frequency of 4 MHz, and with various powers. The bias field was not used.

The erasure was conducted by irradiation of a continuous laser beam of 6 mW, in the presence of a bias magnetic field of ca. 150 Oe in a direction to invert the magnetization of the second magnetic layer.

Figure 44:
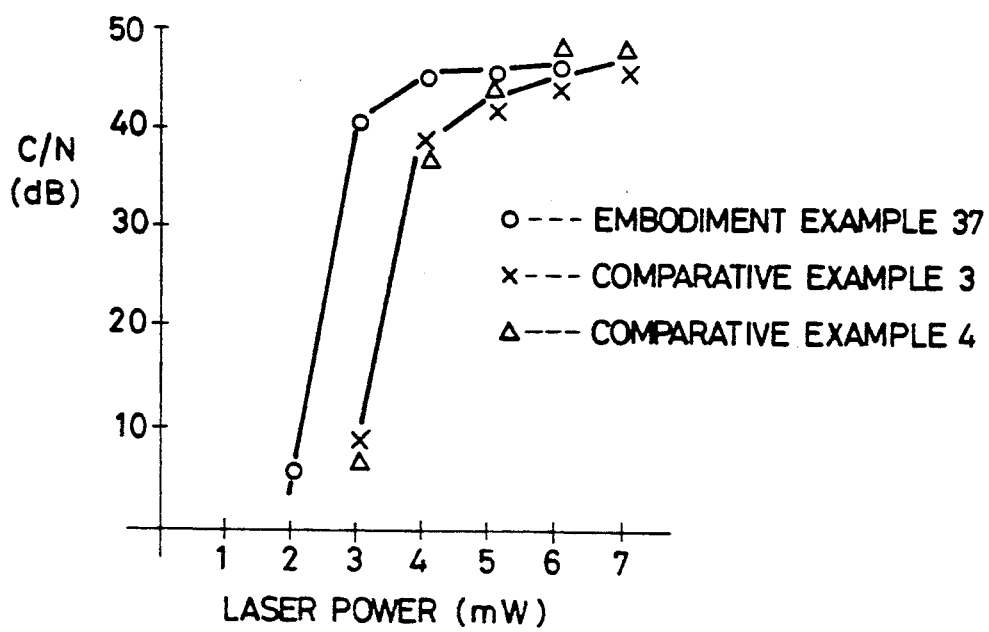
FIG. 44 is a chart showing the relation between the recording laser power and the reproduced C/N ratio in the medium shown in FIG. 3.

Reproduction was conducted with a laser beam of 1 mW. It was found that the recording was possible with a power of ca. 3 mW, as shown in FIG. 44.

EXAMPLE 38

For achieving a recording witha higher speed than in the Example 37, a bias magnetic field of 150 Oe was applied in a direction, in which the magnetization of the first magnetic layer was oriented at the recording. In the present example the direction of the magnetic field was inverted at the erasing, because the direction of bias field at recording is opposite to that at erasing. The necessary recording power was ca. 2.6 mW.

EXAMPLE 39

Recording was conducted with a bias magnetic field, which was maintained constant in direction and in intensity, both for the recording and erasing. The magnitude of the bias field enabling erasure and not hindering recording was ca. 200 Oe.

REFERENCE EXAMPLES 3, 4

A sample of the Reference Example 3 was prepared in the same manner as in the Example 39, except that a ZnS intermediate layer of a thickness of 100 Å was formed between the first and second magnetic layers. In this sample said layers were magnetostatically coupled.

Also a sample of the Reference Example 4 was prepared in the same manner, but by forming the first magnetic layer in a thickness of 800 Å, instead of forming the first and second layers.

Recording and erasing were conducted on these samples, in the same manner as explained before. The power required for recording was ca. 4 mW as shown in FIG. 44.

Erasure was proved with a laser power of 6 mW, on the samples of the Example 37 and the Reference Examples 3 and 4.

EXAMPLE 40

Recording was conducted in the same manner as in the Example 37.

Erasing was conducted with the following method, which is suitable for the erasure of the entire surface of the disk or the erasure of plural tracks without excessive precision. More specifically, the erasing was achieved by another magnetic field generating unit, which was positioned between the recording head 5 and the magnetic field generating unit 8 and which is capable of generating a magnetic field of a direction opposite to that of the field generated by said unit 8 and of a magnitude enough for inverting the magnetization of the first magnetic layer. In this manner it is no longer necessary to effect the erasure with the record/reproducing head.

Improvement of the Apparatus

Figure 45:
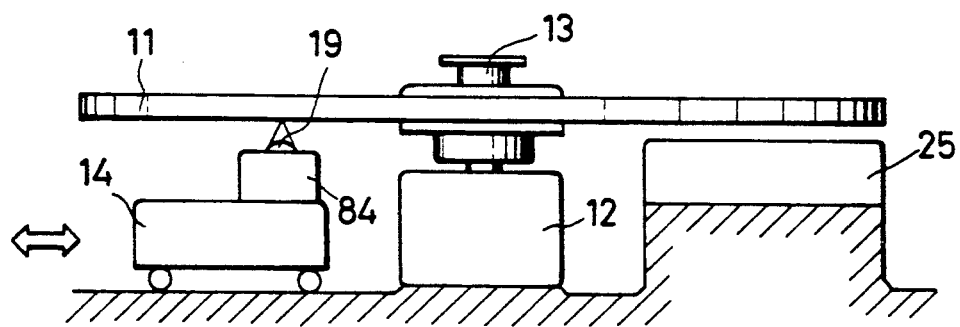
FIGS. 45 and 46 are schematic views showing variations of the magnetooptical recording apparatus utilizing the medium of the present invention.

FIG. 45 is a schematic view of another embodiment of the magnetooptical recording apparatus of the present invention, wherein same components as those in FIG. 8 are represented by same numbers and will not be explained further. In the present embodiment, the first magnetic field generating means 24 is replaced by a leading field of a driving magnet of an actuator 84 for moving the objective lens 19 of the optical head 14. Also the second magnetic field generating means 25 is positioned at the same side as the optical head 14, with respect to the disk 11. It is therefore rendered possible to reduce the number of component parts and to compactize the apparatus.

Figure 46:
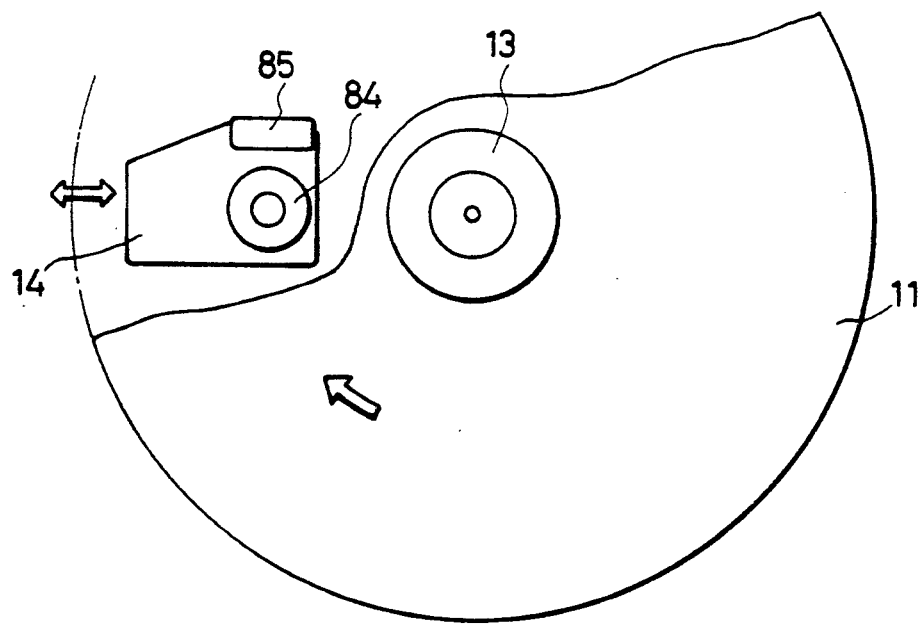

FIG. 46 is a partially cut-off plan view showing still another embodiment, in which same components as those in FIG. 45 are represented by same numbers and will not be explained further. In this embodiment the second magnetic field generating means 85 is mounted on the optical head 14, thereby achieving further compactization of the apparatus.

The present invention is not limited to the foregoing embodiments, but is subject to various modifications within the scope and spirit of the appended claims.

What is claimed is:

1. A magnetooptical recording medium comprising a first magnetic layer and a second magnetic layer having a higher Curie point and a lower coercive force than those of said first magnetic layer and being exchange coupled with said first magnetic layer, characterized in that provided between said first magnetic layer and said second magnetic layer is an adjusting layer for adjusting a magnetic wall energy $\sigma_w$ between said first and second magnetic layers such that the magnetic wall energy $\sigma_w$ satisfies a relation:

$$H_H > H_L > (\sigma_w)/(2M_s h)$$

wherein $H_H$ is the coercive force of the first magnetic layer; $H_L$ is the coercive force of the second magnetic layer; $M_s$ is the saturation magnetization of the second magnetic layer; and h is the thickness of said second magnetic layer.

2. A magnetooptical recording medium according to claim 1, wherein said adjusting layer is composed of a material selected from Ti, Cr, Al, Ni, Fe, Co, rare earth elements and transition metals and has a thickness in a range from 5 to 50 Å.

3. A magnetooptical recording medium according to claim 1, wherein said first and second magnetic layers are composed of alloys selected from GdCo, GdFe, TbFe, DyFe, GdTbFe, TbDyFe, GdFeCo, TbFeCo, GdTbCo and GdTbFeCo.

4. A magnetooptical recording medium according to claim 1, wherein the Curie points of said first and second magnetic layers are respectively in ranges from 70° to 180° C. and from 150° to 400° C.

5. A magnetooptical recording medium according to claim 1, wherein the coercive forces of said first and second magnetic layers are respectively in ranges from 3 to 100 KOe, and from 0.5 to 2 KOe.

6. A magnetooptical recording medium comprising a first magnetic layer and a second magnetic layer having a higher Curie point and a lower coercive force than those of said first magnetic layer and being exchange coupled with said first magnetic layer, characterized in that provided between said first magnetic layer and said second magnetic layer is an adjusting layer for adjusting a magnetic wall energy $\sigma_W$ between said first and second magnetic layers such that the magnetic wall energy $\sigma W$ satisfies a relation:

$$H_H > H_L > (\sigma_W)/(2M_s h)$$

wherein $H_H$ is the coercive force of the first magnetic layer; $H_L$ is the coercive force of the second magnetic layer; $M_s$ is the saturation magnetization of the second magnetization layer; and h is the thickness of said second magnetic layer, said adjusting layer being composed of a magnetic material exhibiting surfacial magnetic anisotropy at room temperature and vertical magnetic anisotropy at temperatures close to the Curie point of said first magnetic layer.

7. A magnetooptical recording medium according to claim 6, wherein said first magnetic layer, second magnetic layer and adjusting layer are composed of alloys of rare earth element and transition metal, in which the first magnetic layer has a composition rich in the transition metal compared with the compensation composition, said second magnetic layer and adjusting layer have compositions both rich in the rare earth element compared with the compensation compositions.

8. A magnetooptical recording medium provided, in succession on a substrate, with a first magnetic layer with a high Curie point $T_{H1}$ and a low coercive force $H_{L1}$, a second magnetic layer with a lower Curie point $T_{L2}$ and a higher coercive force $H_{H2}$ compared with those of said first magnetic layer, and a third magnetic layer with a higher Curie point $T_{H3}$ and a lower coercive force $H_{L3}$ compared with those of said second magnetic layer; wherein said three magnetic layers are mutually so coupled as to satisfy conditions:

$$\frac{\sigma_{w12}}{2M_{s1}h_1} > H_{L1} \text{ and } \frac{\sigma_{w23}}{2M_{s3}h_3} < H_{L3}$$

wherein $\sigma_{w12}$ is the magnetic wall energy of the first and second magnetic layers; $\sigma_{w23}$ is the magnetic wall energy of the second and third magnetic layers; $h_1$, $h_2$ add $h_3$ are respective thicknesses of the first, second and third magnetic layers; and $M_{s1}$, $M_{s2}$ and $M_{s3}$ are respectively saturation magnetizations of said layers.

9. A magnetooptical recording medium according to claim 8, wherein the Curie points and coercive forces of said first and third magnetic layers satisfy relations:

$$T_{H1} \geqq T_{H3} \text{ and}$$

$$H_{L1} \geqq H_{L3}.$$

10. A magnetooptical recording medium according to claim 8, wherein the Curie points of said three magnetic layers are respectively in a range of 150° to 400° C. for $T_{H1}$, 70° to 200° C. for $T_{H2}$, and 100° to 250° C. for $T_{H3}$.

11. A magnetooptical recording medium according to claim 8, wherein the coercive forces of said three magnetic layers are respectively in a range of 0.1 to 1 KOe for $H_{L1}$, 2 to 10 KOe for $H_{H2}$, and 0.5 to 4 KOe for $H_{L3}$.

12. A magnetooptical recording medium according to claim 8, wherein said first, second and third magnetic layers are composed of alloys of rare earth element and transition metal, wherein the first and second magnetic layers have compositions both rich in the transition metal compared with the compensation composition, while the third magnetic layer has a composition rich in the rare earth element compared with the compensation composition.

13. A magnetooptical recording medium according to claim 8, wherein said first, second and third magnetic layers are composed of alloys selected from GdCo, GdFe, TbFe, DyFe, GdTbFe, TbDyFe, GdFeCo, TbFeCo, and GdTbCo.

14. An information recording process on a magnetooptical recording medium provided, in succession on a substrate, with a first magnetic layer with a high Curie point $T_{H1}$ and a low coercive force $H_{L1}$. a second magnetic layer with a lower Curie point $T_{L2}$ and a higher coercive force $H_{H2}$ compared with those said first magnetic layer, and a third magnetic layer with a higher Curie point $T_{H3}$ and a lower coercive force $H_{L3}$ compared with those of said second magnetic layer, wherein said three magnetic layers are mutually so coupled as to satisfy conditions:

$$\frac{\sigma_{w12}}{2M_{s1}h_1} > H_{L1} \text{ and } \frac{\sigma_{w23}}{2M_{s3}h_3} < H_{L3}$$

wherein $\sigma_{w12}$ is the magnetic wall energy of the first and second magnetic layers: $\sigma_{w23}$ is the magnetic wall energy of the second and third magnetic layers; $h_1$, $h_2$ and $h_3$ are respective thicknesses of the first, second and third magnetic layers; and $M_{s1}$, $M_{s2}$ and $M_{s3}$ are respectively saturation magnetizations of said layers, comprising steps of: orienting the magnetization of the third magnetic layer in a predetermined direction while retaining the magnetization of the second magnetic layer; and (b) selectively effecting either a first type recording by irradiating said medium with a light beam of a power for heating the medium close to the Curie point $T_{L2}$ of the second magnetic layer while applying a bias magnetic field as a bias field, thereby orienting the magnetizations of the first and second magnetic layer in a stable direction with respect to the magnetization of the third magnetic layer while retaining the magnetization of the third magnetic layer, or a second type recording by irradiating the medium with a light beam of a power for heating the medium close to the Curie point $T_{H3}$ of the third magnetic layer, thereby inverting the magnetization of said third magnetic layer and simultaneously orienting the magnetizations of the first and second magnetic layers in a stable direction with respect to the magnetization of the third magnetic layer, according to information signal.

15. A magnetooptical recording medium provided, in succession on a substrate, with a first magnetic layer with a Curie point $T_1$ and a coercive force $H_1$, a second magnetic layer with a Curie point $T_2$ and a coercive force $H_2$ and a third magnetic layer with a Curie point $T_3$ and a coercive force $H_3$. which comprises satisfying conditions:
 (A) that each magnetic layer is composed principally of an amorphous alloy of rare earth element and transition metal;
 (B) that $H_1 > H_3 > H_2$ and $T_3 \geqq T_2 > T_1$; and (C) that the first magnetic layer has a composition rich in the transition metal compared with the compensation composition and the second and third magnetic layers have compositions both rich in the rare earth element, or that the first magnetic layer has a composition rich in the rare earth element and the second and third magnetic layers have compositions both rich in the transition metal.

16. A magnetooptical recording medium according to claim 15, wherein the Curie points of said three magnetic layers are respectively in the ranges of 150° to 400° C. for $T_3$, 70° to 200° C. for $T_1$ and 90° to 400° C. for $T_2$.

17. A magnetooptical recording medium according to claim 15, wherein the coercive forces of said three magnetic layers are respectively in the ranges of 0.1 to 1 KOe for $H_2$, 2 to 10 KOe for $H_1$, and 0.5 to 4 KOe for $H_3$.

18. An information recording process on a magnetooptical recording medium provided, in succession on a substrate, with a first magnetic layer with a Curie point $T_1$ and a coercive force $H_1$, a second magnetic layer with a Curie point $T_2$ and a coercive force $H_2$ and a third magnetic layer with a Curie point $T_3$ and a coercive force $H_3$, and satisfying conditions:
 (A) that each magnetic layer is composed principally of an amorphous alloy of rare earth element and transition metal;
 (B) that $H_1 > H_3 > H_2$ and $T_3 \geqq T_2 > T_1$; and
 (C) that the first magnetic layer has a composition rich in the transition metal compared with the compensation composition while the second and third magnetic layers have compositions both rich in the rare earth element, or that the first magnetic layer has a composition rich in the rare earth element while the second and third magnetic layers have compositions both rich in the transition metal, comprising steps of:
 (a) orienting the magnetization of the second and third magnetic layers in a predetermined direction while retaining the magnetization of the first magnetic layer; and
 (b) selectively effecting either a first type recording by irradiating said medium with a light beam of a power for heating the medium close to the Curie point $T_1$ of said first magnetic layer while applying a bias magnetic field as a bias field, thereby orienting the magnetization of the first magnetic layer in a stable direction with respect to the magnetizations of the second and third magnetic layer while retaining the magnetizations of the second and third magnetic layers, or a second type recording by irradiating the medium with a light beam of a power for heating the medium close to the Curie point $T_3$ of the third magnetic layer thereby inverting the magnetization of said second and third magnetic layers and simultaneously orienting the magnetization of the first magnetic layer in a stable direction with respect to the magnetizations of the second and third magnetic layers, according to information signal.

19. A magnetooptical recording medium provided, on at least a substrate, with a quadraple-layered magnetic film consisting of a first magnetic layer with a Curie point $T_1$, a coercive force $H_1$, a thickness $h_1$ and a saturation magnetization $M_{s1}$, a second magnetic layer with a Curie point $T_2$, a coercive force $H_2$, a thickness $h_2$ and a saturation magnetization $M_{s2}$, a third magnetic layer with a Curie point $T_3$, a coercive force $H_3$, a thickness $h_3$ and a saturation magnetization $M_{s3}$, and a fourth magnetic layer with a Curie point $T_4$, a coercive force $H_4$, a thickness $h_4$ and a saturation magnetization $M_{s4}$, in which said magnetic layers are exchange-coupled, wherein said four magnetic layers are so coupled as to satisfy conditions:
 (I) as for the Curie points of the magnetic layers:

$T_1, T_4 > T_2, T_3$ (II) as for the coercive forces of the magnetic layers:

$H_2 > H_4 > H_1, H_3$ (III) as for the thicknesses of the magnetic layers:

$h_1 + h_2 \geqq 250$ Å

$h_1 + h_2 + h_3 + h_4 \geqq 600$ Å and (IV) as for the saturation magnetizations, thicknesses, coercive forces and magnetic wall energies of the magnetic layers:

$$\frac{\sigma_{w12}}{2M_{s1}h_1} > H_1,$$

$$H_2 > \frac{\sigma_{w12}}{2M_{s2}h_2}, \frac{\sigma_{w23}}{2M_{s2}h_2},$$

$$H_3 < \frac{\sigma_{w23}}{2M_{s3}h_3}, \frac{\sigma_{w34}}{2M_{s3}h_3},$$

$$H_4 > \frac{\sigma_{w34}}{2M_{s4}h_4}$$

wherein $\sigma_{w12}$, $\sigma_{w23}$ and $\sigma_{w34}$ are magnetic wall energies respectively for the first and second magnetic layers, second and third magnetic layers, and third and fourth magnetic layers.

20. An information recording process on a magnetooptical recording medium provided, at least on a substrate, with a quadraple-layered magnetic film consisting of a first magnetic layer with a Curie point $T_1$, a coercive force $H_1$, a thickness $h_1$ and a saturation magnetization $M_{s1}$, a second magnetic layer with a Curie point $T_2$, a coercive force $H_2$, a thickness $h_2$ and a saturation magnetization $M_{s2}$, a third magnetic layer with a Curie point $T_3$, a coercive force $H_3$, a thickness $h_3$ and a saturation magnetization $M_{s3}$, and a fourth magnetic layer with a Curie point $T_4$, a coercive force $H_4$, a thickness $h_4$ and a saturation magnetization $M_{s4}$, in which said magnetic layer are so exchange-coupled as to satisfy following conditions:

(I) as for the Curie points of the magnetic layers:

$$T_1, T_4 > T_2, T_3$$

(II) as for the coercive forces of the magnetic layers:

$$H_2 > H_4 > H_1, H_3$$

(III) as for the thicknesses of the magnetic layers:

$$h_1 + h_2 \geq 250 \text{ Å}$$

$$h_1 + h_2 + h_3 + h_4 \geq 600 \text{ Å and}$$

(IV) as for the saturation magnetizations, thicknesses, coercive forces and magnetic wall energies of the magnetic layers:

$$\frac{\sigma_{w12}}{2M_{s1}h_1} > H_1,$$

$$H_2 > \frac{\sigma_{w12}}{2M_{s2}h_2}, \frac{\sigma_{w23}}{2M_{s2}h_2},$$

$$H_3 < \frac{\sigma_{w23}}{2M_{s3}h_3}, \frac{\sigma_{w34}}{2M_{s3}h_3},$$

$$H_4 > \frac{\sigma_{w34}}{2M_{s4}h_4}$$

wherein $\sigma_{w12}$, $\sigma_{w23}$ and $\sigma_{w34}$ are magnetic wall energies respectively for the first and second magnetic layers, second and third magnetic layers, and third and fourth magnetic layers; comprising steps of:

(a) orienting the magnetization of the fourth magnetic layer in a predetermined direction while retaining the magnetization of the second magnetic layer; and (b) selectively effecting either a first type recording by irradiating the medium with a light beam of a power for heating the medium close to the Curie point $T_2$ of the second magnetic layer while applying a bias magnetic field as a bias field, thereby orienting, across the third magnetic layer, the magnetizations of the first and second magnetic layers in a stable direction with respect to the magnetization of the fourth magnetic layer while retaining the magnetization of the fourth magnetic layer, or a second type recording by irradiating the medium with a light beam of a power for heating the medium close to the Curie point $T_4$ of the fourth magnetic layer thereby inverting the magnetization of said fourth magnetic layer and simultaneously orienting the magnetizations of the first, second and third magnetic layers in a stable direction with respect to the magnetization of said fourth magnetic layer, according to information signal.

21. A magnetooptical recording medium comprising:
a substrate;
a first magnetic layer formed on said substrate;

a second magnetic layer formed on said first magnetic layer, said second magnetic layer having a higher Curie point and a lower coercive force at room temperature than those of said first magnetic layer; and a third magnetic layer provided between said first magnetic layer and said second magnetic layer, said third magnetic layer exhibiting surfacial magnetic anisotropy at room temperature and vertical magnetic anisotropy at temperatures close to the Curie point of said first magnetic layer.

22. A magnetooptical recording medium according to claim 21, wherein said first, second and third magnetic layers are composed of alloys of rare earth element and transition metal, and said first magnetic layer has a composition rich in the transition metal compared with a compensation composition, while said second and third magnetic layers have compositions both rich in the rare earth element compared with the compensation composition.

23. A magnetooptical recording medium according to claim 21, wherein the magnetic anisotropy of said third magnetic layer varies in a range from 50° to 100° C.

24. A magnetooptical recording medium according to claim 21, wherein said third magnetic layer is composed of an alloy of more than one element selected from Dy, Nb, Pr and Tb and more than one element selected from Co, Fe and Ni.

25. A magnetooptical recording medium according to claim 21, wherein said third magnetic layer is composed of rare earth ortho-ferrite or rare earth ortho-chromite.

26. A magnetooptical recording medium according to claim 21, wherein said first and second magnetic layers are composed of alloys selected from GdCo, GdFe, TbFe, DyFe, GdTbFe, TbDyFe, GdFeCo, TbFeCo, GdTbCo and GdTbFeCo.

27. A magnetooptical recording medium according to claim 21, wherein the Curie point of said first magnetic layer is in a range from 70° to 180° C. and the Curie point of said second magnetic layer is in a range from 150° to 400° C.

28. A magnetooptical recording medium according to claim 21, wherein the coercive force of said first magnetic layer is in a range from 3 to 10 KOe and the coercive force of said second magnetic layer is in a range from 0.5 to 2 KOe.

29. A magnetooptical recording medium according to claim 21, wherein a pregroove is provided on said substrate.

30. A magnetooptical recording medium according to claim 21, further comprising a protective layer provided on said second magnetic layer and between said first magnetic layer and said substrate.

31. A process for recording information on a magnetooptical recording medium which comprises a substrate, a first magnetic layer formed on the substrate, a second magnetic layer formed on the first magnetic layer and having a higher Curie point and a lower coercive force at room temperature than those of the first magnetic layer and a third magnetic layer provided between the first and second magnetic layers and exhibiting surfacial magnetic anisotropy at room temperature and vertical magnetic anisotropy at temperatures close to the Curie point of the first magnetic layer, said process comprising the steps of:

(a) orienting the magnetization of the second magnetic layer in a predetermined direction while retaining the magnetization of the first magnetic layer; and (b) selectively effecting either a first type recording by irradiating the medium with a light beam of a power for heating the medium close to the Curie point of the first magnetic layer while applying a bias magnetic field, thereby orienting the magnetization of the first magnetic layer in a stable direction with respect to the magnetization of the second magnetic layer while retaining the magnetization of the second magnetic layer, or a second type recording by irradiating the medium with a light beam of a power for heating the medium close to the Curie point of the second magnetic layer thereby inverting the magnetization of the second magnetic layer and simultaneously orienting the magnetization of the first magnetic layer in a stable direction with respect to the magnetization of the second magnetic layer, according to information signal.

32. A magnetooptical recording medium comprising:
a substrate;
a first magnetic layer formed on said substrate;
a second magnetic layer formed on said first magnetic layer and having a lower Curie point and a higher coercive force at room temperature than those of said first magnetic layer, said second magnetic layer being exchange-coupled with said first magnetic layer; and
a third magnetic layer formed on said second magnetic layer and having a high Curie point and a lower coercive force at room temperature than those of said second magnetic layer, said third magnetic layer being exchange-coupled with said second magnetic layer and the exchange-couple force between said second and third magnetic layers being small compared with that between said first and second magnetic layers.

33. A magnetooptical recording medium according to claim 32, wherein the Curie point of said first magnetic layer is equal to or higher than that of said third magnetic layer.

34. A magnetooptical recording medium according to claim 32, wherein the coercive force of said first magnetic layer is equal to or lower than that of said third magnetic layer.

35. A magnetooptical recording medium according to claim 32, wherein the Curie points of said first, second and third magnetic layers are respectively in ranges from 150° to 400° C., from 70° to 200° C. and from 100° to 250° C.

36. A magnetooptical recording medium according to claim 32, wherein the coercive forces of said first, second and third magnetic layers are respectively in ranges from 0.1 to 1 KOe, from 2 to 10 KOe and from 0.5 to 4 KOe.

37. A magnetooptical recording medium according to claim 32, wherein said first, second and third magnetic layers are composed of alloys of rare earth metal and transition metal, said first and second magnetic layers have compositions rich in the transition metal compared with the compensation composition and said third magnetic layer has a composition rich in the rare earth compared with the compensation composition.

38. A magnetooptical recording medium according to claim 32, wherein said first, second and third magnetic layers are composed of alloys selected from GdCo, GdFe, TbFe, DyFe, GdTbFe, TbDyFe, GdFeCo, TbFeCo, GdTbCo and GdTbFeCo.

39. A process for recording information on a magnetooptical recording medium which comprises a substrate, a first magnetic layer formed on the substrate, a second magnetic layer formed on the first magnetic layer, having a lower Curie point and a higher coercive force at room temperature than those of the first magnetic layer and exchange-coupled with said first magnetic layer an a third magnetic layer provided on the second magnetic layer, having a higher Curie point and a lower coercive force at room temperature than those of the second magnetic layer and exchange-coupled with the second magnetic layer, said exchange-couple force between the second and third magnetic layers being small compared with that between the first and second magnetic layers, said process comprising the steps of:

(a) orienting the magnetization of the third magnetic layer in a predetermined direction while retaining the magnetization of the second magnetic layer; and (b) selectively effecting either a first type recording by irradiating the medium with a light beam of a power for heating the medium close to the Curie point of the second magnetic layer while applying a bias magnetic field, thereby orienting the magnetizations of the first and second magnetic layers in stable directions with respect to the magnetization of the third magnetic layer while retaining the magnetization of the third magnetic layer, or a second type recording by irradiating the medium with a light beam of a power for heating the medium close to the Curie point of the third magnetic layer thereby inverting the magnetization of the third magnetic layer and simultaneously orienting the magnetizations of the first and second magnetic layers in stable directions with respect to the magnetization of the third magnetic layer, according to information signal.

40. A magnetooptical recording medium comprising:
a first magnetic layer;
a second magnetic layer exchange-coupled to said first magnetic layer, said second magnetic layer having a higher Curie point and a lower coercive force at room temperature than those of said first magnetic layer; and
a third magnetic layer provided between said first magnetic layer and said second magnetic layer, said third magnetic layer having a larger saturation magnetization than that of said first and second magnetic layers.

41. A magnetooptical recording medium according to claim 40, wherein said first, second and third magnetic layers are composed of amorphous alloys of rare earth element and transition metal element.

42. A magnetooptical recording medium according to claim 41, wherein said first magnetic layer is composed of a composition rich in one of the transition metal element and the rare earth element and said second and third magnetic layers are composed of the other of the transition metal element and the rare earth element.

43. A magnetooptical recording medium according to claim 41, wherein aid first and second magnetic layers are composed of alloys selected from GdCo, GdFe, TbFe, DyFe, GdTbFe, TbDyFe, GdFeCo, TbFeCo, GdTbCo and GcTbFeCo.

44. A magnetooptical recording medium according to claim 40, wherein the Curie points of said first, second and third magnetic layers are respectively in ranges from 70° to 200° C., from 150° to 400° C. and from 90° to 400° C.

45. A magnetooptical recording medium according to claim 40, wherein the coercive forces of said first, second and third magnetic layers are respectively in ranges from 2 to 10 KOe, from 0.5 to 4 KOe and from 0.1 to 1 KOe.

46. A magnetooptical recording medium according to claim 40, wherein the following conditions are satisfied:

$$\frac{\sigma_{w13}}{2M_{s1}h_1} > H_1$$

$$\frac{\sigma_{w23}}{2M_{s2}h_2} > H_2$$

$$\frac{\sigma_{w13}}{2M_{s3}h_3} < \frac{\sigma_{w23}}{2M_{s3}h_3}$$

wherein $\sigma_{w13}$ is the magnetic wall energy between the first and third magnetic layers; $\sigma_{w23}$ is the magnetic wall energy between the second and third magnetic layers; $h_1$, $h_2$ and $h_3$ are respectively thicknesses of the first, second and third magnetic layers; and $M_{s1}$, $M_{s2}$ and $M_{s3}$ are respectively saturation magnetizations of said layers.

47. A process for recording information on a magnetooptical recording medium which comprises a first magnetic layer, a second magnetic layer exchange-coupled to the first magnetic layer and having a higher Curie point and a lower coercive force at room temperature than those of the first magnetic layer and a third magnetic layer provided between the first and second magnetic layers and having a larger saturation magnetization than said those magnetic layers, said process comprising steps of:

(a) orienting the magnetization of the second magnetic layer in a predetermined direction while retaining the magnetization of the first magnetic layer; and (b) selectively effecting either a first type recording by irradiating the medium with a light beam of a power for heating the medium close to the Curie point of the first magnetic layer while applying a bias magnetic field, thereby orienting the magnetization of the first magnetic layer in a stable direction with respect to the magnetization of the second magnetic layer while retaining the magnetization of the second magnetic layer, or a second type recording by irradiating the medium with a light beam of a power for heating the medium close to the Curie point of the second magnetic layer thereby inverting the magnetization of the second magnetic layer and simultaneously orienting the magnetization of the first magnetic layer in a stable direction with respect to the magnetization of the second magnetic layer, according to information signal.

* * * * *

UNITED STATES PATENT AND TRADEMARK OFFICE
CERTIFICATE OF CORRECTION

PATENT NO. : 5,132,945

DATED : July 21, 1992

INVENTOR(S) : YOICHI OSATO, ET AL.

Page 1 of 9

It is certified that error appears in the above-identified patent and that said Letters Patent is hereby corrected as shown below: Title page:

Item: [30] FOREIGN APPLICATION PRIORITY DATA

"62-27982" should read --62-27082-- and
--61-72559" should read --62-72559--.

AT [56] REFERENCES CITED

Foreign Patent Documents,
"57-70653" should read --57-78653--.

Other Publications, under IEEE,
"1986 931:3" should read --1986) 931:3--.

SHEET 1 OF 18

Figure 1:
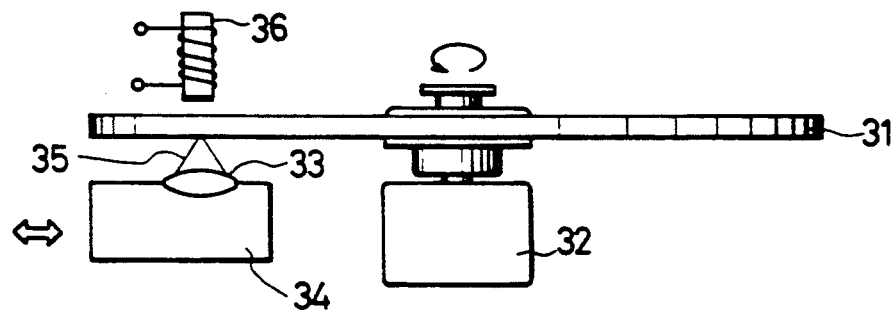
FIG. 1 is a schematic view of a conventional magnetooptical recording apparatus.
Figure 2:
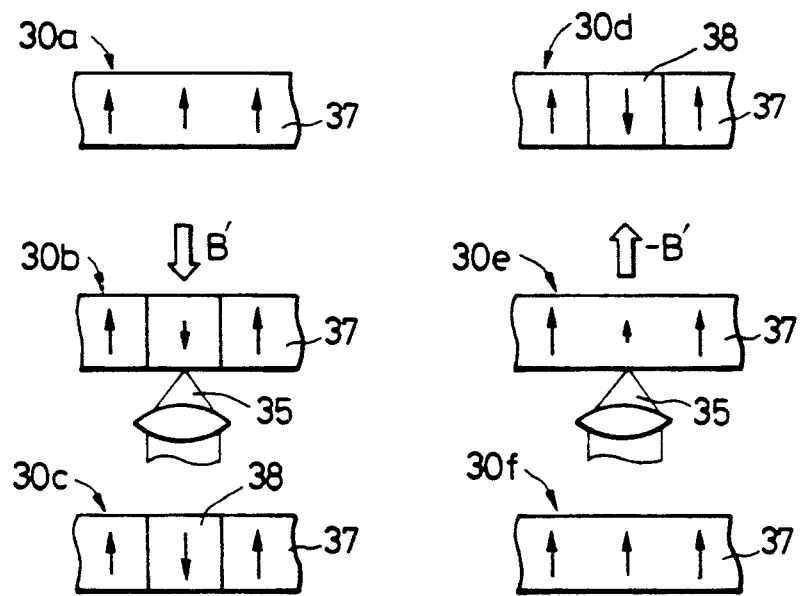
FIG. 2 is a schematic view showing the recording and erasing processes utilizing a conventional magnetooptical recording medium.

FIG. 1 should read,

FIG. 1 PRIOR ART

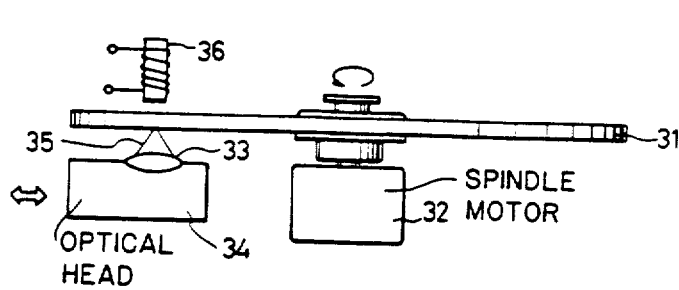

--     --.

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

SHEET 2 OF 18

FIG. 6 should read,

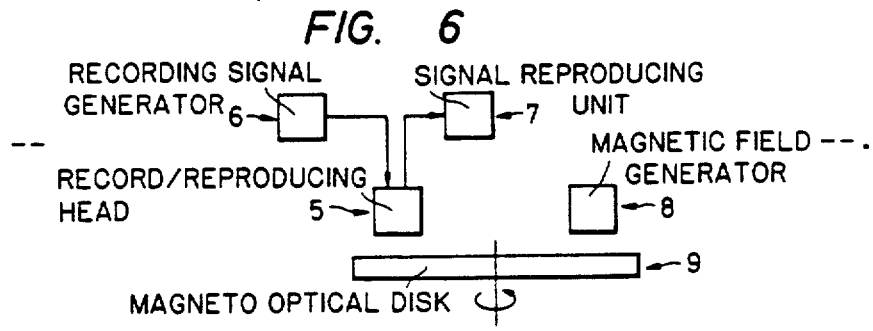

SHEET 4 OF 18

FIG. 8 should read,

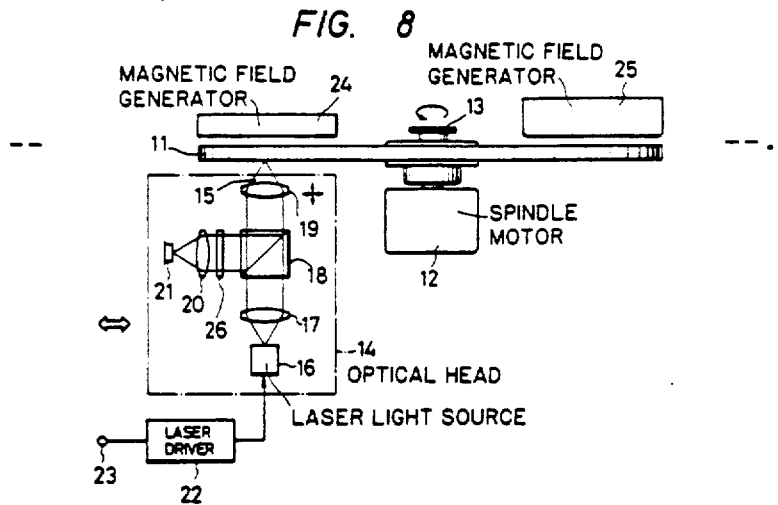

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

SHEET 18 OF 18

FIG. 45 should read,

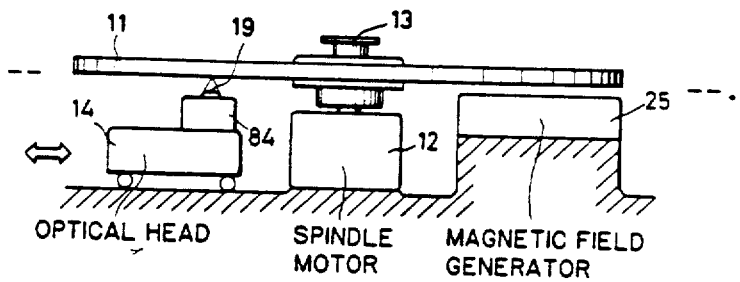

COLUMN 1

Line 32, "objective lens 34" should read --objective lens 33--.
Line 46, "36b," should read --30b,--.

COLUMN 15

Line 59, "coercive" should read --rare earth-rich--.

COLUMN 23

Line 13, "$Sm_{0.7}Er_{0.3}FeO_3$" should read --$Sm_{0.7}Fe_{0.3}FeO_3$--.

COLUMN 30

Line 58, "600 $Å \geq L1+L2 \geq 1000$ Å" should read
--600 $Å \leq L1+L2 \leq 1000$ Å--.
Line 61, "200 $Å \geq L1$" should read --200 $Å \leq L1$--.

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

COLUMNS 33-34

Table 8 should read,

Tab. 8

Legend (each cell contains three values, top to bottom):
- magnetooptical effect (Kerr rotation angle) (°)
- reflectance
- reflectance × Kerr rotation angle First magnetic layer $(L_1)$ (Å) — rows; $(L_2)$ (Å) — columns

| $L_1$ \ $L_2$ | 0 | 100 | 200 | 300 | 400 | 500 | 600 | 700 |
|---|---|---|---|---|---|---|---|---|
| 600 | 44 / 0.195 / 19.4 | 49 / 0.186 / 21 | 50.8 / 0.181 / 21.6 | 51.4 / 0.178 / 21.7 | 51.3 / 0.178 / 21.6 | | | |
| 500 | 38.2 / 0.207 / 17.4 | 45.6 / 0.195 / 20.1 | 50.2 / 0.185 / 21.6 | 52.4 / 0.179 / 22.2 | 53.1 / 0.177 / 22.3 | 53.0 / 0.176 / 22.2 | | |
| 400 | 33.1 / 0.211 / 15.2 | 41.7 / 0.203 / 18.8 | 48.2 / 0.191 / 21.1 | 52.4 / 0.182 / 22.3 | 54.5 / 0.176 / 22.9 | 55.3 / 0.173 / 23.0 | | |
| 300 | 29.7 / 0.191 / 13.0 | 37.8 / 0.202 / 17.0 | 44.4 / 0.196 / 19.7 | 49.7 / 0.186 / 21.4 | 53.3 / 0.177 / 22.4 | 55.3 / 0.171 / 22.9 | | |
| 200 | 27.0 / 0.134 / 9.87 | 33.7 / 0.177 / 14.2 | 37.8 / 0.193 / 16.6 | 41.8 / 0.190 / 18.2 | 45.4 / 0.181 / 19.3 | 48.2 / 0.172 / 20.0 | 49.9 / 0.167 / 20.4 | |
| 150 | 24.0 / 0.093 / 7.31 | 30.9 / 0.151 / 12.0 | 32.8 / 0.184 / 14.0 | 35.0 / 0.191 / 15.3 | 37.7 / 0.186 / 16.2 | 40.1 / 0.177 / 16.9 | 41.9 / 0.170 / 17.3 | 42.9 / 0.165 / 17.4 |
| 100 | 15.6 / 0.051 / 3.52 | 26.4 / 0.117 / 9.04 | 25.9 / 0.168 / 10.6 | 26.0 / 0.191 / 11.3 | 27.1 / 0.193 / 11.9 | 28.6 / 0.186 / 12.3 | 30.0 / 0.178 / 12.7 | 31.0 / 0.172 / 12.8 |
| 50 | 13.0 / 0.019 / 1.81 | 18.3 / 0.077 / 5.06 | 15.8 / 0.145 / 6.03 | 14.4 / 0.188 / 6.24 | 14.1 / 0.203 / 6.37 | 13.6 / 0.201 / 6.52 | 15.2 / 0.193 / 6.67 | 15.7 / 0.186 / 6.79 |

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

Page 5 of 9

It is certified that error appears in the above-identified patent and that said Letters Patent is hereby corrected as shown below:

COLUMNS 37-38

Table 9, should read

Tab. 9

| First magnetic layer ($L_1$) (Å) \ Second magnetic layer ($L_2$×Å) | 0 | 50 | 100 | 150 | 200 | 250 | 300 | 350 | 400 | 450 | 500 | 550 | 600 | 650 | 700 |
|---|---|---|---|---|---|---|---|---|---|---|---|---|---|---|---|
| 600 | | 43.9 / 0.195 / 19.4 | | 47.6 / 0.186 / 20.5 | | | 49.6 / 0.181 / 21.1 | | 50.2 / 0.178 / 21.2 | | 50.0 / 0.178 / 21.1 | | 49.5 / 0.178 / 20.9 | | 49.1 / 0.178 / 20.7 |
| 500 | | 38.2 / 0.207 / 17.4 | | 43.5 / 0.195 / 18.2 | | 47.6 / 0.185 / 20.5 | | | 49.9 / 0.179 / 21.1 | | 50.6 / 0.177 / 21.3 | 50.3 / 0.176 / 21.1 | | 50.1 / 0.176 / 21.0 | 49.7 / 0.176 / 20.8 |
| 400 | | 33.1 / 0.211 / 15.2 | | 38.6 / 0.203 / 17.4 | | 44.3 / 0.191 / 19.4 | | | 48.7 / 0.182 / 20.8 | | 51.2 / 0.176 / 21.5 | 52.2 / 0.173 / 21.7 | | 52.2 / 0.172 / 21.7 | 51.9 / 0.172 / 21.5 |
| 300 | | 28.7 / 0.191 / 13.0 | | 34.7 / 0.202 / 15.8 | | 40.5 / 0.197 / 18.0 | | | 46.4 / 0.186 / 20.1 | | 51.2 / 0.177 / 21.5 | 54.1 / 0.172 / 22.4 | | 55.3 / 0.169 / 22.7 | 55.5 / 0.167 / 22.7 |
| 200 | | 27.0 / 0.134 / 9.87 | | 33.1 / 0.178 / 14.0 | | 38.0 / 0.194 / 16.7 | | | 43.7 / 0.192 / 19.1 | | 49.7 / 0.182 / 21.2 | 54.7 / 0.174 / 22.6 | | 58.0 / 0.168 / 23.8 | 59.5 / 0.165 / 24.2 |
| 150 | | 24.0 / 0.093 / 7.3 | | 33.1 / 0.153 / 12.9 | | 37.7 / 0.186 / 16.2 | | | 42.5 / 0.193 / 18.7 | | 48.3 / 0.187 / 20.9 | 53.9 / 0.179 / 22.8 | | 58.2 / 0.171 / 24.1 | 60.8 / 0.167 / 24.8 |
| 100 | | 15.6 / 0.051 / 3.52 | | 33.4 / 0.12 / 11.5 | | 38.1 / 0.170 / 15.7 | | | 41.7 / 0.193 / 18.3 | | 46.6 / 0.195 / 20.5 | 52.2 / 0.187 / 22.6 | | 57.2 / 0.179 / 24.2 | 60.7 / 0.173 / 25.3 |
| 50 | | 13.0 / 0.019 / 1.81 | | 33.3 / 0.078 / 9.32 | | 39.5 / 0.147 / 15.1 | | | 41.5 / 0.190 / 18.1 | | 44.7 / 0.207 / 20.2 | 49.4 / 0.202 / 22.2 | | 54.6 / 0.194 / 24.1 | 58.9 / 0.187 / 25.5 |

Legend (each cell, top to bottom): magneto-optical effect (Kerr rotation angle)(°) / reflectance / reflectance × Kerr rotation angle

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

COLUMN 42

Line 3, "$H_L'-H_{HEFF}'$" should read --$H_L'-H_{Leff}'$--.
Line 15, "Gi.19" should read --FIG. 19--.

COLUMN 45

Line 33, "the against" should read
--the state 44f in FIG. 20 or 45f in FIG. 21 is stabilized against-- and "vield" should read --field--.

COLUMN 48

Line 36, "layer 27" should read --layer 47--.

COLUMN 50

Line 37, "100 Åshowed" should read --100Å showed-- and "of by" should read --of $\sigma_w/2M_s h$ by--.

COLUMN 59

Line 20, "$T_3 \geq T_2 \geq T_1$       (12)" should read
--$T_3 \geq T_2 > T_1$       (12)--.

COLUMN 61

Line 30, "$(\sigma_{w12}/2M_{s1}h_1 < H_1.$" should read --$(\sigma_{w12}/2M_{s1}h_1 < H_1).$--.

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

COLUMN 62

Line 18, "53$f$" should read --63$f$--.

COLUMN 64

Table 16, "$Tb_5Gd_{20}Fe_{70}Co_4$" should read --$Tb_5Gd_{20}Fe_{70}Co_5$--.

COLUMN 65

Line 3, "$H_2>H_4>H_1,H_3(17)$" should read
--$H_2>H_4>H_1,H_3$       (17)--.

COLUMN 75

Line 23, "$\sigma_W$" should read --$\sigma_w$--.
Line 25, "$\sigma_W$" should read --$\sigma_w$--.
Line 27, "$H_H>H_L>(\sigma_W)/(2M_Sh)$" should read
--$H_H>H_L>(\sigma_w)/(2M_Sh)$--.
Line 32, "magnetization" should read --magnetic--.
Line 66, "add" should read --and--.

COLUMN 76

Line 6, "$H_{L1} \geq H_{L3}$." should read --$H_{L1} \leq H_{L3}$.--.
Line 31, "TbFeCo," should read TbFeCo--.
Line 37, "those said" should read --those of said--.
Line 54, "of: orienting" should read
--of: ¶ (a) orienting--.
Line 62, "field as a bias field," should read --field,--.
Line 64, "layer" should read --layers--.

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.    Page 8 of 9

It is certified that error appears in the above-identified patent and that said Letters Patent is hereby corrected as shown below:

COLUMN 77

Line 44, "$H_2$ and" should read --$H_2$, and--.
    Line 68, "field as a bias field," should read --field,--.

COLUMN 78

Line 3, "layer" should read --layers--.
    Line 16, "quadraple-layered" should read --quadruple-layered--.
    Line 41, "600 Åand" should read --600Å and--.
    Line 64, "quadraple-layered" should read --quadruple-layered--.

COLUMN 79

Line 7, "layer" should read --layers--.
    Line 51, "field as a bias field," should read --field,--.

COLUMN 81

Line 33, "high" should read --higher--.
    Line 66, "earth" should read --earth metal--.

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-identified patent and that said Letters Patent is hereby corrected as shown below:

COLUMN 82

Line 11, "layer an" should read --layer, and--.
    Line 67, "aid" should read --said--.

Signed and Sealed this

Thirtieth Day of November, 1993

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,132,945
DATED : July 21, 1992
INVENTOR(S) : YOICHI OSATO, ET AL.

It is certified that error appears in the above-indentified patent and that said Letters Patent is hereby corrected as shown below:

COLUMN 27

Line 53, "could" should read --could not--.

COLUMN 58

After line 47, the following text should appear:

--EXAMPLE 30

Samples of magnetooptical disks were prepared as shown in Table 14 by varying the ratio of the transition metal and the rare earth element in each of the three layers.--.

Signed and Sealed this

Twenty-first Day of March, 1995

Attest:

BRUCE LEHMAN

Attesting Officer

Commissioner of Patents and Trademarks